United States Patent
Arnold et al.

(10) Patent No.: US 10,818,900 B2
(45) Date of Patent: Oct. 27, 2020

(54) UV OR EB CURED POLYMER-BONDED CERAMIC PARTICLE LITHIUM SECONDARY BATTERY SEPARATORS, METHOD FOR THE PRODUCTION THEREOF

(71) Applicant: Miltec UV International, LLC, Stevensville, MD (US)

(72) Inventors: John Arnold, Stevensville, MD (US); Gary E. Voelker, Stevensville, MD (US); Joe Fasolo, Stevensville, MD (US); Patrick Laden, Stevensville, MD (US)

(73) Assignee: Miltec UV International, LLC, Stevensville, MD (US)

( * ) Notice: Subject to any disclaimer, the term of this patent is extended or adjusted under 35 U.S.C. 154(b) by 4 days.

(21) Appl. No.: 15/327,288

(22) PCT Filed: Apr. 22, 2015

(86) PCT No.: PCT/US2015/027176
§ 371 (c)(1),
(2) Date: Jan. 18, 2017

(87) PCT Pub. No.: WO2016/010600
PCT Pub. Date: Jan. 21, 2016

(65) Prior Publication Data
US 2017/0170441 A1      Jun. 15, 2017

Related U.S. Application Data

(63) Continuation-in-part of application No. 14/335,367, filed on Jul. 18, 2014, now Pat. No. 9,680,143.
(Continued)

(51) Int. Cl.
*H01M 2/16*   (2006.01)
*B29C 48/00*  (2019.01)
(Continued)

(52) U.S. Cl.
CPC ......... *H01M 2/166* (2013.01); *B29C 35/0805* (2013.01); *B29C 39/003* (2013.01);
(Continued)

(58) Field of Classification Search
None
See application file for complete search history.

(56) References Cited

U.S. PATENT DOCUMENTS

| 3,904,437 A | 9/1975 | Specker |
| 4,086,401 A | 4/1978 | Sundberg et al. |

(Continued)

FOREIGN PATENT DOCUMENTS

| CN | 101989651 A | 3/2011 |
| CN | 102627918 A | 8/2012 |

(Continued)

OTHER PUBLICATIONS

JP 2012-033498 A Machine Translation (Year: 2012).*
(Continued)

*Primary Examiner* — Robert S Carrico
(74) *Attorney, Agent, or Firm* — Dority & Manning, P.A.

(57) ABSTRACT

Porous, electrically insulating, and electrochemically resistant surface coatings that strengthen and protect separators and that improve the operational safety of electrochemical devices using such separators, porous, electrically insulating, and electrochemically resistant standalone separators, the use of ultraviolet (UV) or electron beam (EB) curable binders to secure an electrically insulating, porous, ceramic particle coating on separators or to produce standalone separators, and methods of producing polymer-bound ceramic particle separator coatings, separators and electrochemical devices by UV or EB curing slurries of reactive liquid resins and ceramic particles.

21 Claims, 32 Drawing Sheets

Porous Separator Film Coated on Both Sides with ceramics in porous UV-cured binder.

Related U.S. Application Data

(60) Provisional application No. 62/026,663, filed on Jul. 20, 2014.

(51) Int. Cl.

| | | |
|---|---|---|
| *B29C 35/08* | (2006.01) | |
| *B29C 39/00* | (2006.01) | |
| *H01M 2/14* | (2006.01) | |
| *H01M 10/0525* | (2010.01) | |
| *H01M 10/052* | (2010.01) | |
| *H01M 10/058* | (2010.01) | |
| *C08F 2/48* | (2006.01) | |
| *C08F 2/54* | (2006.01) | |
| *B29L 31/34* | (2006.01) | |

(52) U.S. Cl.
CPC .......... *B29C 48/022* (2019.02); *H01M 2/145* (2013.01); *H01M 2/1673* (2013.01); *H01M 2/1686* (2013.01); *H01M 10/0525* (2013.01); *B29C 2035/0827* (2013.01); *B29L 2031/3468* (2013.01); *C08F 2/48* (2013.01); *C08F 2/54* (2013.01); *H01M 10/052* (2013.01); *H01M 10/058* (2013.01); *Y10T 29/49115* (2015.01)

(56) References Cited

U.S. PATENT DOCUMENTS

| | | | |
|---|---|---|---|
| 4,650,730 A | 3/1987 | Lundquist et al. | |
| 4,906,718 A | 3/1990 | Gornowicz et al. | |
| 5,130,342 A | 7/1992 | McAllister et al. | |
| 5,140,486 A | 8/1992 | Yokoyama et al. | |
| 5,176,968 A | 1/1993 | Blasi et al. | |
| 5,427,872 A | 6/1995 | Shen et al. | |
| 5,529,707 A | 6/1996 | Kejha | |
| 5,631,103 A | 5/1997 | Eschbach et al. | |
| 5,654,114 A | 8/1997 | Kubota et al. | |
| 5,705,084 A | 1/1998 | Kejha | |
| 5,741,608 A | 4/1998 | Kojima et al. | |
| 5,849,433 A | 12/1998 | Venugopal et al. | |
| 5,853,916 A | 12/1998 | Venugopal et al. | |
| 5,952,120 A | 9/1999 | Yu et al. | |
| 6,242,135 B1 | 6/2001 | Mushiake | |
| 6,287,720 B1 | 9/2001 | Yamashita et al. | |
| 6,432,586 B1 | 8/2002 | Zhang | |
| 6,447,958 B1 | 9/2002 | Shinohara et al. | |
| 6,468,697 B1 * | 10/2002 | Ferment ................ | H01M 2/16 429/303 |
| 6,632,561 B1 | 10/2003 | Bauer et al. | |
| 6,746,803 B1 | 6/2004 | Bauer et al. | |
| 6,949,285 B1 | 9/2005 | Tobinaga et al. | |
| 7,097,943 B2 | 8/2006 | Cho et al. | |
| 7,135,254 B2 | 11/2006 | Yun et al. | |
| 8,372,475 B2 | 2/2013 | Kim et al. | |
| 2002/0146540 A1 | 10/2002 | Johnston et al. | |
| 2003/0180623 A1 | 9/2003 | Yun et al. | |
| 2005/0095504 A1 * | 5/2005 | Kim ................ | H01M 2/1673 429/246 |
| 2005/0260492 A1 | 11/2005 | Tucholski et al. | |
| 2006/0263693 A1 | 11/2006 | Kim et al. | |
| 2007/0232709 A1 | 10/2007 | Lee et al. | |
| 2008/0245735 A1 | 10/2008 | Hennige et al. | |
| 2009/0197158 A1 | 8/2009 | Ogawa et al. | |
| 2010/0015533 A1 | 1/2010 | Deguchi et al. | |
| 2010/0323230 A1 * | 12/2010 | Lee ................ | H01M 2/166 429/143 |
| 2011/0027658 A1 | 2/2011 | Kim et al. | |
| 2011/0033743 A1 * | 2/2011 | Lee ................ | H01M 2/1653 429/145 |
| 2011/0081575 A1 | 4/2011 | Voelker et al. | |
| 2011/0165449 A1 | 7/2011 | Take et al. | |
| 2011/0311855 A1 | 12/2011 | Peng et al. | |
| 2012/0053286 A1 | 3/2012 | Zhao et al. | |
| 2012/0315384 A1 | 12/2012 | Abd Elhamid et al. | |
| 2013/0022868 A1 | 1/2013 | Yang et al. | |
| 2013/0059192 A1 | 3/2013 | Kajita et al. | |
| 2013/0084483 A1 * | 4/2013 | Lee ................ | H01M 2/166 429/143 |
| 2013/0157107 A1 | 6/2013 | Chung et al. | |
| 2013/0244116 A1 * | 9/2013 | Watanabe ............. | H01M 4/133 429/231.8 |
| 2013/0280584 A1 | 10/2013 | Matsumura | |
| 2014/0329154 A1 * | 11/2014 | Shinoda .................. | C08K 3/22 429/254 |
| 2015/0155536 A1 | 6/2015 | Suzuki | |

FOREIGN PATENT DOCUMENTS

| | | | |
|---|---|---|---|
| CN | 103229330 A | | 7/2013 |
| CN | 103460444 A | | 12/2013 |
| DE | 19914272 A1 | | 10/1999 |
| JP | 5-190208 | | 7/1993 |
| JP | 11-67273 | | 3/1999 |
| JP | 11-0803985 | | 3/1999 |
| JP | 11-283674 | | 10/1999 |
| JP | 2002118288 A | | 4/2002 |
| JP | 2002531924 A | | 9/2002 |
| JP | 2011216376 A | * | 10/2011 |
| JP | 2013-246918 A | | 12/2013 |
| WO | 98-59387 A2 | | 12/1998 |
| WO | 2012053286 A1 | | 4/2012 |
| WO | 2013107911 A1 | | 7/2013 |
| WO | 2015/057815 A1 | | 4/2015 |

OTHER PUBLICATIONS

Machine Translation of WO 2012/053286 A1 (Year: 2012).*
Machine Translation of JP 2011-216376 A (Year: 2011).*
Communication with Supplementary European Search Report in EP14853525 dated Apr. 11, 2017.
Communication with Supplementary European Search Report in EP15822731 dated Oct. 24, 2017.
Abraham, et al., "Polymer Electrolytes Reinforced by Celgard Membranes", Technical Papers, Electrochemical Science and Technology, Journal of the Electrochemical Society, vol. 142, No. 3, pp. 683-687, Mar. 1995.
Abraham, "Directions in Secondary Lithium Battery Research and Development", Electrochimica Acta, vol. 38, No. 9, pp. 1233-1248, 1993.
Crowther, et al., "Effect of Electrolyte Composition on Lithium Dendrite Growth", Journal of the Electrochemical Soceity, 155(11) pp. A806-A811 (2008).
Abraham, et al., "Characterization of Ether Electrolytes for Rechargeable Lithium Cells", Journal of the Electrochemical Society, vol. 129, No. 11, pp. 2404 to 2409 (1982).
Abraham, et al., "Rechargeability of the Ambient Temperature Cell Li/2Me-THF, LiAsF,F6/Cr0.5V0.5S2", Journal of the Electrochemical Society, Dec. 1983, pp. 2309-2314.
Abraham, et al., "Inorganic-Organic Composite Solid Polymer Electrolytes", Journal of the Electrochemical Society, 147(4), pp. 1251-1256, 2000.
Besenhard, Excerpts from Handbook of Battery Materials, 14 pages.
Orendorff, "The Role of Separators in Lithium-Ion Cell Society", The Electrochemical Society Interface, Summer 2012, pp. 61-65.
Song, et al., "Review of Gel-Type Polymer Electrolytes for Lithium-Ion Batteries", Journal of Power Sources 77(1999) pp. 183-197.
Doyle, et al., "Modeling of Galvanostatic Charge and Discharge of the Lithium/Polymer/Insertion Cell", J. Electrochem. Soc., vol. 140, No. 6, Jun. 1993, pp. 1526-1533.
IEEE Standard for Rechargeable Batteries for Cellular Telephones, IEEE Power Engineering Society, Livium 1725, 2006, 82 pages.
MTI as Ceramic Coated Membrane, <http://www.mtixtl.com/CeramicCoatedMembraneforLi-ionBatteryRandD-EQ-bsf-0016-500A.aspx>, Jan. 19, 2015, 2 pages.
Celgard C210 Product Information Data Sheet, 2 pages.
Celgard 2320 Product Information Data Sheet, 2 pages.
Besenhard, Handbook of Battery Materials, Feb. 5, 1999, 11 pages.

(56) References Cited

OTHER PUBLICATIONS

Linden, Handbook of Batteries, 1995, 11 pages.
Pillot, The Rechargeable Battery Market and Main Trends 2012-2025, Presentation by Avicenne Energy, Apr. 11, 2013, 88 pages.
Geiger, et al., "Advanced Separators for Lithium Batteries", Paper presented at 11th International Seminar on Primary and Secondary Battery Technology and Applications, Feb. 28-Mar. 3, 1994, 13 pages.
Allcock, "Contemporary Polymer Chemistry", Chapter 21, The Testing of Polymers, 5 pages.
Venugopal, "Characterization of Microporous Separators for Lithium-Ion-Batteries", Journal of Power Sources 77(1999), pp. 34-41.
Wang, et al., Poly(ethylene oxide)-silica hybrid materials for lithium battery application, 1999, Elsevier Science B.V., 39(4), pp. 206-210.
Dec. 29, 2014—(WO) International Search Report and Written Opinion—App PCT/US2014/060656.
International Search Report and Written Opinion in PCT/US15/27176 dated Jul. 30, 2015.
Celgard Product Details, Celgard 2325, Celgard 2340 and Celgard 2400, date prior to Oct. 15, 2013, 3 pages.
"Coated," Collins English Dictionary. Collins Dictionaries. London: Collins, 2014. Credo Reference Web Accessed on: Aug. 12, 2015. <http://search.credoreference.com/content/entry/hcengdict/coated/0>.
Aug. 9, 2018—(CN) Office Action—App 201480067998.5.
Oct. 31, 2018—(JP) Notification of Reasons for Refusal—App 2016-549195 (Eng Trans).
Mar. 6, 2018—(CN) Office Action—App 201480067998.5.
Jul. 31, 2017—(CN) Office Action—App 2014800679985.
Jul. 18, 2018—(EP) First Examination Report—App 14853525.5.
Apr. 4, 2019—(JP) Notification of Reasons for Refusal—App 2017-523767.

\* cited by examiner

Porous Separator Film Coated on Both Sides with ceramics in porous UV-cured binder.

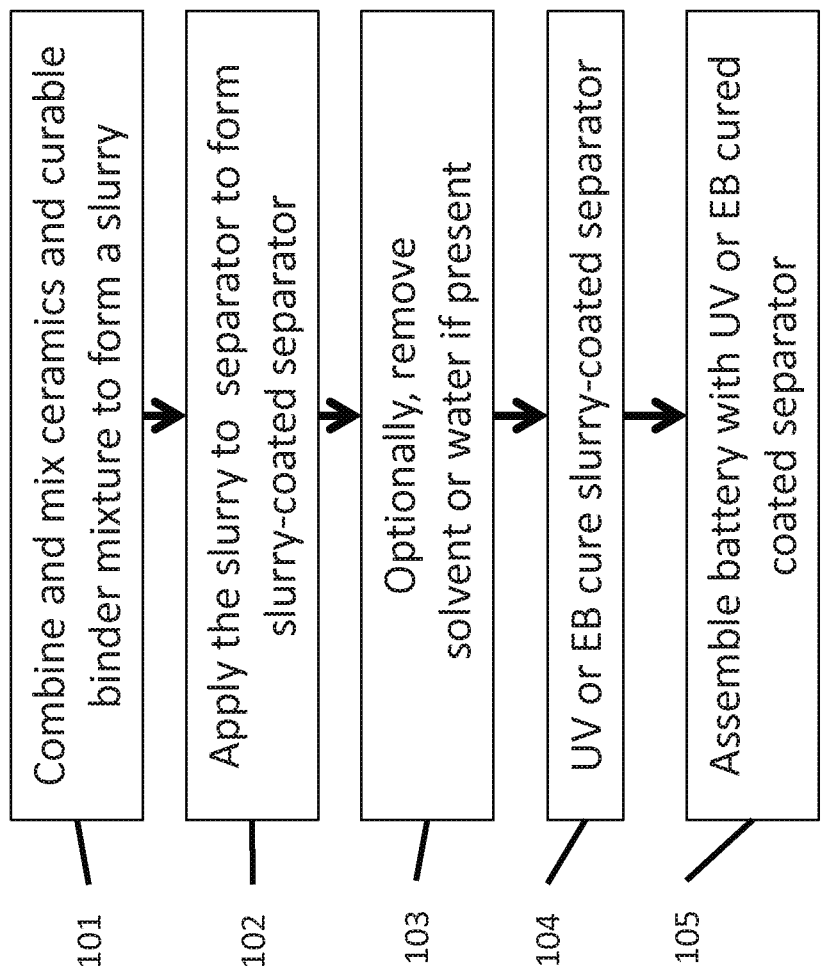

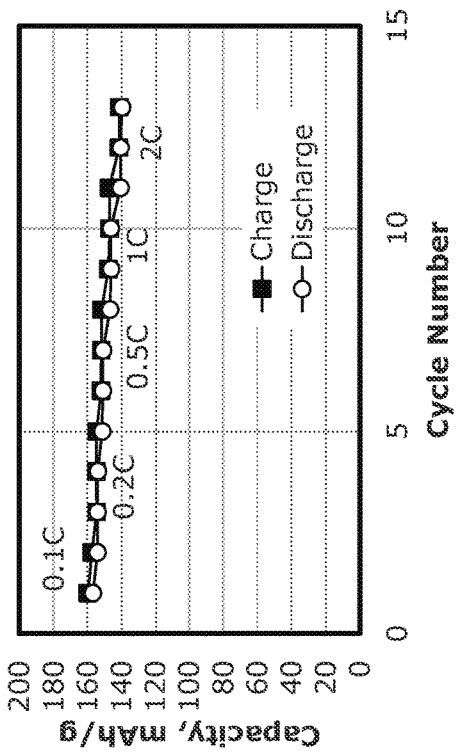
FIG. 4A
Uncoated Reference Separator
VOLTAGE PROFILE
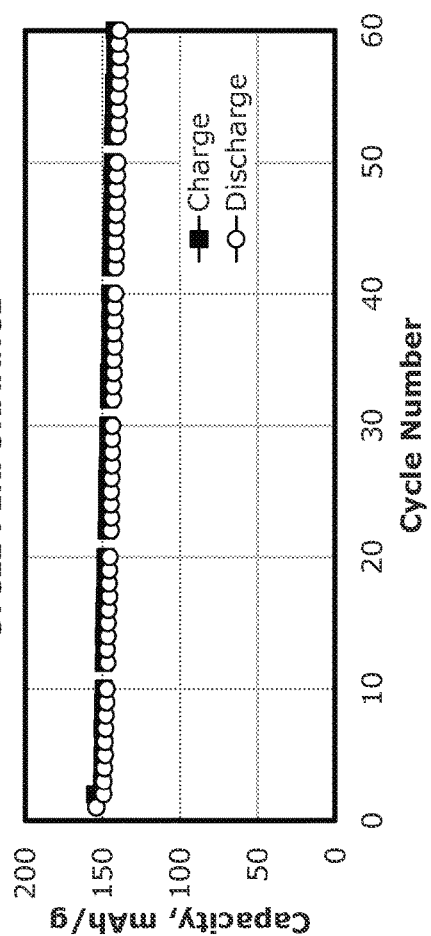
FIG. 4B
Uncoated Reference Separator
Charge Rate Performance
FIG. 4C
Uncoated Reference Separator
CYCLE PERFORMANCE Coated Separator Sample #1
VOLTAGE PROFILE Coated Separator Sample #3
VOLTAGE PROFILE Coated Separator Sample #4
VOLTAGE PROFILE Coated Separator Sample #6
VOLTAGE PROFILE Coated Separator Sample #7
VOLTAGE PROFILE Coated Separator Sample #7
Charge Rate Performance Coated Separator Sample #7
CYCLE PERFORMANCE Coated Separator Sample #8
VOLTAGE PROFILE Coated Separator Sample #8
Charge Rate Performance Coated Separator Sample #8
CYCLE PERFORMANCE

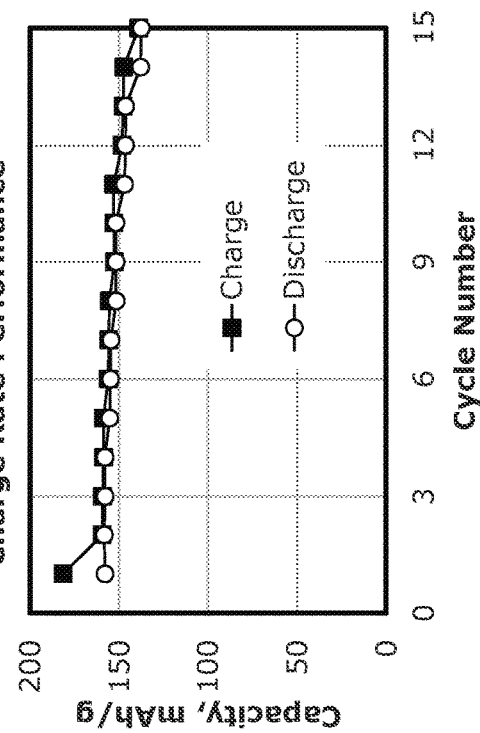
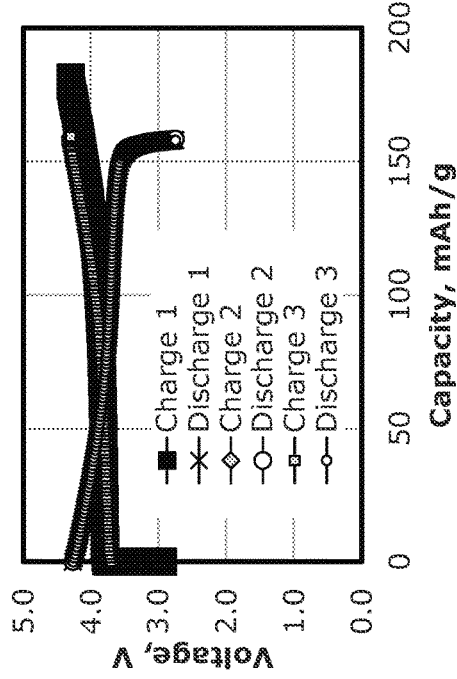
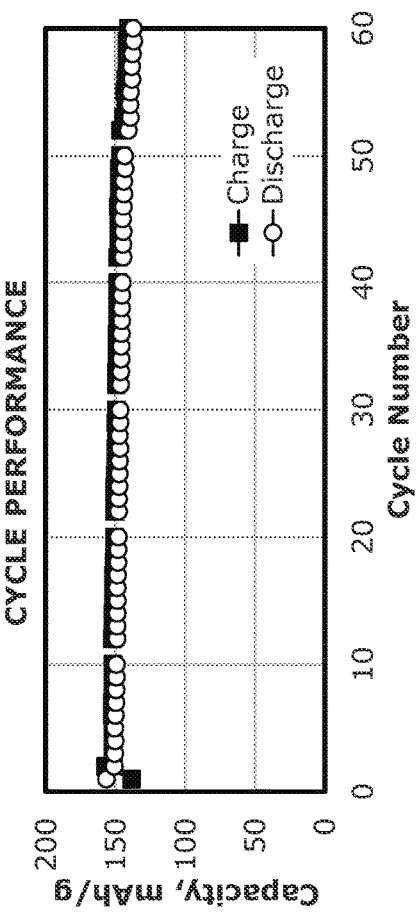

Coated Separator Sample #10
Charge Rate Performance

Coated Separator Sample #10
CYCLE PERFORMANCE

Coated Separator Sample #10
VOLTAGE PROFILE

Coated Separator Sample #11
VOLTAGE PROFILE

Coated Separator Sample #11
Charge Rate Performance

Coated Separator Sample #11
CYCLE PERFORMANCE

Coated Separator Sample #12
VOLTAGE PROFILE

Coated Separator Sample #12
Charge Rate Performance

Coated Separator Sample #12
CYCLE PERFORMANCE

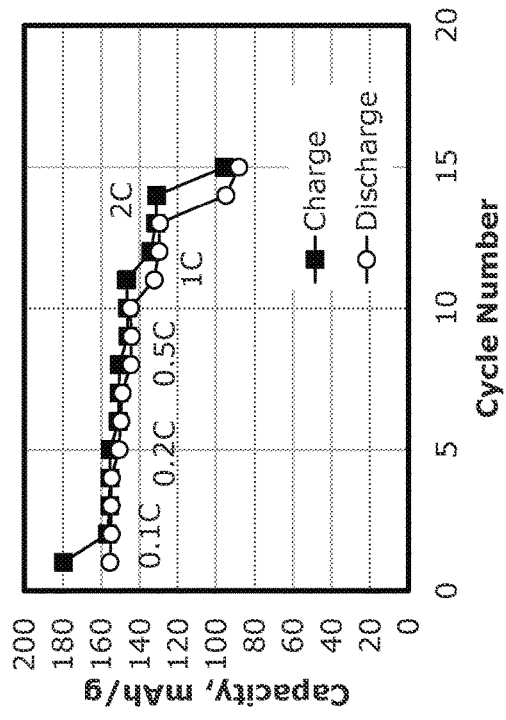
FIG. 17A Coated Separator Sample #13 VOLTAGE PROFILE
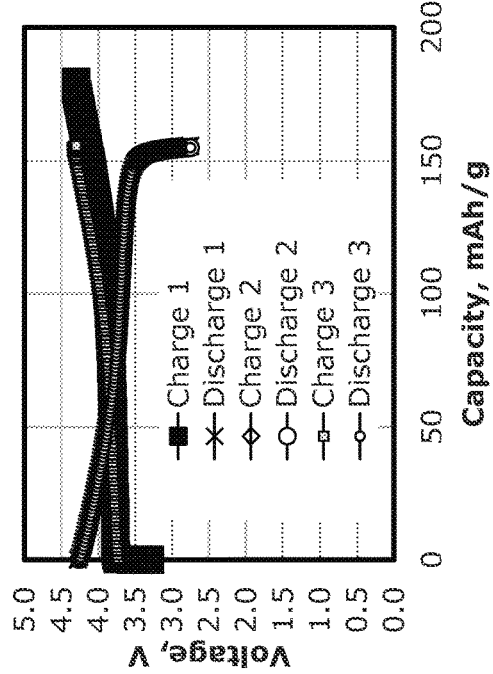
FIG. 17B Coated Separator Sample #13 Charge Rate Performance
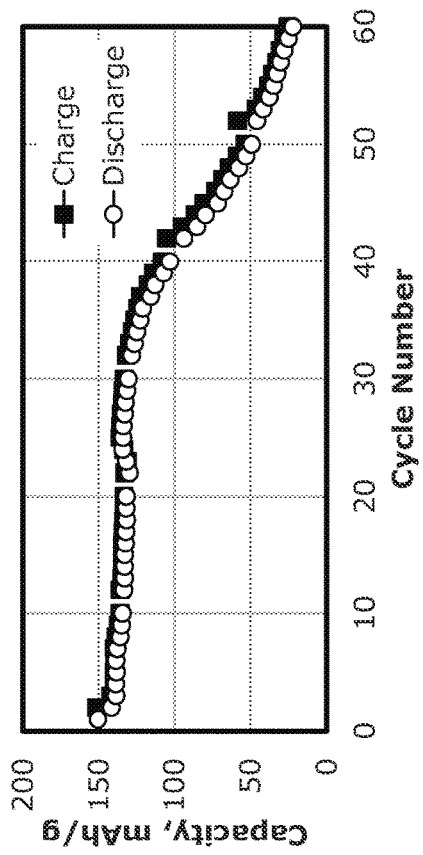
FIG. 17C Coated Separator Sample #13 CYCLE PERFORMANCE Coated Separator Sample #14
Charge Rate Performance Coated Separator Sample #14
VOLTAGE PROFILE Coated Separator Sample #14
CYCLE PERFORMANCE Coated Separator Sample #15
Charge Rate Performance Coated Separator Sample #15
CYCLE PERFORMANCE Coated Separator Sample #15
VOLTAGE PROFILE Coated Separator Sample #16
VOLTAGE PROFILE Coated Separator Sample #16
Charge Rate Performance Coated Separator Sample #16
CYCLE PERFORMANCE Coated Separator Sample #17
VOLTAGE PROFILE Coated Separator Sample #17
Charge Rate Performance Coated Separator Sample #17
CYCLE PERFORMANCE

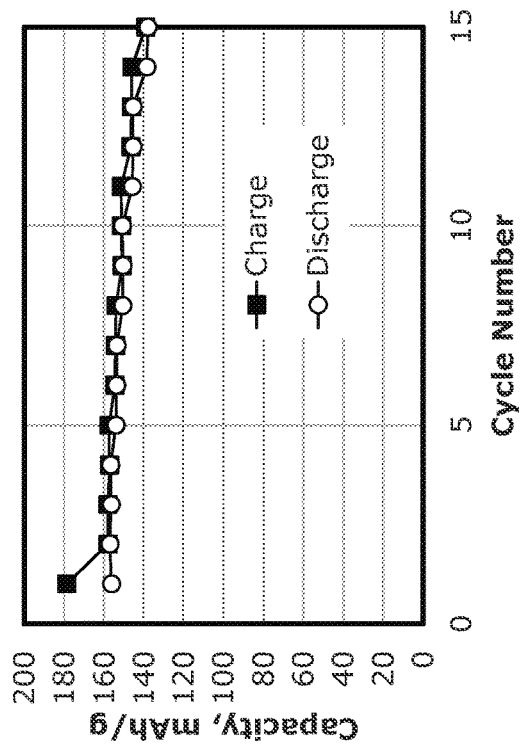
FIG. 22A Coated Separator Sample #18 VOLTAGE PROFILE
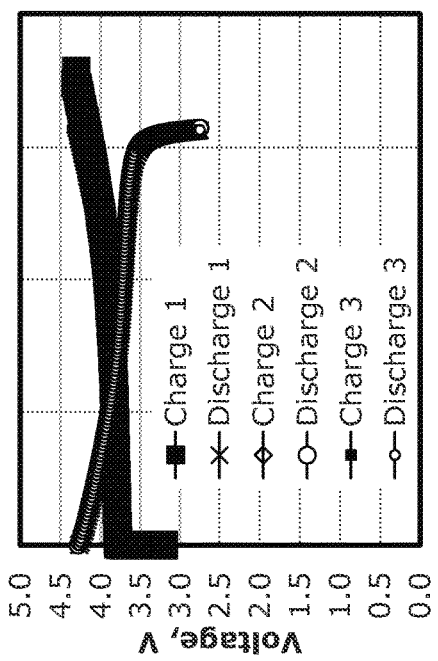
FIG. 22B Coated Separator Sample #18 Charge Rate Performance
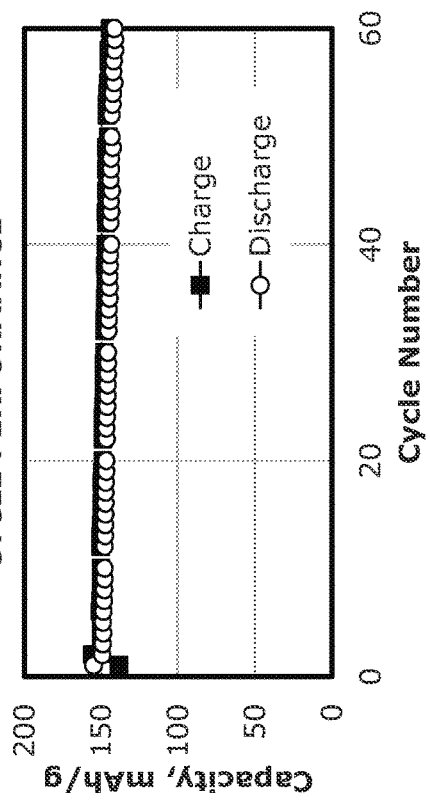
FIG. 22C Coated Separator Sample #18 CYCLE PERFORMANCE

UV OR EB CURED POLYMER-BONDED CERAMIC PARTICLE LITHIUM SECONDARY BATTERY SEPARATORS, METHOD FOR THE PRODUCTION THEREOF

CROSS-REFERENCE TO RELATED APPLICATIONS

This application is a national phase application under 35 U.S.C. § 371 of International Application No. PCT/US2015/027176, filed on Apr. 22, 2015, which claims benefit of U.S. Application No. 62/026,663, filed on Jul. 20, 2014, and is a continuation in part of U.S. application Ser. No. 14/335,367, filed on Jul. 18, 2014, the disclosures of which are incorporated herein by reference in their entirety.

TECHNICAL FIELD

The present application is in the technical field of alkali-ion secondary (rechargeable) batteries; and particularly in the technical field of lithium secondary batteries and the manufacture of bonded ceramic particle separators placed between electrodes in the assembly of lithium secondary batteries. More specifically, this application pertains to the use of a UV or EB curable binder to bind electronically non-conductive, ceramic particles together to form a porous, ceramic separator.

BACKGROUND

Electrochemical devices, such as batteries, are widely used in portable and auxiliary power supplies. The basic working unit of a battery is an electrochemical cell. The electrochemical cell includes two electrodes (an anode and a cathode) and an electrolyte. The anode and cathode are physically separated and in contact with an electrolyte. The battery electrolyte may be a liquid, solid, or gel. For air, liquid, and some gel electrolytes, a porous, electrically non-conductive separator is placed between the anode and the cathode. The electrolyte provides a path for ions to flow from the cathode to the anode (charging) as well as for the ions to flow from the anode to the cathode (discharging). The battery will not work if the cathode and anode make electrical contact.

A separator is used to "separate" the cathode from the anode, serving as an electrical barrier between the cathode and the anode. Although the separator is an electrical barrier, the separator may not be an ionic barrier. In some instances, to maximize ionic flow, the separator is as thin and as porous as possible. A separator may be a thin porous polymer film.

Void spaces in the separator polymer are filled with electrolyte that also fills pores in the anode and cathode coatings. An organic alkyl carbonate containing selected lithium salts is one example of a liquid electrolyte. The electrolytes offer a high mobility of ions (e.g., lithium ions) and are designed to be chemically inert when exposed to the voltage potential at the cathode and anode surfaces.

Due to its electrical storage capacity, the lithium secondary (rechargeable) battery has become a preferred electrical storage device for hybrid and electric vehicles, electric grid storage, and a multitude of portable consumer electronics such as laptop computers, cellphones, and hand tools. The higher storage capacity comes from a combination of higher voltage potential and greater energy density (ion density) within the electrode surfaces.

With higher voltages and energy density comes greater risk of fire. The separator is a key component to preventing fire. Fire can occur if 1) the battery discharges so quickly that the corresponding heat melts or shrinks the separator, 2) physical damage to the battery causes the anode and cathode to touch, or 3) electrolytic plating (irreversible side reactions) cause lithium ions to plate lithium metal on the anode in such a way that over time they develop lithium growths (e.g., dendrites, spikes, etc.) on the anode that keep growing until they form a metallic bridge to the cathode.

The safe operation of the battery without the risk of catching fire during operation is imperative due to the non-aqueous and flammable electrolyte. Heat must be efficiently eliminated or the temperature of the battery will increase. Electrical short circuits between the anode and cathode through the separator must be eliminated to prevent local heat buildup and potential combustion. Therefore, the design and manufacture of a separator is needed which has the attributes of being porous, mechanically strong, heat resistant and stable, and does not form cracks or shrink causing short circuits when the cell is either heated or compressed.

A typical separator is a thin porous polymer film of thermoplastic polypropylene (PP), polyethylene (PE), or coextended blends of PE and PP. Pores in the separator film are filled with electrolyte (e.g., an organic alkyl carbonate containing selected lithium salts). Similarly, the electrolyte fills the pores in coatings on the anode and cathode. In the case of an organic alkyl carbonate electrolyte, the carbonate provides a path for lithium ions to travel between the anode and cathode and through the separator. The electrolytes must also withstand the voltage between the anode and the cathode. One of the advantages of the PE or PP separator is that these thermoplastic polymers flow when exposed to heat. This heat induced flow causes the pores in the separator to close. When the pores close, the separator is a barrier to ionic flow. So in cases of mild or gradual overheating states, the thermoplastic separator shuts the battery down.

Thermoplastic PE-PP, however, have several disadvantages. Thermoplastic PE-PP separators are very similar in strength and heat resistance to that of a common kitchen sandwich bag. In the event of battery rupture, PE-PP separators provide insignificant mechanical strength; and in the event of fast discharge, PE-PP separators do not have the heat resistance to remain in place. In high heat conditions, the polymer separator can go from melting, to curling, depolymerization, and decomposition. As the polymer separator film curls or decomposes, the barrier between the cathode and anode vanishes. In this state, fire will break out if the battery cannot be shut down immediately.

In view of fire safety considerations, a superior, porous, mechanically strong, heat resistant, and stable separator is desired, wherein the separator does not form cracks or cause short circuits due to shrinkage when the electrochemical cell is either heated or compressed.

BRIEF SUMMARY

This Summary is provided to introduce a selection of concepts in a simplified form that are further described below in the Detailed Description. This Summary is not intended to identify key or essential features.

Porous, electrically insulating (e.g., non-conductive), and electrochemically resistant surface coatings that strengthen and protect separators and that improve the operational safety of electrochemical devices using such separators are disclosed. Methods of making such coatings, separators and electrochemical devices by ultraviolet (UV) or electron beam (EB) curing slurries of reactive liquid resins (e.g., monomers and/or oligomers) and ceramic particles are further disclosed.

One or more embodiments are directed to a UV or EB cured coating comprising: a polymeric material including a UV or EB cured matrix comprising a crosslink reaction product from a UV water-based mixture or from one or more precursors selected from one or more monomers, one or more oligomers, or a combination of one or more monomers and one or more oligomers; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic.

Further embodiments are directed to a UV or EB cured coating comprising: a polymeric material including a UV or EB cured matrix comprising a crosslink: reaction product from a UV curable epoxy; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink: reaction product from a UV curable silicone; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink reaction product from a UV curable urethane; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink: reaction product from a UV curable rubber; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink: reaction product from a UV curable thioester; and a ceramic particulate material. The ceramic particulate material may be present in the cured coating in an amount of from about 30 to about 98 weight percent based on the total weight of the cured coating. In certain embodiments, the ceramic particulate material may be present in the cured coating m an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Various embodiments are directed to a coated separator comprising a separator; and any of the UV or EB cured coatings discussed above adhered to at least one surface of the separator. For instance, certain embodiments are directed to a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In some embodiments, the separator is a polymeric film. In certain embodiments, the separator is a trilayer separator. According to some embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be applied to the separator in a continuous coat, a pattern, or a combination thereof, and may completely or partially cover the top surface of the separator, bottom surface of the separator, or a combination thereof. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.).

Certain embodiments are directed to a pattern coated separator comprising a separator; and any of the UV or EB cured coatings discussed above adhered to at least one surface of the separator in a pattern. For instance, certain embodiments are directed to a coated separator comprising a separator; and a UV or EB cured coating adhered to at least one surface of the separator in a pattern, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In some embodiments, the separator is a polymeric film. In other embodiments, the separator is a trilayer separator. According to certain embodiments, the UV or EB cured coating is adhered in a pattern to the top surface or the bottom surface of the separator, but not to both the top surface and the bottom surface. In other embodiments, the UV or EB cured coating is adhered to both the top surface and the bottom surface of the separator in a pattern. According to various embodiments, the pattern coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the patterned UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.).

Other embodiments are directed to an electrochemical device having a coated separator comprising a separator; and any of the UV or EB cured coatings discussed above adhered to at least one surface of the separator. For instance, certain embodiments are directed to an electrochemical device having a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In certain embodiments, the separator is a polymeric film. In some embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be applied to the separator in a continuous coat, a pattern, or a combination thereof, and may completely or partially cover the top surface of the separator, bottom surface of the separator, or a combination thereof. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.). According to various embodiments, the electrochemical device includes an anode, a cathode, an electrolyte, a current collector, or a combination thereof. In certain embodiments, the electrochemical device is an alkali ion battery (e.g., a lithium ion battery).

Still other embodiments are directed to a lithium ion battery having a coated separator comprising a separator; and any of the UV or EB cured coatings discussed above adhered to at least one surface of the separator. For instance, certain embodiments are directed to a lithium ion battery having a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating m an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In certain embodiments, the separator is a polymeric film. In some embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be applied to the separator in a continuous coat, a pattern, or a combination thereof, and may completely or partially cover the top surface of the separator, bottom surface of the separator, or a combination thereof. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.). According to various embodiments, the lithium ion battery includes an anode, a cathode, an electrolyte, a current collector, or a combination thereof.

Various embodiments include a method of making each and any of the coated separators discussed above or any of the electrochemical devices incorporating any of the coated separators discussed above, said method comprising: mixing a ceramic particulate material with a curable binder mixture comprising one or more monomers, one or more oligomers, or a combination thereof to form a slurry; applying the slurry to at least one surface of a separator to form a slurry coated separator; and subjecting the slurry coated separator to UV or EB radiation, thereby curing the curable binder mixture and forming a UV or EB cured matrix. The UV or EB cured matrix adheres to at least one surface of the separator and the ceramic particulate material is distributed substantially throughout the UV or EB cured matrix. In some embodiments, the slurry further comprises a solvent, photoinitiator, free-radical initiator, dispersant, adhesion promoter, wetting agent, silane-coated particle, dark cure additive, co-initiator, blowing agent, or a combination thereof. In other embodiments, the slurry does not comprise a solvent. The slurry may be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, or a combination thereof. According to certain embodiments, the method may also include positioning the coated separator in an electrochemical device and then charging and discharging the electrochemical device. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the curable binder mixture includes a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In some embodiments, the separator is a polymeric film. In other embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator.

Various embodiments are directed to a cured coating comprising: a polymeric material including a cured matrix comprising a crosslink reaction product from a precursor and a cross-linking agent; and a ceramic particulate material. The ceramic particulate material may be present in the cured coating in an amount of from about 5 to about 98 weight percent based on the total weight of the cured coating. In certain embodiments, the ceramic particulate material may be present in the cured coating in an amount of from about 30 to about 98 weight percent or from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. In certain embodiments, the coating further includes 5-50% or 30-40% unpolymerized natural resin (e.g., a rosin, gum, polysaccharide, cellulose, soy resin, protein resin, polylactic acid, or combination thereof). In various embodiments, the coating further includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the coating. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the curable binder mixture consists of 100% oligomer(s). In other embodiments, the curable binder mixture includes at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 μm.

Still further embodiments are directed to a coated separator comprising a separator; and a cured coating adhered to at least one surface of the separator, said cured coating comprising: a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to some embodiments, the cured coating is adhered to the top surface or the bottom surface of the separator, but not to both the top surface and the bottom surface. In other embodiments, the cured coating is adhered to both the top surface and the bottom surface of the separator. The cured coating may be applied to the separator in a continuous coat, a pattern, or a combination thereof, and may completely or partially cover the top surface of the separator, bottom surface of the separator, or a combination thereof.

Certain embodiments are directed to a pattern coated separator comprising a separator; and a cured coating adhered to at least one surface of the separator in a pattern, said cured coating comprising: a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to certain embodiments, the cured coating is adhered in a pattern to the top surface or the bottom surface of the separator, but not to both the top surface and the bottom surface. In other embodiments, the cured coating is adhered to both the top surface and the bottom surface of the separator in a pattern.

Other embodiments are directed to an electrochemical device having a coated separator comprising a separator; and a cured coating adhered to at least one surface of the separator, said cured coating comprising: a polymeric material including a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to some embodiments, the cured coating is adhered to the top surface or the bottom surface of the separator, but not to both the top surface and the bottom surface. In other embodiments, the cured coating is adhered to both the top surface and the bottom surface of the separator. The cured coating may be applied to the separator in a continuous coat, a pattern, or a combination thereof, and may completely or partially cover the top surface of the separator, bottom surface of the separator, or a combination thereof. In some embodiments, the electrochemical device is an alkali ion battery (e.g., a lithium ion battery).

Various embodiments include a method of making a coated separator or an electrochemical device incorporating a coated separator, said method comprising: mixing a curable binder mixture comprising a precursor and a cross-linking agent with a ceramic particulate material to form a slurry; applying the slurry to at least one surface of a separator to form a slurry coated separator; and curing the slurry coated separator, thereby curing the curable binder mixture. Various cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. The slurry may be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, or a combination thereof. According to certain embodiments, the method may also include positioning the coated separator in an electrochemical device and then charging and discharging the electrochemical device.

One or more embodiments are directed to a UV or EB cured coating comprising: a ceramic particulate material; and a polymeric material including a UV or EB cured matrix comprising a crosslink reaction product from a UV water-based mixture or from one or more precursors selected from the group consisting of one or more monomers, one or more oligomers, and a combination of one or more monomers and one or more oligomers. The ceramic particulate material may be present in the cured coating in an amount of from about 5 to about 98 weight percent based on the total weight of the cured coating. In certain embodiments, the ceramic particulate material may be present in the cured coating in an amount of from about 5 to about 95 weight percent, from about 30 to about 98 weight percent, from about 30 to about 95 weight percent, from about 40 to about 98 weight percent, or from about 40 to about 95 weight percent based on the total weight of the cured coating. In various embodiments, the ceramic particulate material is bound to the UV or EB cured matrix, distributed uniformly throughout the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), aluminum trihydroxide, silicon oxide, silicon carbide, titanium dioxide, magnesium oxide, boron nitride, magnesium silicate hydroxide, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In certain embodiments, the ceramic particulate material comprises round particles. The ceramic particulate material does not necessarily have to be uniform (in size or material). In one or more embodiments, all of the particles of the ceramic particulate material consist of the same material. In other variations, the particles of the ceramic particulate material comprise a mixture of differing materials. In some embodiments, all of the particles of the ceramic particulate material are the same size; however, in other embodiments, the particles of the ceramic particulate material differ in size from one another. According to various embodiments, the ceramic particulate material does not contain any particles having a size larger than 10 µm. In certain embodiments, the coating further comprises 5-50% or 30-40% unpolymerized natural resin (e.g., a rosin, gum, polysaccharide, cellulose, soy resin, protein resin, polylactic acid, or combination thereof). In various embodiments, the coating may further comprise thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the coating. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the one or more precursors consist of 100% oligomer(s). In other embodiments, the one or more precursors include at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm. According to various embodiments, the UV or EB cured matrix does not comprise polyvinylidene fluoride (PVDF).

Various embodiments are directed to a coated separator comprising a separator; and any of the UV or EB cured coatings discussed above adhered to at least one surface of the separator. For instance, certain embodiments are directed to a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from the group consisting of one or more monomers, one or more oligomers, or combinations thereof; and a ceramic particulate material. The ceramic particulate material may be present in the cured coating in an amount of from about 5 to about 98 weight percent based on the total weight of the cured coating. In certain embodiments, the ceramic particulate material may be present in the cured coating in an amount of from about 5 to about 95 weight percent, from about 30 to about 98 weight percent, from about 30 to about 95 weight percent, from about 40 to about 98 weight percent, or from about 40 to about 95 weight percent based on the total weight of the cured coating. In various embodiments, the ceramic particulate material is bound to the UV or EB cured matrix, bound to the separator by the UV or EB cured matrix, distributed uniformly throughout the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), aluminum trihydroxide, silicon oxide, silicon carbide, titanium dioxide, magnesium oxide, boron nitride, magnesium silicate hydroxide, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In certain embodiments, the ceramic particulate material comprises round particles. The ceramic particulate material does not necessarily have to be uniform (in size or material). In one or more embodiments, all of the particles of the ceramic particulate material consist of the same material. In other variations, the particles of the ceramic particulate material comprise a mixture of differing materials. In some embodiments, all of the particles of the ceramic particulate material are the same size; however, in other embodiments, the particles of the ceramic particulate material differ in size from one another. According to various embodiments, the ceramic particulate material does not contain any particles having a size larger than 10 In certain embodiments, the coating further includes 5-50% or 30-40% unpolymerized natural resin (e.g., a rosin, gum, polysaccharide, cellulose, soy resin, protein resin, polylactic acid, or combination thereof). In various embodiments, the coating may further include a composition that fills pores of the separator when heated so as to provide a thermal shut off mechanism for the separator (e.g., a thermally migrating plastic or low polymerized acrylic agent). In one or more embodiments, the composition includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the coating. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the one or more precursors consist of 100% oligomer(s). In other embodiments, the one or more precursors include at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm. According to various embodiments, the UV or EB cured matrix does not comprise polyvinylidene fluoride (PVDF). In some embodiments, the separator is a polymeric film. In certain embodiments, the separator is a trilayer separator. According to some embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be present on the separator in a continuous coat, a pattern, or a combination thereof, and may completely or partially cover the top surface of the separator, bottom surface of the separator, or a combination thereof. The coating may be applied to the separator with a screen, curtain coat, gravure, reverse gravure, flexographic printer, letterpress, offset press, ink jet (e.g., ink jet printer), or combination thereof. In certain embodiments, the coating may be applied in a pattern that reduces shrinkage of the separator, increases tear resistance of the separator, or a combination thereof. For example, in one or more embodiments, the coating may be printed on the separator parallel to a machine direction to reduce shrinkage of the separator. In further embodiments, the coating may be printed on the separator transverse to a machine direction to increase tear resistance of the separator. In still further embodiments, the coating may be printed on the separator diagonally to a machine direction to increase tear resistance of the separator and reduce shrinkage of the separator. Exemplary patterns include, but are not limited to, parallel rows, a perforated pattern, a cross-hatch pattern, and combinations thereof. The coated separator may be porous. According to various embodiments, the coated separator suppresses ionic flow through pores of the separator and stays electrically insulating in response to being heated to a temperature of 100° C. or higher (e.g., 100° C., 105° C., 110° C., 115° C., 120°

C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.). In certain embodiments, the coated separator has a coating thickness of between about 0.1 and about 10 µm, or between about 0.1 and about 3 µm.

Other embodiments are directed to an electrochemical device (e.g., an alkali ion battery such as a lithium secondary battery) having a coated separator comprising a separator; and any of the UV or EB cured coatings discussed above adhered to at least one surface of the separator. For instance, certain embodiments are directed to a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from the group consisting of one or more monomers, one or more oligomers, or combinations thereof; and a ceramic particulate material. The ceramic particulate material may be present in the cured coating in an amount of from about 5 to about 98 weight percent based on the total weight of the cured coating. In certain embodiments, the ceramic particulate material may be present in the cured coating in an amount of from about 5 to about 95 weight percent, from about 30 to about 98 weight percent, from about 30 to about 95 weight percent, from about 40 to about 98 weight percent, or from about 40 to about 95 weight percent based on the total weight of the cured coating. In various embodiments, the ceramic particulate material is bound to the UV or EB cured matrix, bound to the separator by the UV or EB cured matrix, distributed uniformly throughout the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), aluminum trihydroxide, silicon oxide, silicon carbide, titanium dioxide, magnesium oxide, boron nitride, magnesium silicate hydroxide, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In certain embodiments, the ceramic particulate material comprises round particles. The ceramic particulate material does not necessarily have to be uniform (in size or material). In one or more embodiments, all of the particles of the ceramic particulate material consist of the same material. In other variations, the particles of the ceramic particulate material comprise a mixture of differing materials. In some embodiments, all of the particles of the ceramic particulate material are the same size; however, in other embodiments, the particles of the ceramic particulate material differ in size from one another. According to various embodiments, the ceramic particulate material does not contain any particles having a size larger than 10 µm. In certain embodiments, the coating further includes 5-50% or 30-40% unpolymerized natural resin (e.g., a rosin, gum, polysaccharide, cellulose, soy resin, protein resin, polylactic acid, or combination thereof). In various embodiments, the coating may further include a composition that fills pores of the separator when heated so as to provide a thermal shut off mechanism for the separator (e.g., a thermally migrating plastic or low polymerized acrylic agent). In one or more embodiments, the composition includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the coating. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the one or more precursors consist of 100% oligomer(s). In other embodiments, the one or more precursors include at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm. According to various embodiments, the UV or EB cured matrix does not comprise polyvinylidene fluoride (PVDF). In some embodiments, the separator is a polymeric film. In certain embodiments, the separator is a trilayer separator. According to some embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be present on the separator in a continuous coat, a pattern, or a combination thereof, and may completely or partially cover the top surface of the separator, bottom surface of the separator, or a combination thereof. The coating may be applied to the separator with a screen, curtain coat, gravure, reverse gravure, flexographic printer, letterpress, offset press, ink jet (e.g., ink jet printer), or combination thereof. In certain embodiments, the coating may be applied in a pattern that reduces shrinkage of the separator, increases tear resistance of the separator, or a combination thereof. For example, in one or more embodiments, the coating may be printed on the separator parallel to a machine direction to reduce shrinkage of the separator. In further embodiments, the coating may be printed on the separator transverse to a machine direction to increase tear resistance of the separator. In still further embodiments, the coating may be printed on the separator transverse to a machine direction to increase tear resistance of the separator and reduce shrinkage of the separator. Exemplary patterns include, but are not limited to, parallel rows, a perforated pattern, a cross-hatch pattern, and combinations thereof. The coated separator may be porous. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.). In certain embodiments, the coated separator has a coating thickness of between about 0.1 and about 10 µm, or between about 0.1 and about 3 µm. According to various embodiments, the electrochemical device includes an anode, a cathode, an electrolyte, a current collector, or a combination thereof.

Various embodiments include a method of making each and any of the coated separators discussed above or any of the electrochemical devices incorporating any of the coated separators discussed above, said method comprising: mixing a ceramic particulate material with a curable binder mixture comprising one or more monomers, one or more oligomers, or a combination thereof to form a slurry; applying the slurry to at least one surface of a separator to form a slurry coated separator; and subjecting the slurry coated separator to UV or EB radiation, thereby curing the curable binder mixture and forming a UV or EB cured matrix. In certain embodiments, the separator is stretched prior to coating with the slurry. In other embodiments, the slurry is applied to an unstretched film and allowed to dry; then the film is stretched to create pores (transforming the film into separator film); and, finally, the coating is UV or EB cured after stretching. The UV or EB cured matrix adheres to at least one surface of the separator and the ceramic particulate material is distributed substantially throughout the UV or EB cured matrix. In some embodiments, the slurry further comprises a solvent, photoinitiator, free-radical initiator, dispersant, adhesion promoter, wetting agent, silane-coated particle, dark cure additive, co-initiator, blowing agent, or a combination thereof. In certain embodiments, the slurry further includes 5-50% or 30-40% unpolymerized natural resin (e.g., a rosin, gum, polysaccharide, cellulose, soy resin, protein resin, polylactic acid, or combination thereof). In various embodiments, the slurry may further include a composition that fills pores of the separator when heated so as to provide a thermal shut off mechanism for the separator (e.g., a thermally migrating plastic or low polymerized acrylic agent). In one or more embodiments, the composition includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the UV or EB cured matrix. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the curable binder mixture consists of 100% oligomer(s). In other embodiments, the curable binder mixture includes at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm. According to various embodiments, the slurry does not comprise polyvinylidene fluoride (PVDF). In some embodiments, the separator is a polymeric film. In certain embodiments, the separator is a trilayer separator. According to some embodiments, the slurry is applied to the top surface or the bottom surface of the separator, but not to both the top surface and the bottom surface. In other embodiments, the slurry is applied to both the top surface and the bottom surface of the separator. The slurry may be applied to the separator in a continuous coat, a pattern, or a combination thereof, and may completely or partially cover the top surface of the separator, bottom surface of the separator, or a combination thereof. The slurry may be applied to the separator with a screen, curtain coat, gravure, reverse gravure, flexographic printer, letterpress, offset press, ink jet (e.g., ink jet printer), or combination thereof. In certain embodiments, the slurry may be applied in a pattern that reduces shrinkage of the separator, increases tear resistance of the separator, or a combination thereof. For example, in one or more embodiments, the slurry may be printed on the separator parallel to a machine direction to reduce shrinkage of the separator. In further embodiments, the slurry may be printed on the separator transverse to the machine (e.g., web) direction to increase tear resistance of the separator. In still further embodiments, the slurry may be printed on the separator diagonally to the machine direction to increase tear resistance of the separator and reduce shrinkage of the separator. Exemplary patterns include, but are not limited to, parallel rows, a perforated pattern, a cross-hatch pattern, and combinations thereof. The coated separator produced may be porous. According to various embodiments, the coated separator produced suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140°, 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C. 135° C., 140° C., 145° C., 150° C., etc.). In certain embodiments, the coated separator produced has a coating thickness of between about 0.1 and about 10 µm, or between about 0.1 and about 3 µm. According to certain embodiments, the method may also include positioning the coated separator in an electrochemical device and then charging and discharging the electrochemical device. The ceramic particulate material may be present in the cured coating in an amount of from about 5 to about 98 weight percent based on the total weight of the cured coating. In certain embodiments, the ceramic particulate material may be present in the cured coating in an amount of from about 5 to about 95 weight percent, from about 30 to about 98 weight percent, from about 30 to about 95 weight percent, from about 40 to about 98 weight percent, or from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), aluminum trihydroxide, silicon oxide, silicon carbide, titanium dioxide, magnesium oxide, boron nitride, magnesium silicate hydroxide, or a combination thereof, and the curable binder mixture includes a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In some embodiments, the separator is a polymeric film. In other embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator.

Still further embodiments are directed to a coated separator comprising a separator; and a cured coating adhered to at least one surface of the separator, said cured coating comprising: a cured matrix comprising a crosslink reaction product from a precursor and a cross-linking agent; and a ceramic particulate material. The ceramic particulate material may be present in the cured coating in an amount of from about 5 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to some embodiments, the cured coating is adhered to the top surface or the bottom surface of the separator, but not to both the top surface and the bottom surface. In other embodiments, the cured coating is adhered to both the top surface and the bottom surface of the separator. The cured coating may be applied to the separator in a continuous coat, a pattern, or a combination thereof, and may completely or partially cover the top surface of the separator, bottom surface of the separator, or a combination thereof. In certain embodiments, the cured coating further includes 5-50% or 30-40% unpolymerized natural resin (e.g., a rosin, gum, polysaccharide, cellulose, soy resin, protein resin, polylactic acid, or combination thereof). In various embodiments, the cured coating may further include a composition that fills pores of the separator when heated so as to provide a thermal shut off mechanism for the separator (e.g., a thermally migrating plastic or low polymerized acrylic agent). In one or more embodiments, the composition includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the cured coating. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the curable binder mixture consists of 100% oligomer(s). In other embodiments, the curable binder mixture includes at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm.

Other embodiments are directed to an electrochemical device having a coated separator comprising a separator; and a cured coating adhered to at least one surface of the separator, said cured coating comprising: a polymeric material including a cured matrix comprising a crosslink reaction product from a precursor and a cross-linking agent; and a ceramic particulate material. The ceramic particulate material may be present in the cured coating in an amount of from about 5 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to some embodiments, the cured coating is adhered to the top surface or the bottom surface of the separator, but not to both the top surface and the bottom surface. In other embodiments, the cured coating is adhered to both the top surface and the bottom surface of the separator. The cured coating may be applied to the separator in a continuous coat, a pattern, or a combination thereof, and may completely or partially cover the top surface of the separator, bottom surface of the separator, or a combination thereof. In some embodiments, the electrochemical device is an alkali ion battery (e.g., a lithium ion battery). In certain embodiments, the cured coating further includes 5-50% or 30-40% unpolymerized natural resin (e.g., a rosin, gum, polysaccharide, cellulose, soy resin, protein resin, polylactic acid, or combination thereof). In various embodiments, the cured coating may further include a composition that fills pores of the separator when heated so as to provide a thermal shut off mechanism for the separator (e.g., a thermally migrating plastic or low polymerized acrylic agent). In one or more embodiments, the composition includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the cured coating. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the curable binder mixture consists of 100% oligomer(s). In other embodiments, the curable binder mixture includes at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm.

Various embodiments include a method of making a coated separator or an electrochemical device incorporating a coated separator, said method comprising: mixing a curable binder mixture comprising a precursor and a cross-linking agent with a ceramic particulate material to form a slurry; applying the slurry to at least one surface of a separator to form a slurry coated separator; and curing the slurry coated separator, thereby curing the curable binder mixture. Various cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. The slurry may be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, or a combination thereof. According to certain embodiments, the method may also include positioning the coated separator in an electrochemical device and then charging and discharging the electrochemical device. In certain embodiments, the slurry further includes 5-50% or 30-40% unpolymerized natural resin (e.g., a rosin, gum, polysaccharide, cellulose, soy resin, protein resin, polylactic acid, or combination thereof). In various embodiments, the slurry may further include a composition that fills pores of the separator when heated so as to provide a thermal shut off mechanism for the separator (e.g., a thermally migrating plastic or low polymerized acrylic agent). In one or more embodiments, the composition includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the curable binder mixture. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In various embodiments, the ratio of the one or more oligomers to the one or more monomers may be altered (e.g., to alter the adhesive and elastic properties of the coating). For example, in some embodiments, the curable binder mixture consists of 100% oligomer(s). In other embodiments, the curable binder mixture includes at least about 20 weight percent more of the one or more oligomers than the one or more monomers (e.g., about 20 to about 50 weight percent more of the one or more oligomers than the one or more monomers). In certain embodiments, the thermoplastic particles do not contain any particles having a size larger than 10 µm.

In certain embodiments, the entire separator is made in a UV or EB process. Instead of making a coating that is applied to an existing separator (e.g., a polymeric film), the curable binder mixture is cast (e.g., onto a releasable film or directly onto an anode, cathode, electrolyte, or combination thereof) or extruded (e.g., onto a releasable film) and then UV or EB cured. Where the curable binder mixture is cast or extruded onto a releasable film, the UV or EB cured separator may then be released from the releasable film to create a free standing separator or first applied to a cathode, anode, or combination thereof (e.g., with heat and pressure) and then released from the releasable film. All of the aforementioned chemistries and processes for producing a UV or EB curable coating, separator or electrochemical device may be utilized for producing a separator film with a UV or EB curing process or an electrochemical device incorporating such. The entire separator can be cast or extruded as a free standing film, cured against a release film or applied and cured directly on the cathode, anode, or electrolyte (e.g., liquid or solid electrolyte). An example of casting includes, but is not limited to, printing. In certain variations, the separator may include ceramic particles held together with a UV or EB cured matrix comprising a crosslink reaction product from one or more precursors selected from one or more monomers, one or more oligomers, or combinations thereof. A porous, electrically insulating (e.g., non-conductive), and electrochemically resistant separator film that improves the operational safety of electrochemical devices using such separators may be formed by UV or EB curing a slurry of reactive liquid resin (e.g., monomers and/or oligomers) and ceramic particles. In certain variations, the slurry may further include thermoplastic particles or other compositions that flow when heated, in addition to the ceramic particles and reactive liquid resin. Filling the resin matrix with a thermally migrating plastic, low polymerized acrylic agent, or other compositions that can fill pores when heated provides the separator with a thermal shut off mechanism. In one or more embodiments, the slurry includes thermoplastic particles having a melt point between about 100° C. and about 145° C. Exemplary thermoplastic particles include, but are not limited to, particles of stearamide wax, oxidized polyethylene wax, polyethylene wax, carnauba wax, polytetrafluoroethylene wax, bis-stearamide modified polyethylene, ethylene-propylene copolymer wax, polypropylene copolymer, polyamide wax, or a combination thereof. In certain embodiments, the thermoplastic particles are used in an amount from about 2 to about 60 weight percent or from about 5 to about 45 weight percent based on the total weight of the slurry. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In certain embodiments, the thermoplastic particles do not contain any particles having a size larger than 10 µm. According to various embodiments, the ceramic particulate material includes at least one thermally conductive material that is not electrically conductive. Examples of suitable ceramic materials include an aluminum oxide (e.g., aluminum oxide ($Al_2O_3$), aluminum oxide hydroxide (e.g., Boehmite), etc.), aluminum trihydroxide, silicon oxide, silicon carbide, titanium dioxide, magnesium oxide, boron nitride, magnesium silicate hydroxide, other compounds that are not electronically conductive but have appreciable thermal conductivity, and combinations thereof. The ceramic particulate material may include particles all having the same size, shape and material, or may include particles differing in size, shape, material or combinations thereof. In certain embodiments, the ceramic particulate material comprises round particles. The ceramic particulate material does not necessarily have to be uniform (in size or material). In one or more embodiments, all of the particles of the ceramic particulate material consist of the same material. In other variations, the particles of the ceramic particulate material comprise a mixture of differing materials. In some embodiments, all of the particles of the ceramic particulate material are the same size; however, in other embodiments, the particles of the ceramic particulate material differ in size from one another. According to various embodiments, the ceramic particulate material does not contain any particles having a size larger than 10 µm. According to various embodiments, the UV or EB cured separator does not comprise polyvinylidene fluoride (PVDF). In certain variations, the ceramic particulate material may be present in the separator in an amount of from about 5 to about 98 weight percent based on the total weight of the cured separator. In certain embodiments, the ceramic particulate material may be present in the cured separator in an amount of from about 5 to about 95 weight percent, from about 30 to about 98 weight percent, from about 30 to about 95 weight percent, from about 40 to about 98 weight percent, or from about 40 to about 95 weight percent based on the total weight of the cured separator. In various embodiments, the ceramic particulate material is bound to the UV or EB cured matrix. Exemplary precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In various embodiments, the ratio of the one or more oligomers to the one or more monomers may be altered (e.g., to alter the adhesive and elastic properties of the separator). For example, in some embodiments, the one or more precursors consist of 100% oligomer(s). In other embodiments, the one or more precursors include at least about 20 weight percent more of the one or more oligomers than the one or more monomers (e.g., about 20 to about 50 weight percent more of the one or more oligomers than the one or more monomers). The separator may further contain 5-50% or 30-40% unpolymerized natural resin (e.g., a rosin, gum, polysaccharide, cellulose, soy resin, protein resin, polylactic acid, or combination thereof) with a melt point suitable for melting and flowing to provide a thermal shut off temperature for ionic transportation across the separator. The separator may be cast in a single layer or multiple layers. These layers may be printed with printing processes (e.g., screen, curtain coat, gravure, reverse gravure, flexographic printer, letterpress, offset press, ink jet (e.g., ink jet printer), or combination thereof) to create porosity and paths that lithium ions can pass through to reach the cathode or anode. By printing multiple layers, a tortuous ionic path may be created. In one or more embodiments, the separator may be printed in the web direction. In further embodiments, the separator may be printed parallel to the web direction. In still further embodiments, the separator may be printed transverse to the web direction. Exemplary patterns include, but are not limited to, parallel rows, a perforated pattern, a cross-hatch pattern, and combinations thereof. The separator may include continuous printed layers and/or patterned printed layers. A multilayer separator may include two or more of the same layers (e.g., same composition and/or pattern) or one or more differing layers (e.g., at least one layer differing in composition and/or pattern from the other layer(s)). According to various embodiments, the separator manufactured using UV or EB cured binders to bond ceramic particles together to form the separator has dimensional stability, high porosity, mechanical strength, efficient heat transfer, performs safely at high temperature and reduces the risk of thermal runaway by effectively dissipating heat evenly throughout an electrochemical cell. According to various embodiments, the cured separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix, and the cured separator maintains its shape while heated to a temperature of 100° C. or higher (e.g., 100° C., 105° C., 110° C., 115° C., 120° C., 125° C., 130° C., 135° C., 140° C., 145° C., 150° C., etc.). In certain embodiments, the cured separator has a thickness of between about 0.1 and about 30 µm, between about 2 and about 10 µm, or between about 0.1 and about Additional embodiments are described herein.

BRIEF DESCRIPTION OF THE DRAWINGS

Some embodiments are illustrated by way of example, and not by way of limitation, in the figures of the accompanying drawings.

FIG. 3 is a flowchart illustrating steps for producing a battery having a coated separator according to one or more embodiments.

FIG. 4A illustrates the voltage profile of an uncoated reference separator.

FIG. 4B illustrates the charge rate performance of an uncoated reference separator.

FIG. 4C illustrates the cycle performance of an uncoated reference separator.

FIG. 13A illustrates the voltage profile of a coated separator according to one or more embodiments.

FIG. 13B illustrates the charge rate performance of a coated separator according to one or more embodiments.

FIG. 13C illustrates the cycle performance of a coated separator according to one or more embodiments.

FIG. 17A illustrates the voltage profile of a coated separator according to one or more embodiments.

FIG. 17B illustrates the charge rate performance of a coated separator according to one or more embodiments.

FIG. 17C illustrates the cycle performance of a coated separator according to one or more embodiments.

FIG. 22A illustrates the voltage profile of a coated separator according to one or more embodiments.

FIG. 22B illustrates the charge rate performance of a coated separator according to one or more embodiments.

FIG. 22C illustrates the cycle performance of a coated separator according to one or more embodiments.

DETAILED DESCRIPTION

Ultraviolet (UV) or electron beam (EB) curing slurries of reactive liquid resins (e.g., monomers and/or oligomers) and ceramic particles can be used to strengthen and protect separators and improve the operational safety of electrochemical devices using such separators. Presented herein are coated separators having dimensional stability at high temperature, a shutdown mechanism, high porosity, and mechanical strength. Such coated separators may be manufactured by an improved process using UV or EB cured materials to bind ceramic particle coatings to a polymeric membrane separator.

Reference now will be made in detail to various embodiments, one or more examples of which are set forth below. Each example is provided by way of explanation, not limitation of the disclosure. It will be apparent to those skilled in the art that various modifications and variations may be made without departing from the scope or spirit of the disclosure. For instance, features illustrated or described as part of one embodiment, may be used in another embodiment to yield a still further embodiment. Thus, it is intended that the disclosure cover such modifications and variations.

Certain variations are directed to electrochemical device (e.g., lithium secondary battery) separators utilizing particular EB or actinic UV curable binders, and to methods for manufacturing the same. According to various embodiments, particular EB and/or UV curable materials may be utilized as binders in manufacturing coated separators having a thin ceramic coating layer, as the particular EB and/or UV curable materials demonstrate good adhesion to polymeric (e.g., polyethylene, polypropylene, or combinations thereof) separators upon curing, while providing the necessary resistance to harsh electrolytic material present in an electrochemical device and retaining the necessary separator porosity.

Various embodiments are directed to a UV or EB cured coating comprising: a polymeric material including a UV or EB cured matrix comprising a crosslink: reaction product from one or more precursors selected from one or more monomers, one or more oligomers, or combinations thereof; and a ceramic particulate material. The ceramic particulate material may be present in the cured coating in an amount of from about 5 to about 98 weight percent based on the total weight of the cured coating. In certain embodiments, the ceramic particulate material may be present in the cured coating in an amount of from about 5 to about 95 weight percent, from about 30 to about 98 weight percent, from about 30 to about 95 weight percent, from about 40 to about 98 weight percent, or from about 40 to about 95 weight percent based on the total weight of the cured coating.

Figure 1:
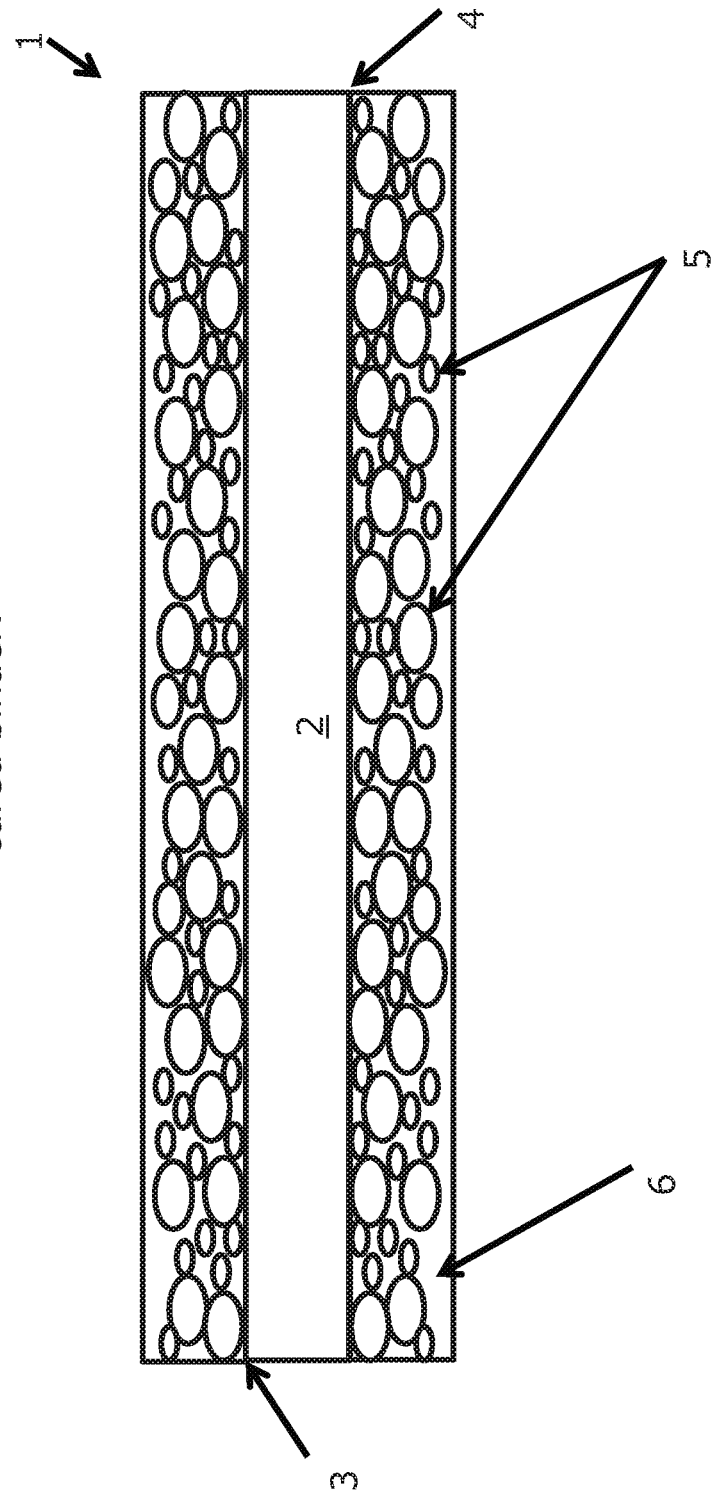
FIG. 1 illustrates a cross-sectional view of a coated separator according to one or more embodiments.

The UV or EB cured coating may be used to strengthen and protect separators and improve the operational safety of electrochemical devices using such separators. A cross sectional view of a coated separator 1 according to one or more embodiments is illustrated in FIG. 1. The porous separator film 2 of FIG. 1 is coated on both the top side 3 and bottom side 4 with ceramic particles 5 in a porous UV-cured binder 6.

Figure 23:
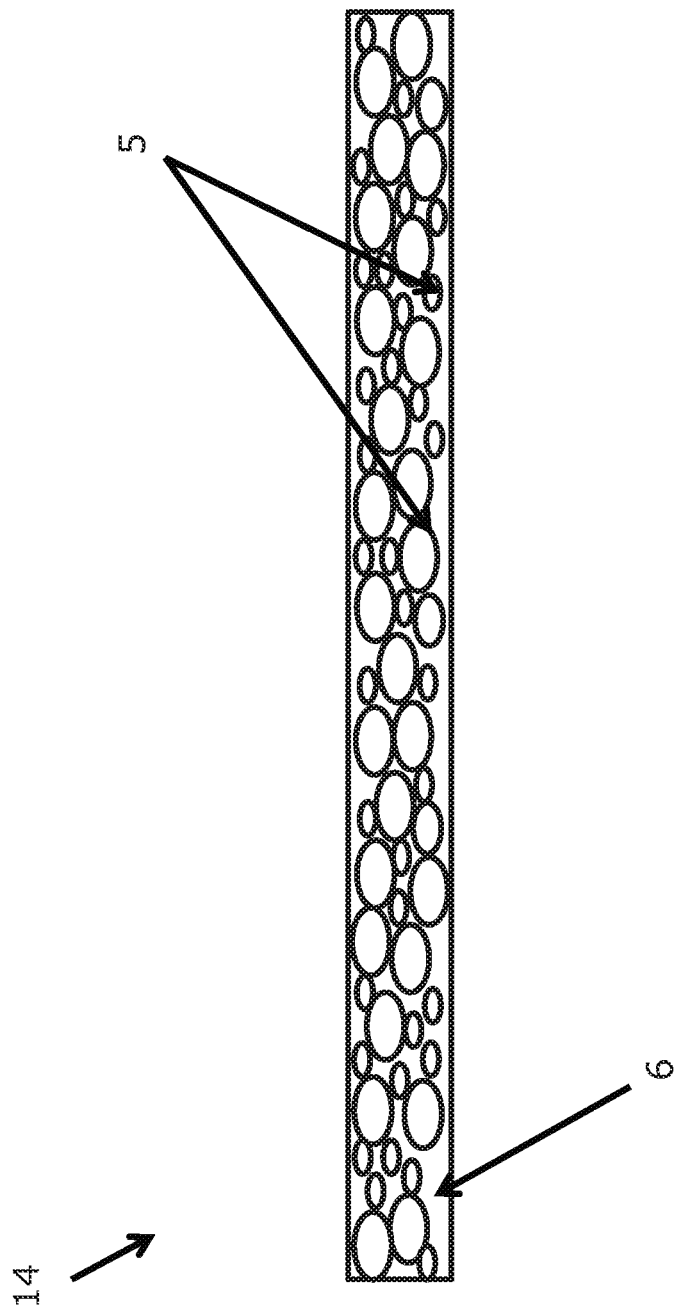
FIG. 23 illustrates a cross-sectional view of a separator according to one or more embodiments.
Figure 24:
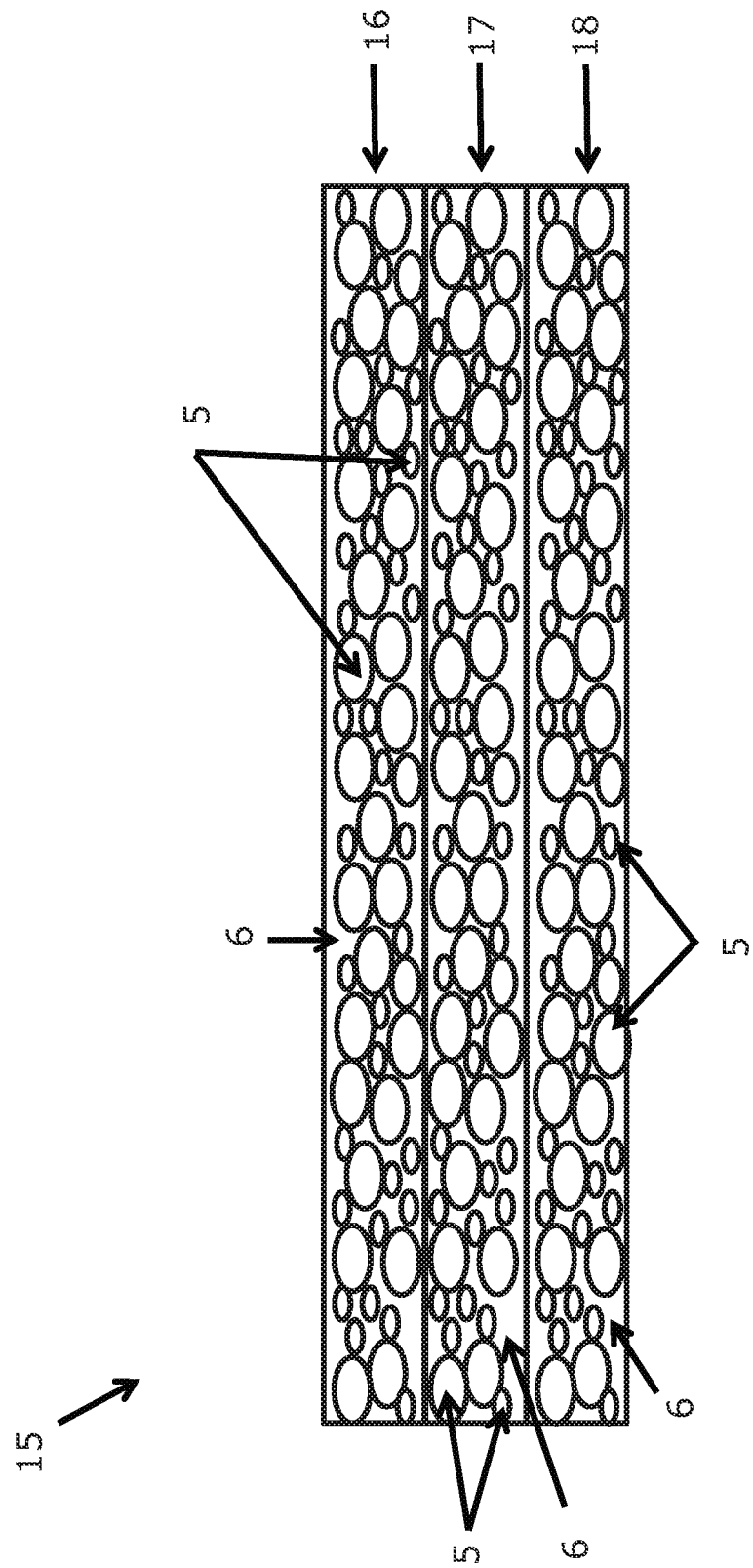
FIG. 24 illustrates a cross-sectional view of a multi-layer separator according to one or more embodiments.

While the ceramic particles are not limited to any particular shape, round or rounded particles minimize tearing stresses of the fragile polymer (e.g., polyolefin) film of the separator when the battery is assembled as well as when the battery expands and contracts in normal operation. The ceramic particles 5 of FIGS. 1, 23 and 24 are examples of round or rounded particles. A UV or EB cured coating may have ceramic particles having all the same or similar shape in some embodiments. In other embodiments, the ceramic particles of a UV or EB cured coating may be of varying shapes. According to further embodiments, the ceramic particles of the coating on the top side of the separator may be a different shape than the ceramic particles of the coating on the bottom side of the separator. In some embodiments, the ceramic particles can be hollow to provide greater porosity to the final UV or EB cured coating. Examples of ceramic particle shapes usable in various embodiments include, but are not limited to, a simple sphere or a more complicated shape such as a zeolite.

The size of the particles of the ceramic particulate material is largely limited by the thickness of the UV or EB cured coating. For instance, there may be no need to use particles that would significantly exceed the thickness of the coating. The actual particle size is determined in the design of the electrochemical device. For example, a temporary battery designed for single use may use a very thin coated separator (e.g., 1 μm thickness) and thus, relatively small ceramic particles (e.g., 0.1 μm) may be suitable. However, a power tool (high discharge) or a vehicle battery (high energy density) may require a long life and greater safety considerations and thus, some embodiments include a coated separator 25 μm thick with 10 μm ceramic particles in the coating. In some embodiments, the ceramic particles are all about the same size. In other embodiments, the ceramic particulate material contains particles of varying size. For instance, the porous UV-cured binder 6 of FIGS. 1, 23 and 24 is filled with ceramic particles 5 having different sizes. According to further embodiments, the ceramic particles of the coating on the top side of the separator may be a different size than the ceramic particles of the coating on the bottom side of the separator. Adding particles of different sizes increases particle to particle contact and the packing density, which increases the thermal conductivity and safety of the coating.

In certain embodiments, the particles of the ceramic particulate material have a particle size of from about 1 nm to about 10 μm. In other embodiments, the particles of the ceramic particulate material have a particle size of from about 1 nm to about 9.5 μm, from about 1 nm to about 9 μm, from about 1 nm to about 8.5 μm, from about 1 nm to about 8 μm, from about 1 nm to about 7.5 μm, from about 1 nm to about 7 μm, from about 1 nm to about 6.5 μm, from about 1 nm to about 6 μm, from about 1 nm to about 5.5 μm, from about 1 nm to about 5 μm, from about 1 nm to about 4.5 μm, from about 1 nm to about 4 μm, from about 1 nm to about 3.5 μm, from about 1 nm to about 3 μm, from about 1 nm to about 2.5 μm, from about 1 nm to about 2 μm, from about 1 nm to about 1.5 μm, from about 1 nm to about 1 μm, from about 2 nm to about 10 μm, from about 2 nm to about 9.5 μm, from about 2 nm to about 9 μm, from about 2 nm to about 8.5 μm, from about 2 nm to about 8 μm, from about 2 nm to about 7.5 μm, from about 2 nm to about 7 μm, from about 2 nm to about 6.5 μm, from about 2 nm to about 6 μm, from about 2 nm to about 5.5 μm, from about 2 nm to about 5 μm, from about 2 nm to about 4.5 μm, from about 2 nm to about 4 μm, from about 2 nm to about 3.5 μm, from about 2 nm to about 3 μm, from about 2 nm to about 2.5 μm, from about 0.1 μm to about 10 μm, from about 0.1 μm to about 9.5 μm, from about 0.1 μm to about 9 μm, from about 0.1 μm to about 8.5 μm, from about 0.1 μm to about 8 μm, from about 0.1 μm to about 7.5 μm, from about 0.1 μm to about 7 μm, from about 0.1 μm to about 6.5 μm, from about 0.1 μm to about 6 μm, from about 0.1 μm to about 5.5 μm, from about 0.1 μm to about 5 μm, from about 0.1 μm to about 4.5 μm, from about 0.1 μm to about 4 μm, from about 0.1 μm to about 3.5 μm, from about 0.1 μm to about 3 μm, from about 0.1 μm to about 2.5 μm, from about 0.1 μm to about 2 μm, from about 0.1 μm to about 1.5 μm, from about 0.1 μm to about 1 μm, or a combination thereof.

In some embodiments, the particles of the ceramic particulate material have a particle size of about 10 μm, about 9.5 μm, about 9 μm, about 8.5 μm, about 8 μm, about 7.5 μm, about 7 μm, about 6.5 μm, about 6 μm, about 5.5 μm, about 5 μm, about 4.5 μm, about 4 μm, about 3.5 μm, about 3 μm, about 2.5 μm, about 2 μm, about 1.5 μm, about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06

μm, about 0.05 μm, about 0.04 μm, about 0.03 μm, about 0.02 μm, about 0.01 μm, about 1 nm, or a combination thereof.

Various ceramic materials are available and may be used in various embodiments. According to certain embodiments, the ceramic particulate material comprises at least one thermally conductive material that is electrically insulating (e.g., having a resistance of at least $10^7$ ohms). In various embodiments, the ceramic particulate material has an electrical conductivity less than that of the curable binder mixture and less than that of the uncoated separator film. In certain embodiments, the ceramic particles of the coating allow the thermal conductivity of the separator to be increased without increasing the electrical conductivity of the separator. Examples of ceramic materials usable in various embodiments include, but are not limited to, an aluminum oxide (e.g., aluminum oxide ($Al_2O_3$), aluminum oxide hydroxide (e.g., Boehmite), etc.), aluminum trihydroxide, silicon oxide, silicon carbide, titanium dioxide, magnesium oxide, boron nitride, magnesium silicate hydroxide, other compounds that are electrically insulating but have appreciable thermal conductivity, and combinations thereof. The cured coating of the various embodiments includes at least one type of ceramic material. In some embodiments, the cured coating may include combinations of two or more types of ceramic materials, including combinations of any two or more, three or more, four or more, five or more, etc. of the types of ceramic materials described herein. For example, in certain embodiments, the cured coating may include one of an aluminum oxide, aluminum trihydroxide, silicon oxide, silicon carbide, titanium dioxide, magnesium oxide, boron nitride, magnesium silicate hydroxide, or another compound that is electrically insulating but has appreciable thermal conductivity. In other embodiments, the cured coating may include two ceramic materials (e.g., aluminum oxide ($Al_2O_3$) and aluminum oxide hydroxide, an aluminum oxide and silicon oxide, an aluminum oxide and silicon carbide, an aluminum oxide and titanium dioxide, an aluminum oxide and magnesium oxide, an aluminum oxide and boron nitride, an aluminum oxide and aluminum trihydroxide, an aluminum oxide and magnesium silicate hydroxide, an aluminum oxide and another compound that is electrically insulating but has appreciable thermal conductivity, silicon oxide and titanium dioxide, silicon oxide and magnesium oxide, etc.), three ceramic materials (e.g., aluminum oxide ($Al_2O_3$), silicon oxide, and aluminum oxide hydroxide; an aluminum oxide, silicon oxide, and silicon carbide; an aluminum oxide, silicon oxide, and titanium dioxide; an aluminum oxide, silicon oxide, and magnesium oxide; an aluminum oxide, silicon oxide, and boron nitride; an aluminum oxide, silicon oxide, and another compound that is electrically insulating but has appreciable thermal conductivity; silicon oxide, titanium dioxide, and magnesium oxide; an aluminum oxide, silicon oxide and aluminum trihydroxide; an aluminum oxide, silicon oxide and magnesium silicate hydroxide; etc.), four ceramic materials (e.g., aluminum oxide ($Al_2O_3$), silicon oxide, silicon carbide, and aluminum oxide hydroxide; an aluminum oxide, silicon oxide, silicon carbide, and titanium dioxide; an aluminum oxide, silicon oxide, silicon carbide, and magnesium oxide; an aluminum oxide, silicon oxide, silicon carbide, and boron nitride; an aluminum oxide, silicon oxide, silicon carbide, and another compound that is electrically insulating but has appreciable thermal conductivity; silicon oxide, silicon carbide, titanium dioxide, and magnesium oxide; silicon oxide, silicon carbide, titanium dioxide, and boron nitride; an aluminum oxide, silicon oxide, silicon carbide, and aluminum trihydroxide; an aluminum oxide, silicon oxide, silicon carbide, and magnesium silicate hydroxide; etc.), five ceramic materials (e.g., aluminum oxide ($Al_2O_3$), silicon oxide, silicon carbide, titanium dioxide, and aluminum oxide hydroxide; an aluminum oxide, silicon oxide, silicon carbide, titanium dioxide, and magnesium oxide; an aluminum oxide, silicon oxide, silicon carbide, titanium dioxide, and boron nitride; an aluminum oxide, silicon oxide, silicon carbide, titanium dioxide, and another compound that is electrically insulating but has appreciable thermal conductivity; an aluminum oxide, silicon oxide, silicon carbide, titanium dioxide, and aluminum trihydroxide; an aluminum oxide, silicon oxide, silicon carbide, titanium dioxide, and magnesium silicate hydroxide; etc.), six ceramic materials (e.g., aluminum oxide ($Al_2O_3$), silicon oxide, silicon carbide, titanium dioxide, magnesium oxide, and aluminum oxide hydroxide; an aluminum oxide, silicon oxide, silicon carbide, titanium dioxide, magnesium oxide, and boron nitride; an aluminum oxide, silicon oxide, silicon carbide, titanium dioxide, magnesium oxide, and another compound that is electrically insulating but has appreciable thermal conductivity; an aluminum oxide, silicon oxide, silicon carbide, titanium dioxide, magnesium oxide, and aluminum trihydroxide; an aluminum oxide, silicon oxide, silicon carbide, titanium dioxide, magnesium oxide, and magnesium silicate hydroxide; etc.), or seven ceramic materials (e.g., aluminum oxide ($Al_2O_3$), silicon oxide, silicon carbide, titanium dioxide, magnesium oxide, boron nitride, and aluminum oxide hydroxide; an aluminum oxide, silicon oxide, silicon carbide, titanium dioxide, magnesium oxide, boron nitride, and another compound that is electrically insulating but has appreciable thermal conductivity; an aluminum oxide, silicon oxide, silicon carbide, titanium dioxide, magnesium oxide, boron nitride, and aluminum trihydroxide; an aluminum oxide, silicon oxide, silicon carbide, titanium dioxide, magnesium oxide, boron nitride, and magnesium silicate hydroxide; etc.).

The cured coating of various embodiments comprises ceramic particulate material in an amount of from about 5 to about 98 weight percent based on the total weight of the cured coating. In some embodiments, the cured coating comprises ceramic particulate material in an amount of from about 5 to about 95 weight percent, from about 5 to about 90 weight percent, from about 5 to about 85 weight percent, from about 5 to about 80 weight percent, from about 5 to about 75 weight percent, from about 5 to about 70 weight percent, from about 5 to about 65 weight percent, from about 5 to about 60 weight percent, from about 5 to about 55 weight percent, from about 5 to about 50 weight percent, from about 5 to about 45 weight percent, from about 5 to about 40 weight percent, from about 5 to about 35 weight percent, from about 5 to about 30 weight percent, from about 5 to about 25 weight percent, from about 5 to about 20 weight percent, from about 5 to about 15 weight percent, from about 5 to about 10 weight percent, from about 30 to about 98 weight percent, from about 30 to about 95 weight percent, from about 30 to about 90 weight percent, from about 30 to about 85 weight percent, from about 30 to about 80 weight percent, from about 30 to about 75 weight percent, from about 30 to about 70 weight percent, from about 30 to about 65 weight percent, from about 30 to about 60 weight percent, from about 30 to about 55 weight percent, from about 30 to about 50 weight percent, from about 30 to about 45 weight percent, from about 30 to about 40 weight percent, from about 30 to about 35 weight percent, from about 40 to about 98 weight percent, from about 40 to about 95 weight percent, from about 40 to about 90 weight percent, from about 40 to about 85 weight percent, from about 40 to about 80 weight percent, from about 40 to about 75 weight percent, from about 40 to about 70 weight percent, from about 40 to about 65 weight percent, from about 40 to about 60 weight percent, from about 40 to about 55 weight percent, from about 40 to about 50 weight percent, from about 40 to about 45 weight percent, from about 50 to about 98 weight percent, from about 50 to about 95 weight percent, from about 50 to about 90 weight percent, from about 50 to about 85 weight percent, from about 50 to about 80 weight percent, from about 50 to about 75 weight percent, from about 50 to about 70 weight percent, from about 50 to about 65 weight percent, from about 50 to about 60 weight percent, from about 50 to about 55 weight percent, from about 60 to about 98 weight percent, from about 60 to about 95 weight percent, from about 60 to about 90 weight percent, from about 60 to about 85 weight percent, from about 60 to about 80 weight percent, from about 60 to about 75 weight percent, from about 60 to about 70 weight percent, from about 60 to about 65 weight percent, from about 70 to about 98 weight percent, from about 70 to about 95 weight percent, from about 70 to about 90 weight percent, from about 70 to about 85 weight percent, from about 70 to about 80 weight percent, from about 70 to about 75 weight percent, from about 80 to about 98 weight percent, from about 80 to about 95 weight percent, from about 80 to about 90 weight percent, from about 80 to about 85 weight percent, from about 90 to about 98 weight percent, from about 90 to about 95 weight percent, or from about 95 to about 98 weight percent. In certain embodiments, the cured coating comprises ceramic particulate material in an amount of about 5 weight percent, about 10 weight percent, about 15 weight percent, about 20 weight percent, about 25 weight percent, about 30 weight percent, about 35 weight percent, about 40 weight percent, about 45 weight percent, about 50 weight percent, about 55 weight percent, about 60 weight percent, about 65 weight percent, about 70 weight percent, about 75 weight percent, about 80 weight percent, about 85 weight percent, about 90 weight percent, about 95 weight percent, about 96 weight percent, about 97 weight percent, or about 98 weight percent.

In some embodiments, other solids may also be added to the ceramic particles in amounts of about 20 to about 95 weight percent based on the total weight of the cured coating to enhance lithium battery performance. In other embodiments, other solids may also be added to the ceramic particles in amounts of about 25 to about 95 weight percent, about 30 to about 95 weight percent, about 35 to about 95 weight percent, about 40 to about 95 weight percent, about 45 to about 95 weight percent, about 50 to about 95 weight percent, about 55 to about 95 weight percent, about 60 to about 95 weight percent, about 65 to about 95 weight percent, about 70 to about 95 weight percent, about 75 to about 95 weight percent, about 80 to about 95 weight percent, about 85 to about 95 weight percent, about 90 to about 95 weight percent, about 20 to about 30 weight percent, about 20 to about 40 weight percent, about 20 to about 50 weight percent, about 20 to about 60 weight percent, about 20 to about 70 weight percent, about 20 to about 80 weight percent, or about 20 to about 90 weight percent.

Examples of other solids usable in various embodiments include, but are not limited to, silicon or lithium doped ceramic oxides. In some embodiments, the cured coating may include one other solid (e.g., a silicon doped ceramic oxide or a lithium doped ceramic oxide, etc.). In other embodiments, the cured coating may include combinations of two or more types of other solids, including combinations of any two or more (e.g., a silicon doped ceramic oxide and a lithium doped ceramic oxide, etc.), three or more, four or more, five or more, etc. of the types of other solids described herein.

In certain variations, the coating may include thermoplastic particles or other compositions that flow when heated, in addition to the ceramic particles and reactive liquid resin. Filling the resin matrix with a thermally migrating plastic, low polymerized acrylic agent, or other compositions that can fill pores when heated provides the separator with a thermal shut off mechanism. The thermally robust thermoset UV materials will not flow when heated, so when the battery gets hot, the thermoplastic particles or other compositions flow. In particular, the thermoplastic particles or other compositions flow to the spot of least pressure (e.g., the pores). Accordingly, when the battery gets too hot (e.g., 110-300° C., the specific temperatures may be selected through selection of the thermoplastic or other composition), the thermoplastic particles or other composition will flow into the pores and block the flow of ions to either the anode or cathode. This permanently shuts the battery down and reduces fires of batteries undergoing a thermal runaway.

In various embodiments, thermoplastic particles or other compositions that flow when heated are added to the ceramic particles and reactive liquid resin in amounts of from about 5 to about 60 weight percent based on the total weight of the coating to provide the separator with a thermal shut off mechanism. In certain embodiments, the coating may comprise thermoplastic particles or other compositions that flow when heated in an amount from about 5 to about 55 weight percent, from about 5 to about 50 weight percent, from about 5 to about 45 weight percent, from about 5 to about 40 weight percent, from about 5 to about 35 weight percent, from about 5 to about 30 weight percent, from about 5 to about 25 weight percent, from about 5 to about 20 weight percent, from about 20 to about 60 weight percent, from about 20 to about 50 weight percent, from about 25 to about 50 weight percent, from about 30 to about 50 weight percent, from about 35 to about 50 weight percent, from about 40 to about 50 weight percent, from about 45 to about 50 weight percent, from about 30 to about 40 weight percent, or from about 30 to about 45 weight percent based on the total weight of the coating. In one or more embodiments, the coating may comprise unpolymerized natural resin in an amount of 5 weight percent, 10 weight percent, 5 weight percent, 20 weight percent, 25 weight percent, 30 weight percent, 35 weight percent, 40 weight percent, 45 weight percent or 50 weight percent based on the total weight of the coating.

Thermoplastic particles or other compositions that flow when heated may be chosen with melt points that do not interfere with the operation of a battery that is performing normally. According to certain embodiments, desired shut-down temperature (e.g., a particular battery's specification for irreversible shut-down) dictates the choice of thermoplastic particle(s) or other composition(s) that flow when heated. For example, thermoplastic particle(s) (and/or other composition(s) that flow when heated) having a melt point corresponding to the desired shut-down temperature may be used. In various embodiments, the coating includes thermoplastic particles having a melt point between about 100° C. and about 200° C. Thermoplastic particles (and/or other composition(s) that flow when heated) having a melt point below about 100° C. may interfere with the operation of a battery that is performing normally. In other words, a thermoplastic particle (and/or other composition that flows when heated) having a melt point below about 100° C. may shut-off a normally operating battery. On the other hand, thermoplastic particles (and/or other composition(s) that flow when heated) having a melt point above about 200° C. may not prevent thermal runaway. Thermoplastic particles (and/or other composition(s) that flow when heated) having a melt point greater than about 145° C. may only be useful in the coatings of coated separator films wherein the base separator film (e.g., polymeric film) has a higher melting point. Accordingly, in various embodiments, the coating includes thermoplastic particles having a melt point between about 100° C. and about 160° C., between about 100° C. and about 155° C., between about 100° C. and about 150° C., between about 100° C. and about 145° C., between about 105° C. and about 200° C., between about 110° C. and about 200° C., between about 115° C. and about 200° C., between about 120° C. and about 200° C., between about 125° C. and about 200° C., between about 130° C. and about 200° C., between about 135° C. and about 200° C., between about 140° C. and about 200° C., between about 145° C. and about 200° C., between about 150° C. and about 200° C., between about 155° C. and about 200° C., between about 160° C. and about 200° C., between about 165° C. and about 200° C., between about 170° C. and about 200° C., between about 175° C. and about 200° C., between about 180° C. and about 200° C., between about 185° C. and about 200° C., between about 190° C. and about 200° C., between about 195° C. and about 200° C., between about 110° C. and about 160° C., between about 115° C. and about 160° C., between about 120° C. and about 160° C., between about 125° C. and about 160° C., between about 130° C. and about 160° C., between about 135° C. and about 160° C., between about 140° C. and about 160° C., between about 145° C. and about 160° C., between about 150° C. and about 160° C., between about 155° C. and about 160° C., between about 110° C. and about 145° C., between about 115° C. and about 145° C., between about 120° C. and about 145° C., between about 125° C. and about 145° C., between about 130° C. and about 145° C., between about 135° C. and about 145° C., or between about 140° C. and about 145° C.

Examples of thermoplastic particles or other compositions that flow when heated (and corresponding exemplary melt temperature(s)) usable in various embodiments include, but are not limited to, particles of stearamide wax (100° C.), oxidized polyethylene wax (110° C.), polyethylene wax (110° C., 144° C. or 150° C.), polyethylene/carnauba wax blend (110° C.), polyethylene/polytetrafluoroethylene wax (117° C.), wax (118° C.), polyethylene wax blend (124° C.), bis-stearamide modified polyethylene (135° C. or 138° C.), ethylene-propylene copolymer wax (137° C.), polypropylene copolymer (140° C.), polyamide wax (142° C., 145° C. or 186° C.), polypropylene wax (160° C.), low molecular weight polypropylene (155° C.), or a combination thereof. In various embodiments, two or more thermoplastic particles or other compositions that flow when heated may be used synergistically. In some embodiments, the coating may include one type of thermoplastic particle or other composition that flows when heated. In other embodiments, the coating may include combinations of two or more types of thermoplastic particles or other compositions that flow when heated, including combinations of any two or more, three or more, four or more, five or more, etc. of the types of thermoplastic particles or other compositions that flow when heated described herein. The thermoplastic particles do not necessarily have to be uniform (in size or material). In one or more embodiments, all of the thermoplastic particles consist of the same material. In other variations, the thermoplastic particles comprise a mixture of differing materials. In some embodiments, all of the thermoplastic particles are the same size; however, in other embodiments, the thermoplastic particles differ in size from one another. In certain embodiments, the thermoplastic particles do not contain any particles having a size larger than 10 µm.

According to various embodiments, the coating may contain from about 5 to about 50 weight percent (based on the total weight of the coating) unpolymerized natural resin (e.g., unpolymerized resin derived from a natural source) with a melt point suitable for melting and flowing to provide a thermal shut off temperature for ionic transportation across the separator. In certain embodiments, the coating may comprise unpolymerized natural resin in an amount from about 5 to about 45 weight percent, from about 5 to about 40 weight percent, from about 5 to about 35 weight percent, from about 5 to about 30 weight percent, from about 5 to about 25 weight percent, from about 5 to about 20 weight percent, from about 5 to about 15 weight percent, from about 5 to about 10 weight percent, from about 10 to about 50 weight percent, from about 15 to about 50 weight percent, from about 20 to about 50 weight percent, from about 25 to about 50 weight percent, from about 30 to about 50 weight percent, from about 35 to about 50 weight percent, from about 40 to about 50 weight percent, from about 45 to about 50 weight percent, or from about 30 to about 40 weight percent based on the total weight of the coating. In one or more embodiments, the coating may comprise unpolymerized natural resin in an amount of 5 weight percent, 10 weight percent, 15 weight percent, 20 weight percent, 25 weight percent, 30 weight percent, 35 weight percent, 40 weight percent, 45 weight percent or 50 weight percent based on the total weight of the coating. Examples of an unpolymerized natural resin useful in the coating include, but are not limited to, a rosin, gum, polysaccharide, cellulose, soy resin, protein resin, polylactic acid, or combination thereof. In some embodiments, the coating may include one type of natural resin. In other embodiments, the coating may include combinations of two or more types of natural resin, including combinations of any two or more, three or more, four or more, five or more, etc. of the types of natural resin described herein.

In certain embodiments, ceramic particles are mixed with a curable binder composition comprised of specific monomers and/or oligomers, which serve as precursors for the final crosslinked polymer binder, as well as photoinitiators, dispersants, adhesion promoters, wetting agents, thermoplastics, natural resins, or combinations thereof. Coated particles (e.g., silane-coated particles) may be utilized in various embodiments to enhance adhesion between the cured binder composition and the ceramic particle.

According to various embodiments, the UV or EB curable binder mixture can be selected from three generic classes: 1) UV-curable water-based, 2) UV-curable epoxy comprised of UV-curable silicone or UV-curable epoxy, and 3) UV-curable (meth)acrylates (e.g., acrylated urethanes, polyesters, rubbers, and thioesters), where "(meth)acrylates" refers to methacrylates, acrylates, acrylamides, acryloyl morpholines, vinyl esters, and combinations thereof.

Examples of curable binder mixture components usable in various embodiments include, but are not limited to, an acrylated water-based resin blend, cycloaliphatic epoxy terminated oligomers and monomers and a cationic photoinitiator, acrylated terminated oligomers and monomers and a free-radical initiator, acrylated polyurethane, acrylated rubber, acrylated monomer and combinations thereof. The curable binder mixture of various embodiments includes at least one type of precursor component. In certain embodiments, the curable binder mixture includes one type of precursor component (e.g., one type of UV-curable water-based urethane, one type of acrylated polyurethane, one type of acrylated monomer, one type of acrylated rubber, one type of cycloaliphatic epoxy oligomer, one type of acrylic resin, one type of cycloaliphatic epoxy silicone, one type of polyester acrylate, one type of melamine acrylate, one type of aliphatic urethane acrylate, etc.). In other embodiments, the curable binder mixture may include combinations of two or more types of precursor components, including combinations of any two or more (e.g., cycloaliphatic epoxy terminated oligomers and monomers; acrylated monomer and acrylated rubber; acrylated terminated oligomers and monomers; etc.), three or more (e.g., polyester acrylate, aliphatic urethane acrylate, and acrylic resin; melamine acrylate, aliphatic urethane acrylate, and acrylic resin; etc.), four or more, five or more, etc. of the types of precursor components described herein. Mixtures of precursor ingredients can be used to optimize coating properties, such as flexibility, toughness, elongation, particle adhesion, separator adhesion, porosity, and ionic conductivity. One non-limiting example of precursors that benefit from mixtures of such is acrylated ingredients.

In various embodiments, the ratio of the one or more oligomers to the one or more monomers may be altered (e.g., to alter the adhesive and elastic properties of the coating). For example, in some embodiments, the one or more precursors consist of 100% oligomer(s). In other embodiments, the one or more precursors include at least about 20 weight percent more of the one or more oligomers than the one or more monomers (e.g., about 20 to about 50 weight percent more of the one or more oligomers than the one or more monomers).

According to certain embodiments, the UV or EB cured coating may comprise rubber polymers (e.g., polyisoprene-based rubbers, polybutadiene-based rubbers, etc.). Examples of curable binder mixture components useful in the production of a rubber polymer-based UV or EB cured coating include, but are not limited to, isoprene, butadiene, cyclopentadiene, ethylidene norbornene, vinyl norbornene, and combinations thereof. In some embodiments, the curable binder mixture components may be functionalized to include reactive groups (e.g., carboxylate, acrylate, vinyl, vinyl ether, or epoxy groups) that enhance ceramic particle adhesion and/or improve UV or EB induced crosslinking.

The rubber polymer is not limited to any particular polymeric backbone. In one or more embodiments, the UV or EB cured coating may comprise a rubber polymer having an isoprene backbone with one or more reactive functional groups. Illustrative rubber polymer backbones include, but are not limited to, a carboxylated methacrylated isoprene backbone, a carboxylated methacrylated butadiene backbone, a butadiene backbone, and combinations thereof. In certain embodiments, the UV or EB cured coating may comprise multiple different polymeric backbone segments (e.g., isoprene-butadiene copolymers).

In one or more embodiments, cycloaliphatic epoxy terminated oligomers and monomers and a cationic photoinitiator are included in the resin mixture. This mixture is mixed with non-basic ceramic sand, applied to a separator, and UV or EB cured on the separator. The cycloaliphatic epoxy terminal group can be on virtually any polymeric backbone. In certain embodiments, the polymeric backbone is a hydrocarbon or silicone backbone. Mixtures of cycloaliphatic epoxy ingredients also can be selected to optimize coating properties, such as flexibility, toughness, elongation, particle adhesion, separator adhesion, and ionic conductivity.

In some embodiments, an acrylated water based resin blend is mixed with ceramic particles, applied to a separator, and UV or EB cured on the separator.

In other embodiments, acrylated terminated oligomers and monomers and free-radical initiators are included in the resin mixture. This resin mixture is mixed with ceramics, applied to a separator, and UV or EB cured on the separator. In certain embodiments, the acrylated composition is EB cured and thus, the photoinitiator is unnecessary and should not be included in the formulation.

The acrylated terminal group can be on virtually any polymeric backbone. In certain embodiments, the polymeric backbone can resist hot electrolyte and not react with ions (e.g., lithium ions). Illustrative backbones include, but are not limited to, rubbers, silicones, thioesters, acrylics, styrene acrylics, urethanes, fluorinated hydrocarbons, hydrocarbons, and polyesters.

In certain embodiments, polyvinylidene fluoride (PVDF) binder is not used. PVDF requires dissolution in N-methyl-2-pyrrolidone (NMP), a dangerous solvent. When used, NMP must be captured and recycled in certain situations, as it is too dangerous for workers to breath and a hazardous pollutant that cannot be exhausted into the environment.

Further, various embodiments do not primarily utilize thermoplastic binder to hold ceramic particles in place. When the melt point of the thermoplastic is reached, the ceramic particles would be free to move. In contrast, the ceramic particles of various present embodiments lacking thermoplastic binder remain adhered to both the polymer of the UV or EB cured coating and to the separator.

As discussed above, additional ingredients may be mixed with the curable binder composition in various embodiments. Illustrative additional ingredients (in addition to the thermoplastic particles and natural resin discussed above) usable in the coatings of various embodiments include, but are not limited to, reactive diluents, dispersing agents, wetting agents, dark cure additives, alternative photoinitiators, co-initiators, solvents, blowing agents, crosslinkers, and combinations thereof. Non-limiting examples of such additives are detailed in the Examples herein. In some embodiments, the coating may include one type of additional ingredient (e.g., one dispersing agent, wetting agent, dark cure additive, alternative photoinitiator, co-initiator, solvent, blowing agent, thermoplastic particle, or natural resin, etc.). In other embodiments, the coating may include combinations of two or more types of additional ingredients, including combinations of any two or more (e.g., dispersing agent and cationic photoinitiator; dispersing agent and solvent; photoinitiator and solvent; etc.), three or more (dispersing agent, photoinitiator and defoamer; dispersing agent, pH adjuster and crosslinker; dispersing agent, photoinitiator and solvent; etc.), four or more (dispersing agent, photoinitiator, co-initiator and solvent; etc.), five or more (dispersing agent, photoinitiator, co-initiator, pH adjuster and solvent; etc.), etc. of the types of additional ingredients described herein. Most of these are minor ingredients and are likely to be in the range from about 0 to about 10% by weight, from about 0 to about 5% by weight, or from about 0 to about 2% by weight. In some embodiments, the slurry does not comprise a photoinitiator.

Illustrative reactive diluents useful as additional ingredients include, but are not limited to, isobornyl acrylate, polyethylene glycol diacrylate, hexanediol diacrylate, alkyoxylatedhexanedioldiacrylate, and combinations thereof.

Examples of crosslinkers useful as additional ingredients include, but are not limited to, monofunctional acrylates, difunctional acrylates, multifunctional acrylates, other vinyl compounds, and combinations thereof. If used, acrylates may be linear, branched (e.g., 2-ethylhexyl acrylate, isostearyl acrylate, etc.), cyclic (e.g., dicyclopentanyl acrylate, n-vinyl caprolactam, etc.), or aromatic (e.g., phenoxyethylacrylate). Illustrative difunctional and multifunctional acrylates include, but are not limited to, 1,6-hexandiodi(meth) acrylate, 1,9-hexandiodi(meth)acrylate, tricyclodecanedimethanol diacrylate, and combinations thereof.

Illustrative photoinitiators useful as additional ingredients include, but are not limited to, benzophenone, hydroxyacetophenone, methylbenzophenone, 4-Phenylbenzophenone, 4,4'-Bis(diethyl amino)benzophenone, Michler's Ketone, 4-(2-hydroxyethoxy)phenyl-(2-hydroxy-2-methylpropyl) ketone, other benzophenone derivatives, benzyldimethyl ketal, 2-benzyl-2-N,N-dimethylamino-1-(4-morpholinophenyl)-1butanone, 2-mercaptobenzoxazole, camphorquinone, 2-hydroxy-2-methyl-1-(4-t-butyl)phenylpropan-1-none, 2-methyl-1-[4-(methylthiophenyl)-2-morholinopropanone, maleimides, 2,4,5-trimethylbenzoly-diphenyl phosphine oxides, bis(2,6-dimethyloxybenzoyl) 2,4,4-trimethylpentyl) phosphine oxide, bis(2,4,6-trimethylbenzoyl)-phenylphosphineoxide, propanone photoinitiators (e.g., oligo(2-hydroxy-2-methyl-1-[4-(1-methylvinyl)phenyl]propanone, 2-hydroxy-2-methyl-1-phenylpropan-1-one, and combinations thereof), oxide photoinitiators (e.g., bis(2,4,6-trimethylbenzoyl)), polymeric photoinitiators derived from the above photoinitiators, and combinations thereof.

Examples of wetting agents useful as additional ingredients include, but are not limited to, acetone, isopropyl alcohol, dimethyl carbonate, and combinations thereof.

Still further embodiments are directed to a coated separator comprising a separator; and any of the UV or EB cured coatings discussed above adhered to at least one surface of the separator. For instance, certain embodiments are directed to a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating.

Other embodiments are directed to an electrochemical device having a coated separator comprising a separator; and any of the UV or EB cured coatings discussed above adhered to at least one surface of the separator. For instance, certain embodiments are directed to an electrochemical device having a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. Other embodiments are directed to a method of making a coated separator or an electrochemical device incorporating a coated separator, said method comprising: mixing a ceramic particulate material with a curable binder mixture comprising one or more monomers, one or more oligomers, or a combination thereof to form a slurry; applying the slurry to at least one surface of a separator to form a slurry coated separator; and subjecting the slurry coated separator to UV or EB radiation, thereby curing the curable binder mixture and forming a UV or EB cured matrix. The UV or EB cured matrix adheres to at least one surface of the separator and the ceramic particulate material is distributed throughout the UV or EB cured matrix.

Figure 2:
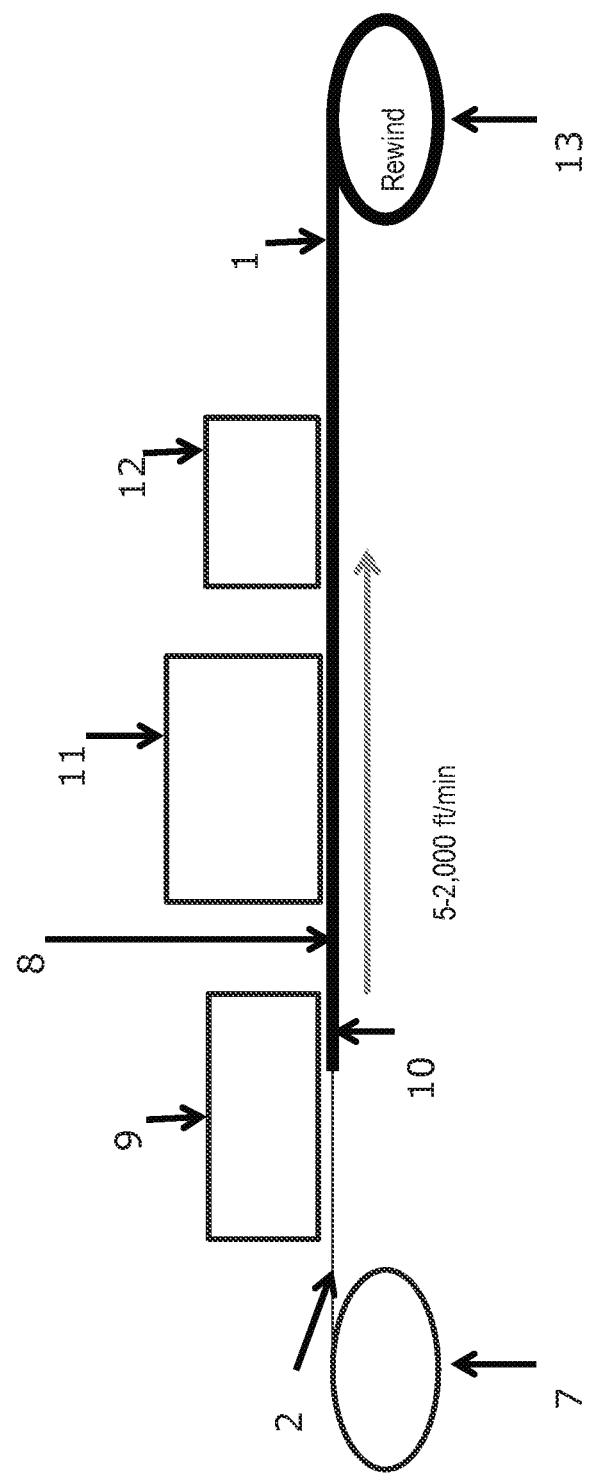
FIG. 2 is a schematic illustrating a system for coating a separator according to one or more embodiments.

FIG. 2 illustrates a system on which the slurry application and curing process steps may be performed, with the porous separator film 2 being unwound from a first spool 7, coated with the slurry 8 using a liquid coater 9, passing the slurry coated film separator 10 under an optional blower/heater 11 to remove solvent (not shown), and then passing the slurry coated film separator 10 under a UV or EB source 12 (e.g., lamp(s)) to cure the slurry 8. The coated separator 1 may then optionally be wound on a second spool 13. In certain embodiments, the system does not have and/or utilize the optional blower/heater 11.

A method of making a coated separator according to certain embodiments is shown in FIG. 3. Said method comprises: combining and mixing a ceramic particulate material with a curable binder mixture comprising at least one selected from the group consisting of monomers, oligomers and combinations thereof to form a slurry (step 101); applying the slurry to at least one surface of a separator to form a slurry coated separator (step 102); and subjecting the slurry coated separator to UV or EB radiation (step 104), thereby curing the curable binder mixture. The process may optionally include adding a solvent in step 101 to, for example, control consistency of the slurry. In the event a solvent is added in step 101, the process may optionally include removing the solvent in optional step 103 before the slurry is cured in step 104. The process may also include a step 105 of assembling a battery with the coated separator. The battery may include, for example, an anode, cathode, electrolyte and the coated separator. The illustrative process illustrated in FIG. 3 need not include every step, and the steps may be performed individually without performing the other steps.

In certain embodiments, the separator is stretched prior to applying the slurry to at least one surface of a separator to form a slurry coated separator (step 102). In other embodiments, the slurry is applied to an unstretched separator film to at one surface of a separator to form a slurry coated separator (step 102) and dried before the dried slurry coated separator is stretched and then UV or EB cured (step 104).

According to various embodiments, conventional mixing technology may be used to prepare the slurry of the UV or EB curable binder components and the ceramic particles. The slurry is then coated on the separator and cured using either UV actinic radiation or EB radiation. In various embodiments, the coating thickness of the slurry is nominally less than 10 µm and usually less than 4 µm. In certain embodiments, a minimum slurry coating thickness is 0.1-0.3 µm. For example, in certain embodiments, the slurry coating thickness is between about 0.1 and about 10 µm, between about 0.3 and about 10 µm, between about 0.1 and about 3

μm, between about 0.3 and about 3 μm, between about 0.1 and about 1 μm, between about 0.3 and about 1 μm, between about 1 and about 3 μm, between about 2 and about 3 μm, between about 2 and about 4 μm, between about 2 and about 5 μm, between about 2 and about 6 μm, between about 2 and about 7 μm, between about 2 and about 8 μm, between about 2 and about 9 μm, between about 3 and about 4 μm, between about 3 and about 5 μm, between about 3 and about 6 μm, between about 3 and about 7 μm, between about 3 and about 8 μm, between about 3 and about 9 μm, or between about 3 and about 10 μm. In some embodiments, the thickness of the slurry coating is about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, or about 10 μm.

In one or more embodiments, this minimum coating thickness is achieved using an offset press. One or both sides of the separator are normally coated and the coatings UV or EB cured. UV curing refers to the spectrum from 200-500 nm. Although 400-460 nm is technically in the purple-blue visible, UV lamps emit considerable energy in this region too, and well chosen "UV" photoinitiators absorb light at these frequencies. The UV-Visible photoinitiators are especially well suited to this application as these long wave lengths are more capable of penetrating deeper into the liquid coating. This is extremely critical in some of the various embodiments because many of the thermally conductive particles are white and are very efficient at blocking UV light. For these applications, it is usually best to use lamps with output maximum in the UVC and visible ranges. A mixture of photoinitiators is typically used to take advantage of any light that penetrates into the coating past the particles.

Water or solvent may also be added to the UV or EB curable binder composition to, for example, increase the porosity of the cured coating or to adjust the flow and rheology of the liquid coating to make it suited to different application methods. Examples of different slurry application methods include, but are not limited to: curtain coating, roll, gravure, flexographic, screen, rotary screen, letterpress, offset, slot die, ink jet (e.g., ink jet printer), and any other printing method suitable for coating film. If water or solvents are added to the binder, then they may be removed in some embodiments from the coating before UV or EB curing. Some of the suitable solvents are those that have low toxicity, have minimal regulation, evaporate quickly and do not have a high affinity for the coating ingredients or the particles in the slurry. Various solvents are available and may be used in various embodiments. Examples of solvents usable in various embodiments include, but are not limited to, glycol ether and alcohols (e.g., isopropyl alcohol). As discussed above, the solvent does not include NMP in certain embodiments. Forgoing the use of NMP eliminates the necessity of solvent capture and recycle, and thus, any cost and time associated with such processes.

Water or solvent, if utilized, may be present in the slurry in amounts of up to about 70%. In some embodiments, the solvent is present in the slurry in an amount between about 15 and 20%, between about 10 and 20%, or between about 5 and 20%. In certain embodiments, the solvent is present in the slurry in an amount less than about 20%, less than about 15%, less than about 10%, or less than about 5%. Amounts of solvent or water less than about 20% allow rapid evaporation.

In various embodiments, the separator includes a top surface and a bottom surface, and applying the slurry to at least one surface of the separator to form a slurry coated separator comprises applying the slurry to the top surface or the bottom surface, but not to both the top surface and the bottom surface. In other embodiments, applying the slurry to at least one surface of the separator to form a slurry coated separator comprises applying the slurry to both the top surface and the bottom surface. The slurry may be applied to the separator in a continuous coat, a pattern, or a combination thereof, and may completely or partially cover the top surface of the separator, bottom surface of the separator, or a combination thereof. In some embodiments, the slurry is applied as a continuous coat to the top surface and as a continuous coat to the bottom surface. In other embodiments, the slurry is applied as a pattern to the top surface and in a pattern to the bottom surface. In still other embodiments, the slurry is applied as a pattern to the top surface and as a continuous coat to the bottom surface. In further embodiments, the slurry is applied as a pattern to the bottom surface and as a continuous coat to the top surface.

In some embodiments, the resulting slurry is applied on the polymeric separator as a continuous coat. Illustrative application methods that can be used to apply this liquid slurry include, but are not limited to: roll coat, screen, curtain, gravure, reverse gravure, slot die, flexographic, letterpress, offset, ink jet (e.g., ink jet printer), and a combination thereof. In some embodiments, there is a brief drying period (e.g., air or hot air across the web) to drive the water or solvent off and produce a porous liquid coating. The slurry is then exposed to UV actinic radiation or EB radiation to polymerize the resin and bind the ceramic particles to each other and to the separator. In one or more embodiments, a chilled roll is used during the UV or EB curing exposure. One or both sides of the separator can be coated with this continuous coat process.

In various embodiments, the resulting slurry is printed on the separator in a pattern. Examples of application methods that can be used to apply this liquid slurry in a printed pattern include, but are not limited to: screen, curtain coat, gravure, reverse gravure, flexographic, letterpress, offset, ink jet (e.g., ink jet printer), and a combination thereof. Different printing methods are used to achieve coatings of different thickness and resolutions. The order of printing techniques listed is from thickest to thinnest as well as from coarsest to fineness of resolution. Printed patterns may require less airflow and drying as more surface is exposed. After application, the slurry is then exposed to UV actinic radiation or EB radiation to polymerize the resin and bind the ceramic particles to each other and to the separator. In one or more embodiments, a chilled roll is used during the UV or EB curing exposure. One or both sides of the separator can be coated with this pattern print process.

Figure 27:
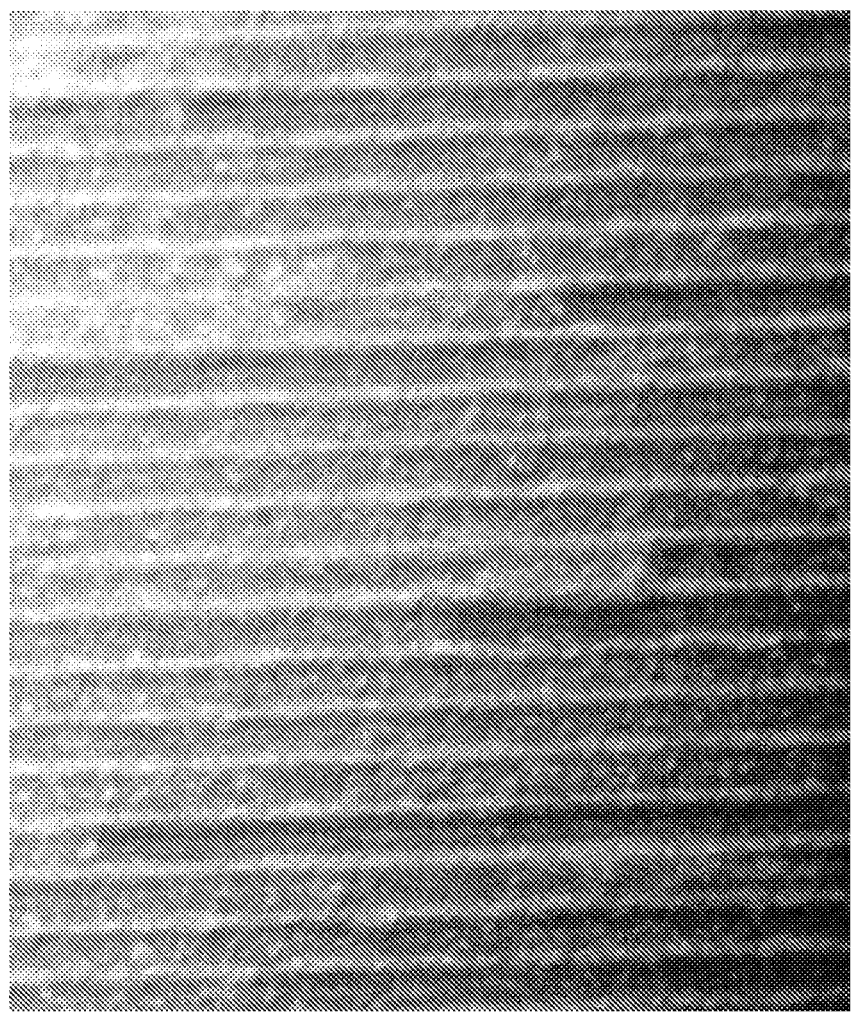
FIG. 27 is a photograph of a portion of a coated separator according to one or more embodiments, the coated separator printed with a row pattern parallel to the web or machine direction of a separator film.
Figure 28:
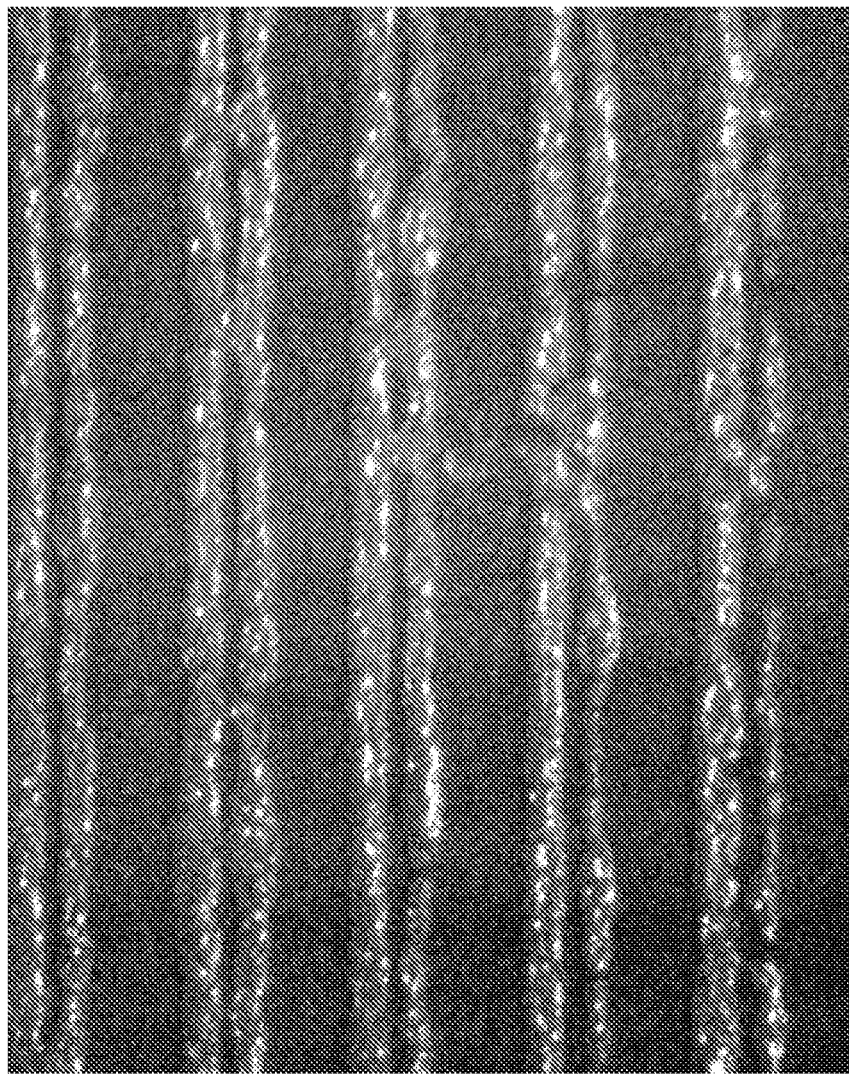
FIG. 28 is a photograph of a portion of a coated separator according to one or more embodiments, the coated separator printed with a row pattern transverse to the web or machine direction of a separator film.
Figure 29:
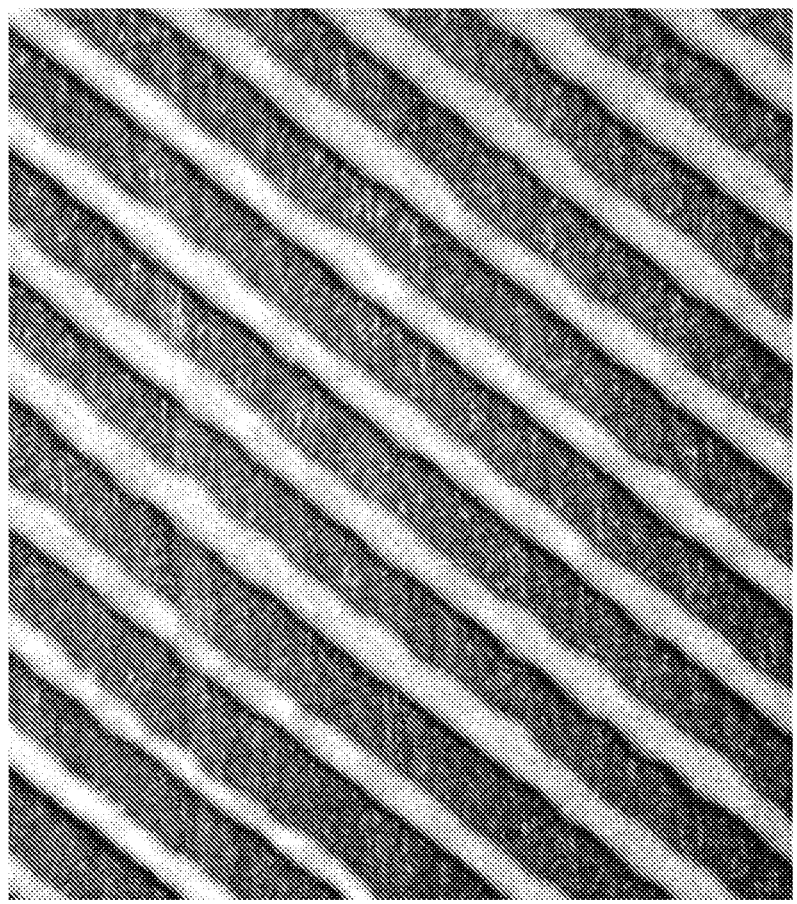
FIG. 29 is a photograph of a portion of a coated separator according to one or more embodiments, the coated separator printed with a row pattern diagonal to the web or machine direction of a separator film.
Figure 30:
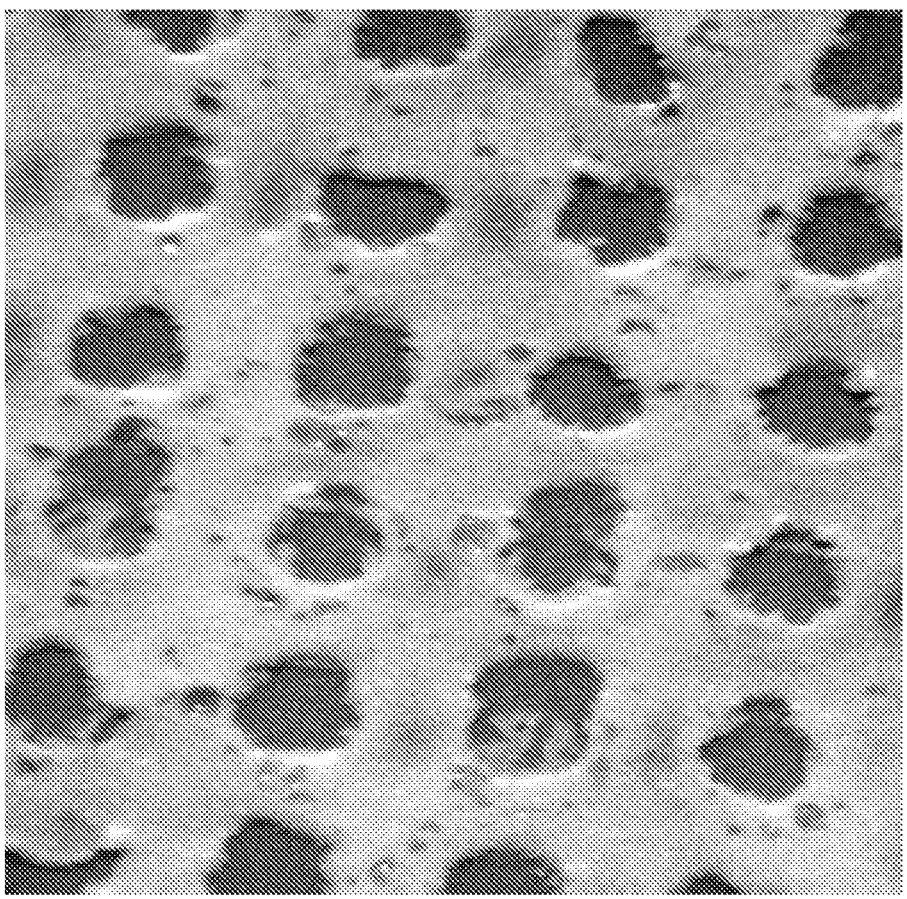
FIG. 30 is a photograph of a portion of a coated separator according to one or more embodiments, the coated separator printed with a perforated pattern diagonal to the web or machine direction of a separator film.
Figure 31:
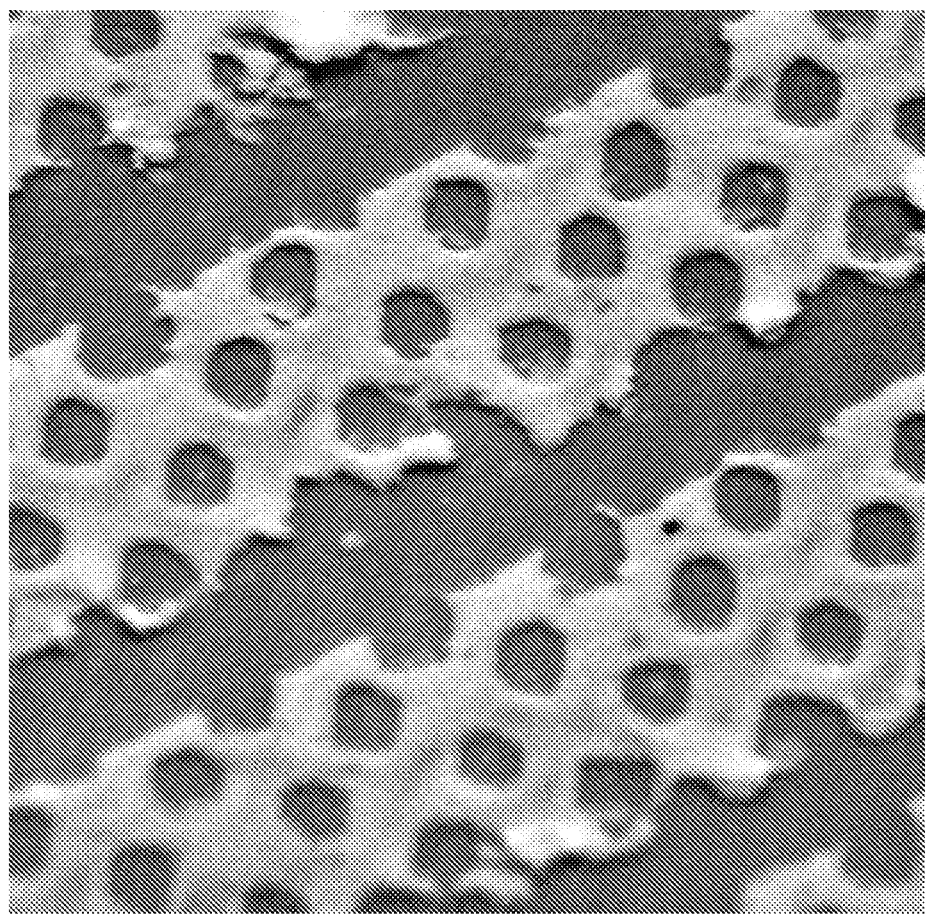
FIG. 31 is a photograph of a portion of a coated separator according to one or more embodiments, the coated separator printed with a perforated row pattern diagonal to the web or machine direction of a separator film.

In certain embodiments, the coating may be applied in a pattern that reduces shrinkage of the separator, increases tear resistance of the separator, or a combination thereof. For example, the coating may be printed on the separator parallel to a machine direction to reduce shrinkage of the separator. FIG. 27 is a photograph of a separator coating printed parallel to a machine direction. In further embodiments, the coating may be printed on the separator transverse to the machine direction to increase tear resistance of the separator. FIG. 28 is a photograph of a separator coating printed transverse to the machine direction. In still further embodiments, the coating may be printed on the separator diagonally to the machine direction to increase tear resistance of the separator and reduce shrinkage of the separator. FIG. 29 is a photograph of a separator coating printed diagonally to the machine direction. Exemplary patterns include, but are not limited to, parallel rows (FIGS. 27-29 and 31), a perforated pattern (FIGS. 30 and 31), a cross-hatch pattern, and combinations thereof.

In certain embodiments, the slurry comprises UV water-based matrix components and is printed on the separator in a pattern using flexographic printing. In other embodiments, the slurry comprises urethane and/or rubber matrix components and is printed on the separator in a pattern using offset printing. According to some embodiments, the slurry comprises water-based matrix components and is printed on the separator in a pattern using an application method other than offset printing.

Prior art methods do not teach or utilize patterned cured separator coatings as set forth in the present disclosure. Applying the slurry to the separator in a pattern has many advantages. For instance, patterning the slurry allows for the use of less slurry (e.g., less binder and ceramic particulate material) and thus, a reduction in material costs. In some embodiments, the amount of binder used in the case of pattern coating is two times less than that used in the case of continuous coating. While providing the same safety benefits as a continuous coating, a pattern coating allows for improved coated separator porosity and increased slurry application rate, as compared to a continuous coating.

The separator of various embodiments is not particularly limited with regard to type, composition or form. However, the separator may be limited with regard to function. For example, in certain embodiments, the separator must at least be capable of serving as an electrical barrier between the cathode and the anode of an electrochemical device (e.g., a battery), while allowing ions (e.g., lithium ions) to flow through pores of the separator. In other words, when used in an electrochemical device (e.g., a battery), the separator must be an electrical barrier, but not an ionic barrier. A variety of separators are commercially available and suitable in various embodiments. In certain embodiments, the separator has a shut-down mechanism. For example, the separator may be comprised of thermoplastic polymers that flow when exposed to heat. This heat-induced polymer flow causes pores in the separator to close, and thus, the separator becomes a barrier to ionic flow. Hence, in the event of mild or gradual overheating, the thermoplastic separator shuts the battery down. In some embodiments, the separator is configured to shut-down at a particular temperature. For example, in certain embodiments, the separator is configured to shut-down in response to being heated to a temperature of 100° C. or higher. In other embodiments, the separator is configured to shut-down in response to being heated to a temperature of 105° C. or higher, 110° C. or higher, 115° C. or higher, 120° C. or higher, 125° C. or higher, 130° C. or higher, 135° C. or higher, 140° C. or higher, 145° C. or higher, 150° C. or higher, 155° C. or higher, 160° C. or higher, 165° C. or higher, 170° C. or higher, 175° C. or higher, 180° C. or higher, 185° C. or higher, 190° C. or higher, 195° C. or higher, or 200° C. or higher. In various embodiments, the upper shut-down temperature limit is the flammability of the particular electrolyte used or the battery casing. In certain embodiments, the separator is configured to shut-down in response to being heated to a temperature from 100° C. to 200° C., from 110° C. to 200° C., from 120° C. to 200° C., from 100° C. to 140° C., from 110° C. to 140° C., or from 120° C. to 140° C. In other embodiments, the separator is configured to shut-down in response to being heated to a temperature of 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C. The shut-down temperature, according to various embodiments, depends on the particular polymer(s) used to make the separator. For example, the shut-down temperature of trilayer separators is often determined by the melting temperature of the center layer (e.g., polyethylene).

Examples of separators usable in various embodiments include, but are not limited to, polymeric membranes or film comprising polyethylene (PE), polypropylene (PP) or combinations thereof (e.g., coextruded blends of PE and PP). In some embodiments, the separator may have a single layer (e.g., a single polymeric film). In other embodiments, the separator may include two or more layers, including two or more, three or more, four or more, five or more, etc. layers. In certain embodiments, the separator is a trilayer separator. A non-limiting example of a trilayer separator is a PP\PE\PP trilayer separator.

The uncoated separator may have a thickness between about 5 and about 25 μm. In certain embodiments, the thickness of the uncoated separator is between about 5 and about 20 μm, between about 10 and about 20 μm, between about 15 and about 20 μm, between about 10 and about 25 μm, or between about 15 and about 25 μm.

The cured coating of various embodiments includes at least one type of curable binder mixture. In some embodiments, the cured coating may include combinations of two or more types of curable binder mixtures, including combinations of any two or more, three or more, four or more, five or more, etc. of the types of curable binder mixtures described herein.

In cases where no light can penetrate to the base of the coating, then electron beam curing can be used. High energy electrons (75-300 kV) with a dosage of about 10 to about 40 kGy can penetrate the liquid slurry and cure the coating all the way to the separator (e.g., polyolefin film or trilayer separator).

In certain embodiments, curing may be carried out at a speed between about 5 and about 2000 ft/min. at room temperature. An inert environment may be necessary, in some embodiments, if EB is used. However, in various embodiments using UV curing, an inert environment is not required.

In various embodiments, radiation dosages between about 1 and about 100 kGy are suitable. In certain embodiments, lamps may be powered between about 50 and about 1000 W/in.

According to various embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be present on the separator as a continuous coat, a pattern, or a combination thereof, and may completely or partially cover the top surface of the separator, bottom surface of the separator, or a combination thereof. According to various embodiments, the coated separator suppresses ionic flow through pores of the separator and remains electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.).

According to various embodiments, the UV or EB cured matrix is nonionic. In certain embodiments, the ceramic particulate material is bound to the UV or EB cured matrix, bound to the separator by the UV or EB cured matrix, and distributed uniformly throughout the UV or EB cured matrix. This is distinct from prior art methods using ionic materials, such as ionic polymer layers, which form channels/portals. The ionic polymer layers themselves aid in ion transport and do not have a binding function. If anything, such ionic materials of the prior art bind the polymers to themselves. Charge and discharge rates of batteries using such separators of the prior art are limited because ions have to travel on the polymer.

Certain embodiments do not require the use of UV or EB curing. For example, the precursor mixture may comprise a water-based acrylic, water-based urethane, or combination thereof which is cured by a method other than UV or EB curing. Such embodiments are useful in the case where the press does not have the equipment for UV or EB curing. However, in one or more embodiments which do not use UV or EB curing, in order to obtain the chemical resistance to withstand the harsh electrolyte and lithium ion environment, a cross-linking agent is necessary. Examples of common cross-linking agents for this type of chemistry include, but are not limited to, (poly)aziridine(s), metal driers, and peroxides. Beyond the method not including UV or EB curing, certain embodiments which do not use UV or EB curing are not limited to any particular curing method. A non-limiting example of a curing method suitable in various embodiments which do not use UV or EB curing is forced-air curing.

The slurry of the embodiments utilizing a curing method other than UV or EB curing may comprise the same type and amounts of ceramic particulate material as that of the UV or EB curing embodiments. These slurries may also be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, ink jet (e.g., ink jet printer), or a combination thereof. As discussed above, prior art methods do not teach or utilize patterned cured separator coatings as set forth in the present disclosure. According to some embodiments, the cured coating is adhered to the top surface or the bottom surface of the separator, but not to both the top surface and the bottom surface. In other embodiments, the cured coating is adhered to both the top surface and the bottom surface of the separator.

According to various embodiments, UV or EB curing patterned separator coatings allows for a sharper, more defined pattern than curing patterned separator coatings via a curing method other than UV or EB curing. In certain embodiments, the sharper, more defined pattern obtained via UV or EB curing patterned separator coatings results in improved separator performance, as compared to that of patterned separator coatings cured via a method other than UV or EB curing.

One of the great disadvantages of prior art technology is the separator coating process. Such prior art coating process utilizes a PVDF binder and is extremely slow. It is much slower than the co-extrusion and biaxial orientation processes used to make the separator. Hence, the coating process becomes an off-line process. In fact, the solvent evaporation process of the prior art requires multiple lines (each longer than a football field) to keep up with each extruder. This is an extremely capital intensive process that requires a lot of people, equipment, and real estate to operate. Because the binder of various present embodiments cures instantly, various present embodiments overcome some of the time and economic constraints of other separator coating methods. Previous coating methods required a drying oven with an associated drying time. The faster the coating/drying, the longer the oven must be and therefore the larger the capital cost.

According to various embodiments, the cured coating may have a thickness between about 0.1 and about 10 µm. In certain embodiments, the thickness of the cured coating is between about 2 and about 3 µm, between about 2 and about 4 µm, between about 2 and about 5 µm, between about 2 and about 6 µm, between about 2 and about 7 µm, between about 2 and about 8 µm, between about 2 and about 9 µm. In some embodiments, the thickness of the cured coating is about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 2 µm, about 3 µm, about 4 µm, about 5 µm, about 6 µm, about 7 µm, about 8 µm, about 9 µm, or about 10 µm. The cured coating may comprise more than one layer of coating, and each layer does not necessarily need to be the same. In some embodiments, the coated separator may include two or more layers of coating, including two or more, three or more, four or more, five or more, etc. layers of any of the coatings described herein. When multiple coating layers are applied, each layer does not necessarily have to be of the same thickness, composition, or form (e.g. patterned or continuous).

According to various embodiments, the cured coated separator may have a thickness between about 6 and about 30 µm. In certain embodiments, the cured coated separator may have a thickness between about 6 and about 7 µm, between about 6 and about 8 µm, between about 6 and about 9 µm, between about 6 and about 10 µm, between about 6 and about 15 µm, between about 6 and about 20 µm, between about 6 and about 25 µm, between about 10 and about 30 µm, between about 15 and about 30 µm, between about 20 and about 30 µm, between about 25 and about 30 µm, between about 10 and about 15 µm, between about 10 and about 20 µm, between about 10 and about 25 µm. In some embodiments, the thickness of the cured coating is about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 21 µm, about 22 µm, about 23 µm, about 24 µm, about 25 µm, about 26 µm, about 27 µm, about 28 µm, about 29 µm, or about 30 µm.

In certain embodiments, the entire separator is made in a UV or EB process. Instead of making a coating, the curable binder mixture is cast or extruded and then UV or EB cured. A cross sectional view of a cured separator 14 according to one or more embodiments is illustrated in FIG. 23. The cured separator 14 of FIG. 23 comprises ceramic particles 5 in a porous UV-cured binder 6. All of the aforementioned chemistries and processes for producing a UV or EB curable coating, separator or electrochemical device may be utilized for producing a separator film with a UV or EB curing process or an electrochemical device incorporating such. The entire separator can be cast as a free standing film, cured against a release film or applied and cured directly on the cathode, anode, or electrolyte (e.g., liquid or solid electrolyte). In certain variations, the separator may include ceramic particles held together with a UV or EB cured matrix comprising a crosslink reaction product from one or more precursors selected from one or more monomers, one or more oligomers, or combinations thereof. According to various embodiments, the separator manufactured using UV or EB cured binders to bond ceramic particles together to form the separator has dimensional stability, high porosity, mechanical strength, efficient heat transfer, performs safely at high temperature and reduces the risk of thermal runaway by effectively dissipating heat evenly throughout an electrochemical cell.

Figure 25:
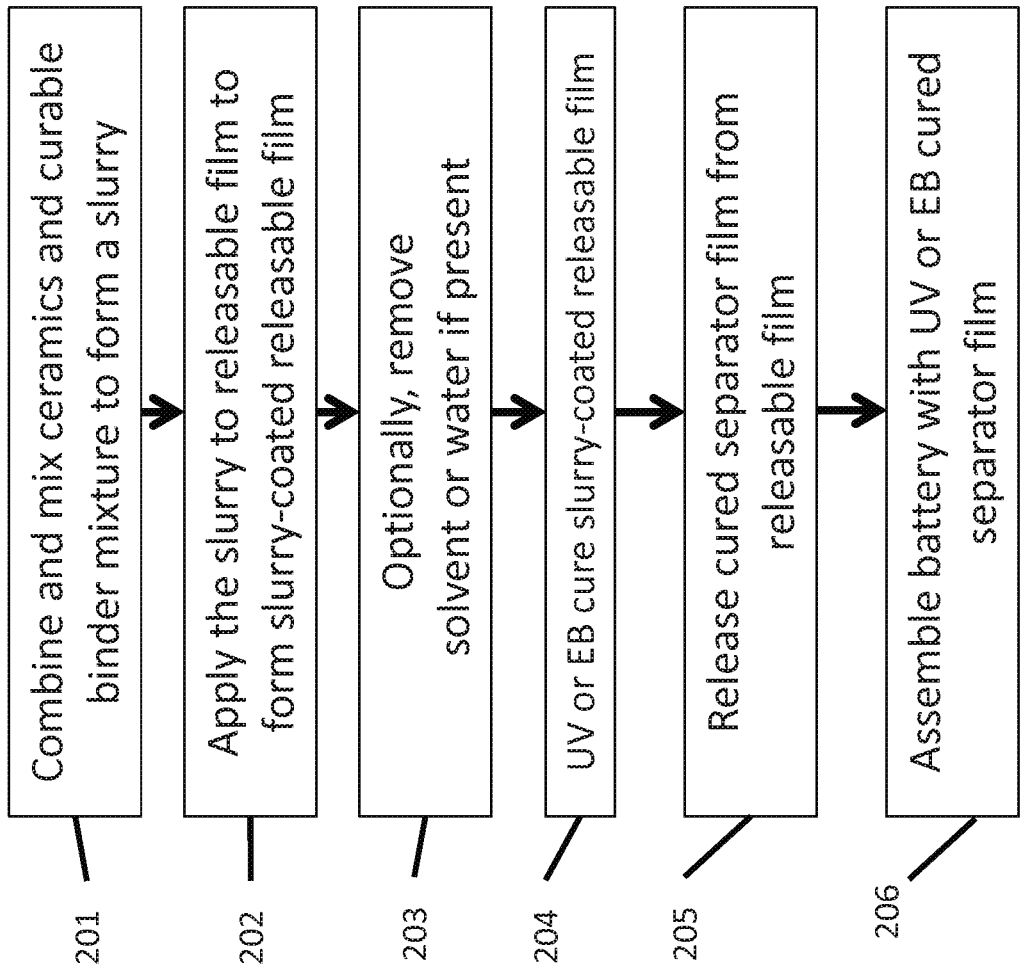
FIG. 25 is a flowchart illustrating steps for producing a battery having a separator according to one or more embodiments.

A porous, electrically insulating (e.g., non-conductive), and electrochemically resistant separator film that improves the operational safety of electrochemical devices using such separators may be formed by UV or EB curing a slurry of reactive liquid resin (e.g., monomers and/or oligomers) and ceramic particles. A method of making a cured separator according to certain embodiments is shown in FIG. 25. Said method comprises: combining and mixing a ceramic particulate material with a curable binder mixture comprising at least one selected from the group consisting of monomers, oligomers and combinations thereof to form a slurry (step 201); applying the slurry to a releasable film to form a slurry coated releasable film (step 202); and subjecting the slurry coated releasable film to UV or EB radiation (step 204), thereby curing the curable binder mixture and forming a cured separator film. The process may optionally include adding a solvent in step 201 to, for example, control consistency of the slurry. In the event a solvent is added in step 201, the process may optionally include removing the solvent in optional step 203 before the slurry is cured in step 204. The process may also include a step 205 of releasing (e.g., peeling) the cured separator film from the releasable film and a step 206 of assembling a battery with the cured separator film. The battery may include, for example, an anode, cathode, electrolyte and the cured separator film. The illustrative process illustrated in FIG. 25 need not include every step, and the steps may be performed individually without performing the other steps.

Figure 26:
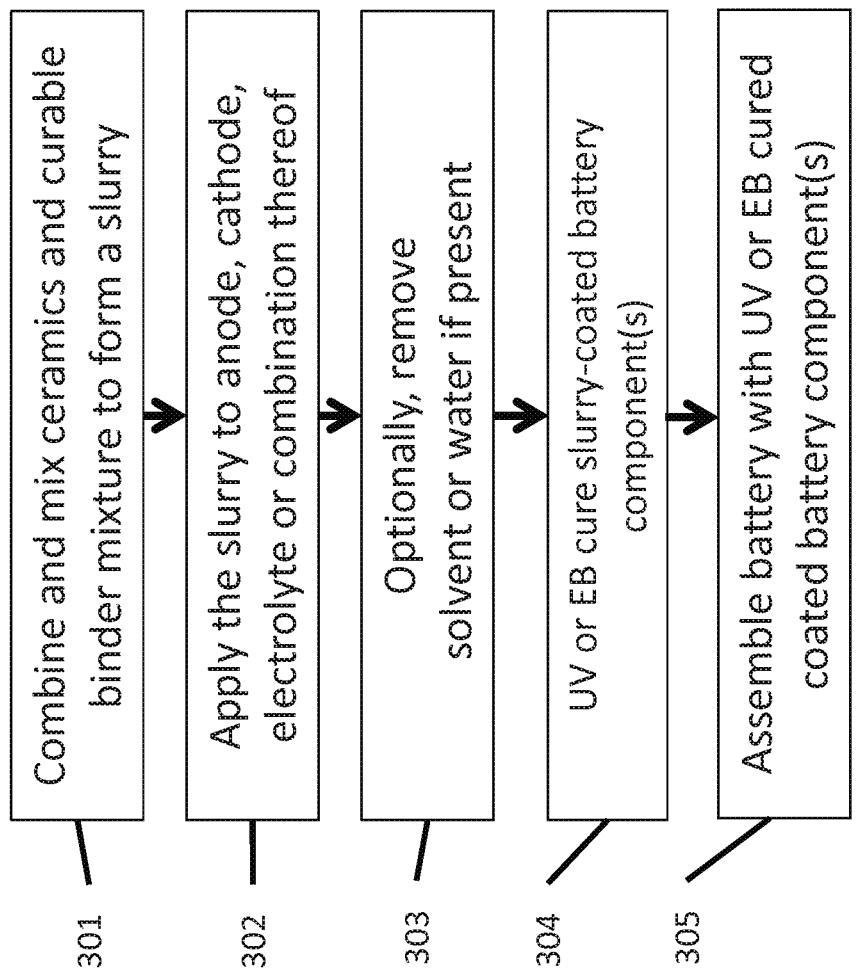
FIG. 26 is a flowchart illustrating steps for producing a battery having a separator according to one or more embodiments.

A method of making a cured separator according to further embodiments is shown in FIG. 26. Said method comprises: combining and mixing a ceramic particulate material with a curable binder mixture comprising at least one selected from the group consisting of monomers, oligomers and combinations thereof to form a slurry (step 301); applying the slurry directly to an anode, cathode, electrolyte, or combination thereof (step 302); and subjecting the slurry coated anode, cathode, electrolyte, or combination thereof to UV or EB radiation (step 304), thereby curing the curable binder mixture and forming a cured separator film. The process may optionally include adding a solvent in step 301 to, for example, control consistency of the slurry. In the event a solvent is added in step 301, the process may optionally include removing the solvent in optional step 303 before the slurry is cured in step 304. The process may also include a step 305 of assembling a battery with the cured separator film. The battery may include, for example, an anode, cathode, electrolyte and the cured separator film. The illustrative process illustrated in FIG. 26 need not include every step, and the steps may be performed individually without performing the other steps.

The separator may be cast in a single layer or multiple layers. FIG. 23 is an example of a single layer cured separator according to various embodiments. A cross sectional view of a multilayer cured separator 15 according to one or more embodiments is illustrated in FIG. 24. Each layer of the multilayer cured separator 15 of FIG. 24 comprises ceramic particles 5 in a porous UV-cured binder 6. These layers may be printed with printing processes to create porosity and paths that lithium ions can pass through to reach the cathode or anode. By printing multiple layers, a tortuous ionic path may be created. The separator may include continuous printed layers and/or patterned printed layers. A multilayer separator may include two or more of the same layers (e.g., same composition and/or pattern) or one or more differing layers (e.g., at least one layer differing in composition and/or pattern from the other layer(s)). For instance, all of layers 16, 17 and 18 of FIG. 24 may be patterned. The pattern of each of layers 16, 17 and 18 may be the same or different. In other embodiments, all of layers 16, 17 and 18 of FIG. 24 may be continuous. In further embodiments, one or more of layers 16, 17 and 18 of FIG. 24 may be continuous and one or more of layers 16, 17 and 18 of FIG. 24 may be patterned.

Various examples are set forth below. Each example is provided by way of explanation, not limitation of the disclosure. It will be apparent to those skilled in the art that various modifications and variations may be made without departing from the scope or spirit of the disclosure. For instance, features illustrated or described as part of one example, may be used in another example. Thus, it is intended that the disclosure cover such modifications and variations.

EXAMPLES

Example 1: Water-Based, UV-Curable, Aluminum Oxide-Filled Coatings on a Separator A water-based UV-curable binder composition was prepared and mixed with aluminum oxide powder in the proportions shown below in Table 1 to form a slurry.

TABLE 1

| UV-curable, water-based binder with aluminum oxide powder | | | |
|---|---|---|---|
| Ingredient | Manufacturer | Chemical Description | Weight % |
| Ucecoat 7689 | Cytec | Acrylated polyurethane water based dispersion | 16 |
| Ucecoat 7699 | Cytec | Acrylated polyurethane dispersion mixture | 16 |
| Tego 750W | Evonik | Modified polymer dispersant | 2.2 |
| 9038-95-3 | Altana | polysiloxane defoamer | 0.2 |
| Glycol ether | Dow Chemical | Solvent | 2 |
| N-methyl-diethanolamine | BASF | co-initiator | 0.8 |
| Irgacure 500 | BASF | Photoinitiator | 1.9 |
| Irgacure 819-dw | BASF | Photoinitiator | 0.9 |
| 26R-020212UP2 | Advanced Materials, LLC | Aluminum Oxide Power, 0.5-1 μm | 60 |
| | | Total | 100 |

The resulting slurry from Table 1 was applied on a 25-μm microporous PP\PE\PP trilayer separator film designed for use in lithium ion batteries (CELGARD 2325). Single- or double-sided coatings were made to the various sample separators. As seen in Table 2, a coating was made to a single side of the trilayer separator of Samples 1 and 3. In contrast, the trilayer separators of Samples 2 and 4 were coated on both sides (e.g., double-sided coatings). In addition, the coatings applied to the separators were either continuous porous coatings or patterned coatings. As seen in Table 2, a continuous porous coating was made to the trilayer separator of Samples 3 and 4. In contrast, the trilayer separators of Samples 1 and 2 were pattern coated. As summarized in Table 2, the trilayer separator of Sample #1 was pattern coated on a single side with the coating of Table 1, the trilayer separator of Sample #2 was pattern coated on both sides with the coating of Table 1, the trilayer separator of Sample #3 was continuous coated on a single side with the coating of Table 1, and the trilayer separator of Sample #4 was continuous coated on both sides with the coating of Table 1.

The continuous coatings were applied with a #1 K bar rod using an RK Control Koater. The coatings were then cured on a Miltec MUVI conveyor with one single Miltec MPI-400 lamp equipped with a Miltec 3 80-0004 UV bulb at a conveyor speed of 150 feet per minute. Each resulting aluminum oxide-filled UV coating was 4-6 μm thick. For instance, the Sample separators that were continuous coated on a single side had a resulting 4-6 μm thick aluminum oxide-filled UV coating on that single side, and the Sample separators that were continuous coated on both sides had a resulting 4-6 μm thick aluminum oxide-filled UV coating per side.

The patterned coatings were achieved with a flexographic hand proofer from Pamarco. The positions of the anilox and the rubber roller were reversed such that the applied pattern was that of the anilox and not the smooth coating that might result from the rubber roller. A 200 line per inch (lpi) 5.3 bcm anilox was used. This resulted in a 2-4 μm-thick aluminum oxide filled UV coating. For instance, the Sample separators that pattern coated on a single side had a resulting 2-4 μm thick aluminum oxide-filled coating on that single side, and the Sample separators that were pattern coated on both sides had a resulting 2-4 μm thick aluminum oxide-filled UV coating per side.

Both the ceramic coating resulting from continuous coating and the ceramic coating resulting from pattern coating appeared uniform, stable, and strongly adhered to the separator. Samples of coated and uncoated 25-μm microporous PP\PE\PP trilayer separator films were placed in an oven at 100° C. The uncoated Sample curled and showed signs of partial melting, becoming clear in spots. The coated Samples remained flat and with very little curl.

An uncoated separator was assembled into an 18650 Lithium ion coin cell. The cathode was a standard 14 mg/cm² NMC coated aluminum. The anode was lithium metal. The cell was charged and discharged at a C/10 rate. FIGS. 4A, 4B and 4C illustrate the voltage profile (C/10), charge rate performance and cycle performance (C/5), respectively, of the uncoated reference separator.

The coated separator Samples were assembled into an 18650 Lithium ion coin cell. The cathode was a standard 14 mg/cm² NMC coated aluminum. The anode was lithium metal. The cells were charged and discharged at a C/10 rate. FIGS. 5-8 illustrate the voltage profile of the coated Sample separators. As shown in Table 2 and the voltage profiles (C/10) of FIGS. 4A and 5-8, the batteries utilizing the coated separators were capable of being charged and discharged and the charge and discharge capacities were similar to that of the control.

TABLE 2

Coin Cell Test Results, 25-um Microporous Trilayer PP/PE/PP Separator with and without UV-cured ceramic coatings

Figure 5:
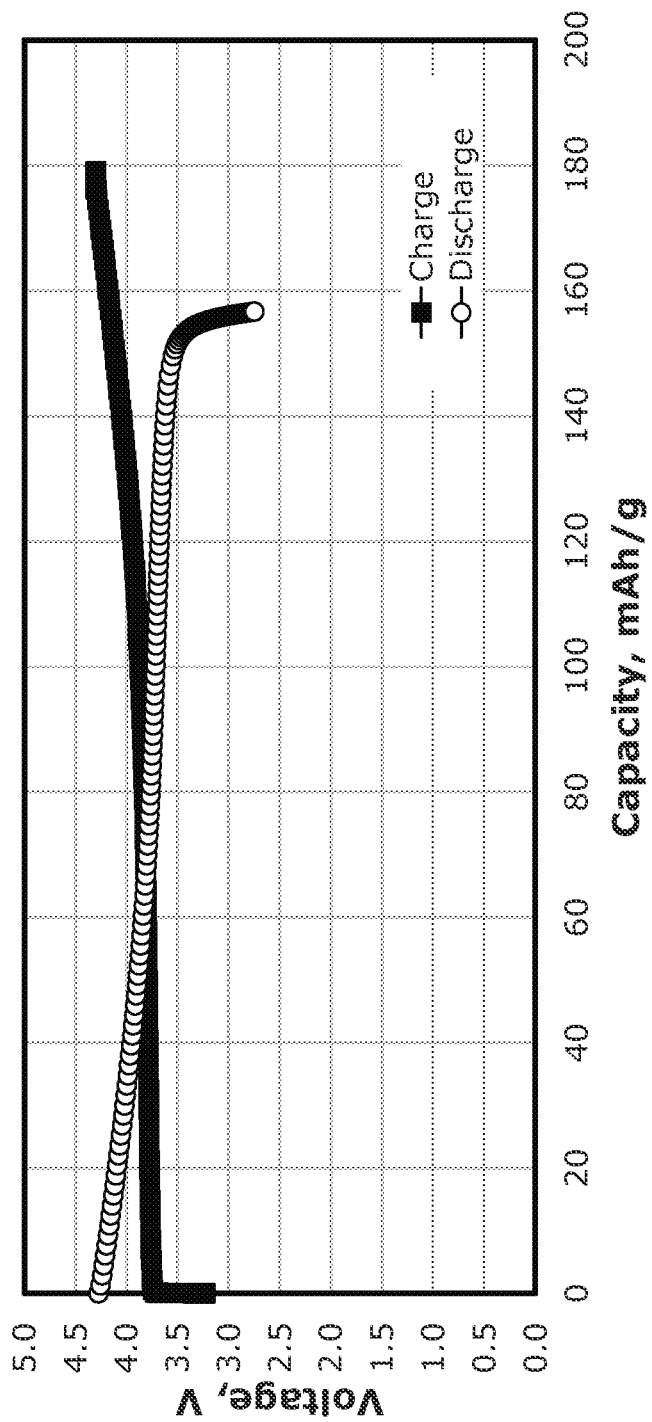
FIG. 5 illustrates the voltage profile of a coated separator according to one or more embodiments.
Figure 6:
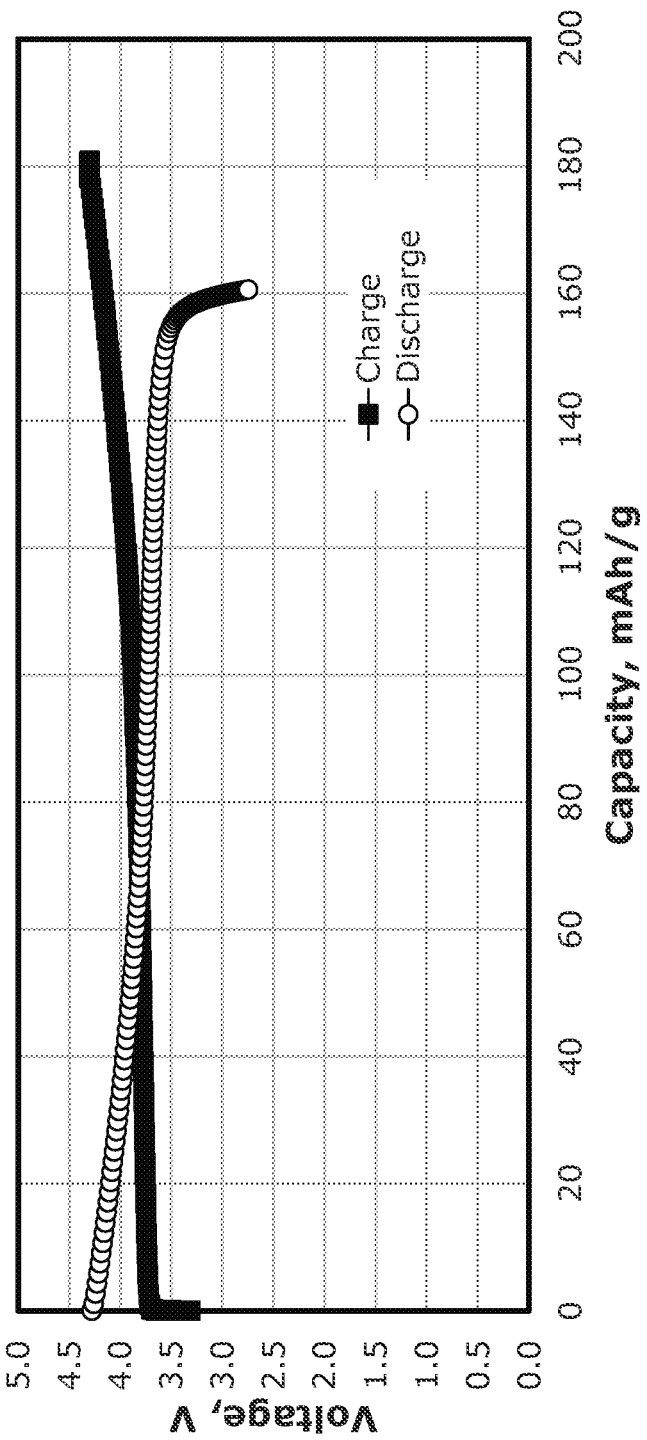
FIG. 6 illustrates the voltage profile of a coated separator according to one or more embodiments.
Figure 7:
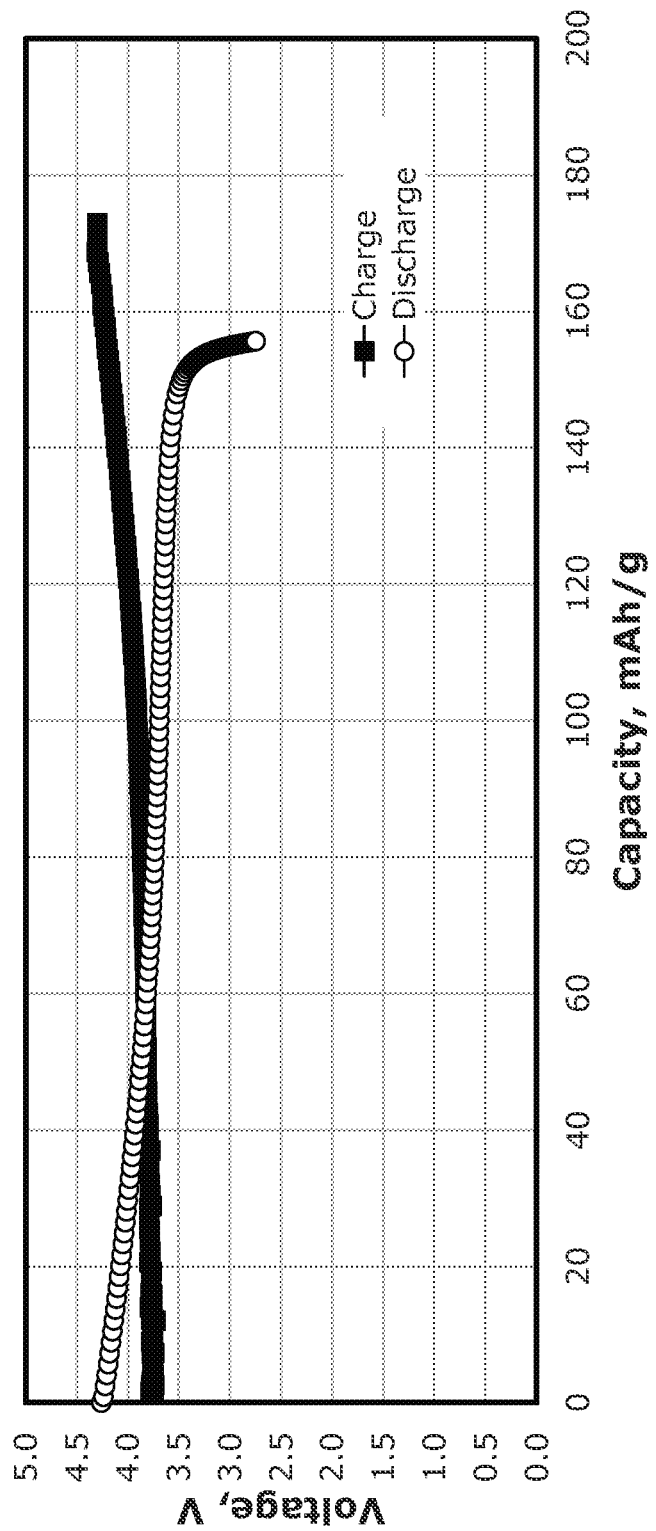
FIG. 7 illustrates the voltage profile of a coated separator according to one or more embodiments.
Figure 8:
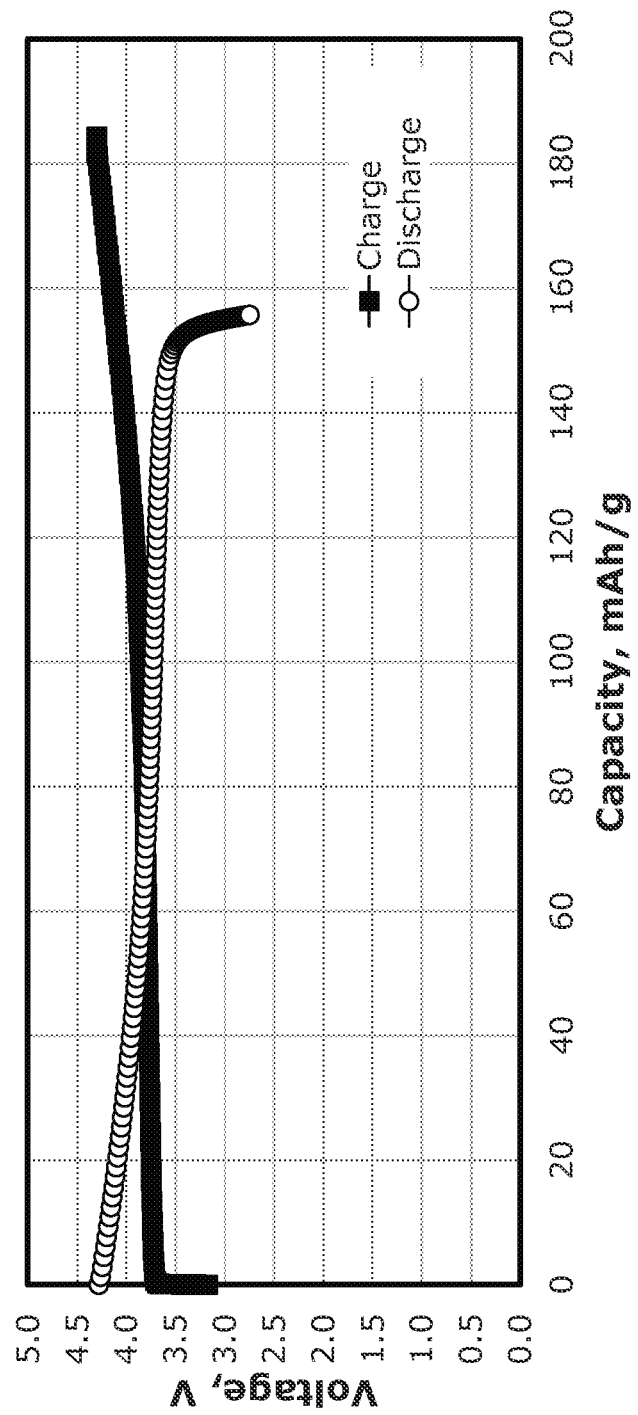
FIG. 8 illustrates the voltage profile of a coated separator according to one or more embodiments.

| Sample # | Condition | Voltage Profile | Charge mAh | Discharge mAh | Charge mAh/g | Discharge mAh/g | AhEff % |
|---|---|---|---|---|---|---|---|
| Control | Uncoated | FIG. 4A | 2.03 | 1.82 | 176 | 159 | 90 |
| 1 | Single sided pattern coated | FIG. 5 | 2.04 | 1.79 | 179 | 157 | 87 |
| 2 | Double sided pattern coated | FIG. 6 | 1.95 | 1.73 | 181 | 161 | 89 |
| 3 | Single sided continuous coated | FIG. 7 | 2.13 | 1.94 | 173 | 156 | 90 |
| 4 | Double sided continuous coated | FIG. 8 | 2.15 | 1.82 | 184 | 156 | 84 |

Another non-limiting example of a UV-curable water-based coating is set forth in Example 2.

Example 2: UV-Curable, Water-based Urethane Acrylate Coatings with Aluminum Oxide Powder on a Separator A UV-curable, water-based urethane acrylate binder composition was prepared and mixed with aluminum oxide powder in the proportions shown below in Table 3 to form a slurry.

TABLE 3

UV-curable, water-based urethane acrylate coating with aluminum oxide powder

| Ingredient | Manufacturer | Chemical Description | Weight % |
|---|---|---|---|
| Neorad R-440 | DSM NeoResins | Dispersed Urethane acrylate | 34.8 |
| Tego 750W | Evonik | Dispersing Agent | 2.2 |
| BYK-028 | BYK Chemie | Silicone Defoamer | 0.2 |
| Irgacure 500 | BASF | Photoinitiator | 1.9 |
| Irgacure 819-W | BASF | Photoinitiator | 0.9 |
| 26R-020212UP2 | Advanced Materials, LLC | Aluminum Oxide Powder, 0.5-1 μm | 60.0 |
| | | Total | 100.0 |

The resulting slurry from Table 3 was applied on 25-μm microporous PP\PE\PP trilayer separator film (CELGARD 2325). Single-sided and double-sided patterned coatings were achieved with a 120 lpi trihelical anilox. As in Example 1, the coated separators were tested in a NMC-Lithium metal half-cell. Results in Tables 4 and 5 and FIGS. 11A and 12A demonstrate that the single-sided and double-sided ceramic pattern coated separators function in a lithium ion battery. FIGS. 11B and 12B show the coated separator allows lithium ion charging and discharging at rates from 0.1 to at least 2C. At these rates, the coating is not impeding ion flow over that of the uncoated separator (FIG. 4B). FIGS. 11C and 12C show the battery successfully charging and discharging over 50 cycles.

Figure 11A:
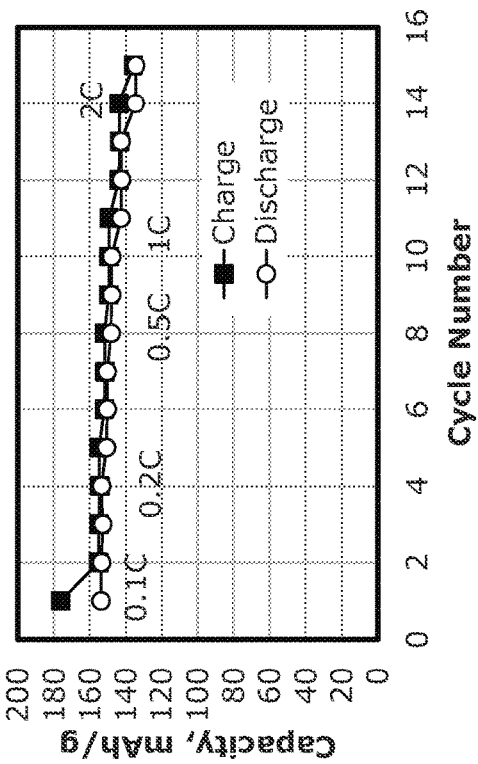
FIG. 11A illustrates the voltage profile of a coated separator according to one or more embodiments.
Figure 11B:
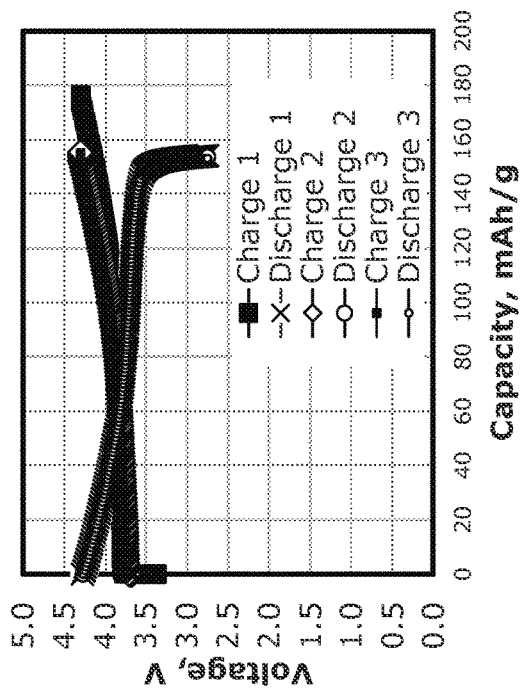
FIG. 11B illustrates the charge rate performance of a coated separator according to one or more embodiments.
Figure 11C:
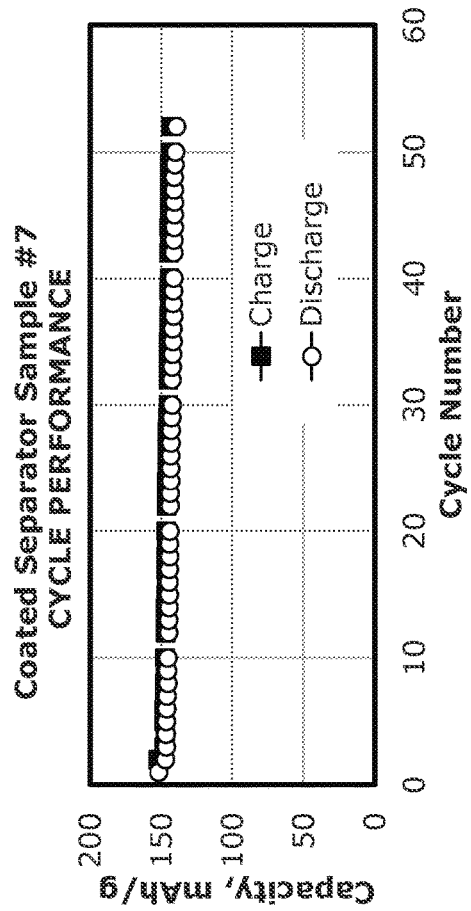
FIG. 11C illustrates the cycle performance of a coated separator according to one or more embodiments.

FIGS. 11A, 11B and 11C illustrate the voltage profile (C/10), charge rate performance and cycle performance (C/5), respectively, of the coated separator of Sample #7. The trilayer separator of Sample #7 was pattern coated on a single side with a 4-8 μm thick coating of the aluminum oxide filled UV coating of Table 3.

TABLE 4

Coin Cell Test Results, UV ceramic water-based urethane acrylate, single-sided pattern, coated separator compared to uncoated control separator

| Cycle # | Charge mAh | Discharge mAh | Charge mAh/g | Discharge mAh/g | AhEff % |
|---|---|---|---|---|---|
| 1 | 2.15 | 1.88 | 176 | 154 | 87 |
| 2 | 1.90 | 1.88 | 155 | 154 | 99 |
| 3 | 1.89 | 1.87 | 155 | 153 | 99 |
| Control - uncoated separator | | | | | |
| 1 | 2.03 | 1.82 | 176 | 159 | 90 |

Figure 12A:
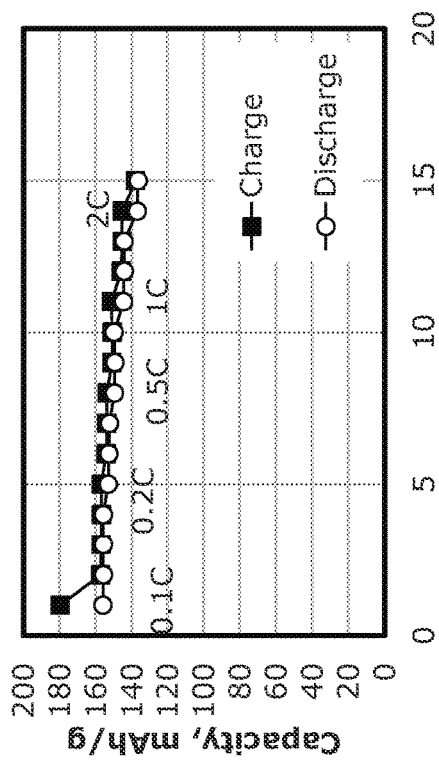
FIG. 12A illustrates the voltage profile of a coated separator according to one or more embodiments.
Figure 12B:
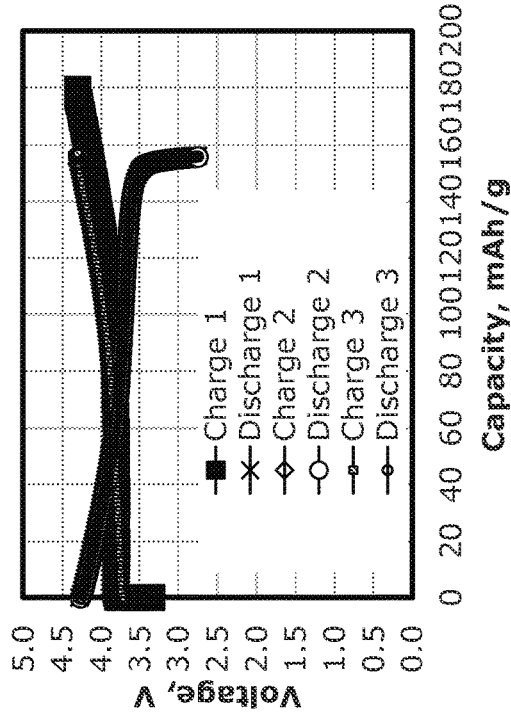
FIG. 12B illustrates the charge rate performance of a coated separator according to one or more embodiments.
Figure 12C:
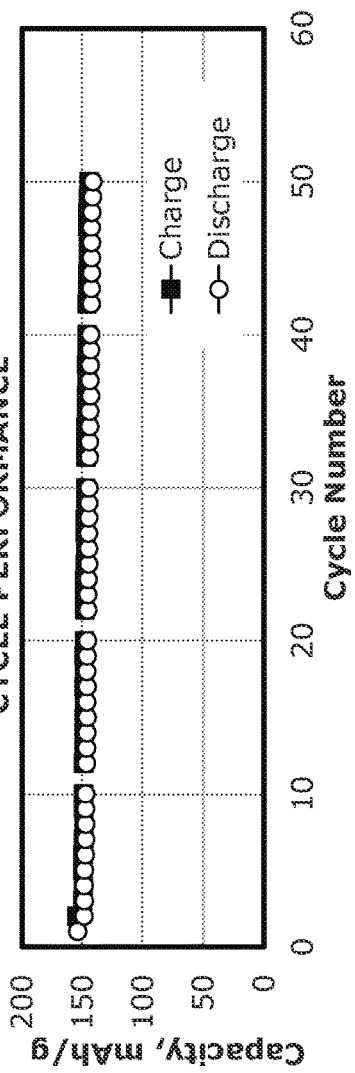
FIG. 12C illustrates the cycle performance of a coated separator according to one or more embodiments.

FIGS. 12A, 12B and 12C illustrate the voltage profile (C/10), charge rate performance and cycle performance (C/5), respectively, of the coated separator of Sample #8. The trilayer separator of Sample #8 was pattern coated on both sides with an 8 μm thick coating of the aluminum oxide filled UV coating of Table 3 per side.

TABLE 5

Coin Cell Test Results, UV ceramic water-based urethane acrylate, two-sided pattern, coated separator compared to uncoated control separator

| Cycle # | Charge mAh | Discharge mAh | Charge mAh/g | Discharge mAh/g | AhEff % |
|---|---|---|---|---|---|
| 1 | 2.24 | 1.95 | 180 | 156 | 87 |
| 2 | 1.96 | 1.94 | 157 | 156 | 99 |
| 3 | 1.96 | 1.94 | 157 | 156 | 99 |
| Control - uncoated separator | | | | | |
| 1 | 2.03 | 1.82 | 176 | 159 | 90 |

Example 3: UV-Curable, Aluminum Oxide-Filled Rubber Acrylate Coatings on Separator A UV-curable composition was prepared and mixed with aluminum oxide powder in the proportions shown below in Table 6 to form a slurry. This highly-filled product contains neither solvent nor water.

TABLE 6

UV-curable, acrylated rubber coating with aluminum oxide powder

| Ingredient | Manufacturer | Chemical Description | Weight % |
|---|---|---|---|
| SR307 | Sartomer | Acrylated rubber | 10 |
| SR306 | Sartomer | Acrylated monomer | 10 |
| SR454 | Sartomer | Acrylated monomer | 12 |
| Solsperse 39000 | Noveon | Dispersant | 3.5 |
| TPO-L | BASF | Photoinitiator | 0.5 |
| Irgacure 1173 | BASF | Photoinitiator | 4.0 |
| 26R-020212UP2 | Advanced Materials, LLC | Aluminum Oxide Power, 0.5-1 μm | 60 |
| | | Total | 100 |

The resulting slurry from Table 6 was applied on a 25-μm microporous PP\PE\PP trilayer separator film designed for use in lithium ion batteries (CELGARD 2325).

A continuous porous coating was made to the trilayer separator of Sample #6. In contrast, the trilayer separator of Sample #5 was pattern coated. The trilayer separator of Sample #5 was pattern coated on both sides with the coating of Table 6, while the trilayer separator of Sample #6 was continuous coated on both sides with the coating of Table 6.

Double-sided continuous coatings were applied with a #1 K bar rod using an RK Control Koater. The coatings were then cured on a Miltec MUVI conveyor with one single Miltec MPI-400 lamp equipped with a Miltec 380-0004 UV bulb at a conveyor speed of 150 feet per minute. This resulted in UV-cured aluminum oxide coatings that were 4-6 μm-thick per side.

Double-sided patterned coatings were achieved with a flexographic hand proofer from Parmco. The positions of the anilox and the rubber roller were reversed such that the applied pattern was that of the anilox and not the smooth coating that might result from the rubber roller. A 200 line per inch (lpi) 5.3 bcm anilox was used. This resulted in a 2-4 μm-thick aluminum oxide filled UV coating per side.

Both the ceramic coating resulting from continuous coating and the ceramic coating resulting from pattern coating appeared uniform, stable, and strongly adhered to the separator. Samples of coated and uncoated 25-μm microporous PP\PE\PP trilayer separator films were placed in an oven at 100° C. The uncoated Sample curled and showed signs of partial melting, becoming clear in spots. The coated Samples remained flat and with very little curl.

An uncoated separator was assembled into an 18650 Lithium ion coin cell. The cathode was a standard 14 mg/cm$^2$ NMC coated aluminum. The anode was lithium metal. The cell was charged and discharged at a C/10 rate. FIGS. 4A, 4B and 4C illustrate the voltage profile (C/10), charge rate performance and cycle performance (C/5), respectively, of the uncoated reference separator.

Figure 9:
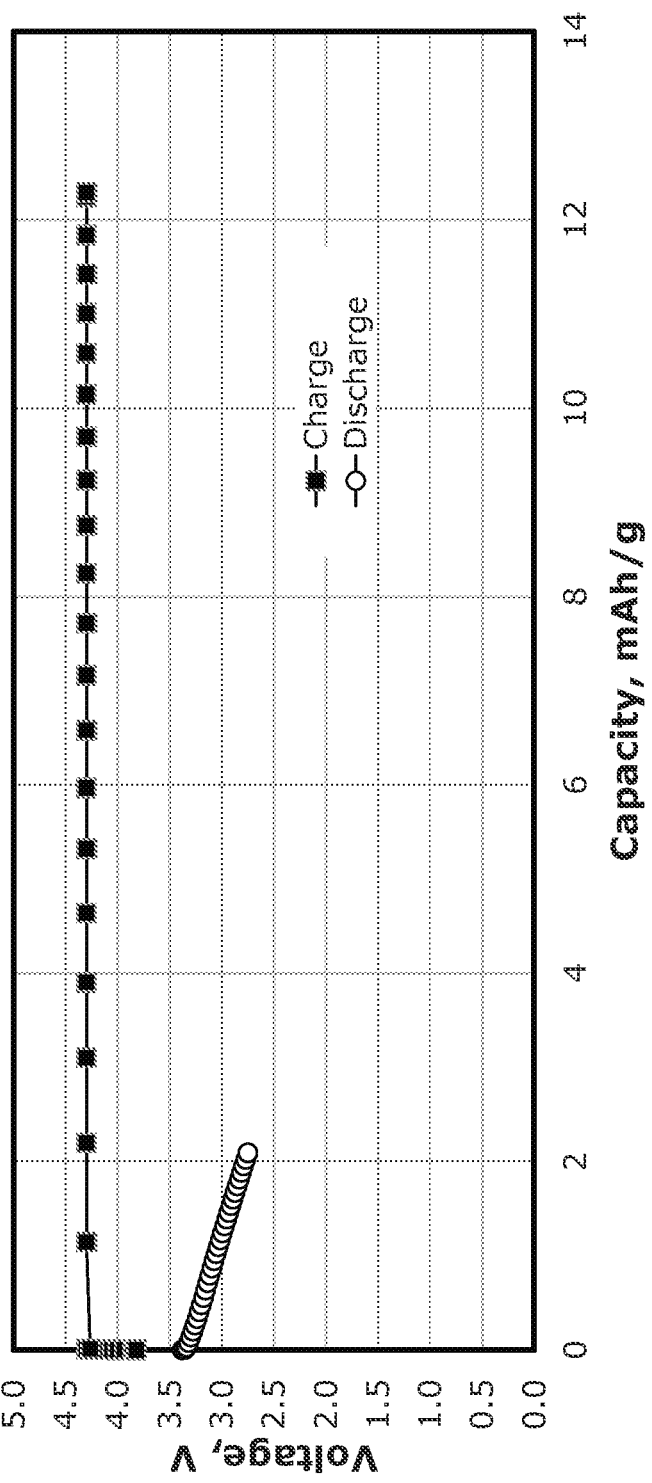
FIG. 9 illustrates the voltage profile of a coated separator according to one or more embodiments.
Figure 10:
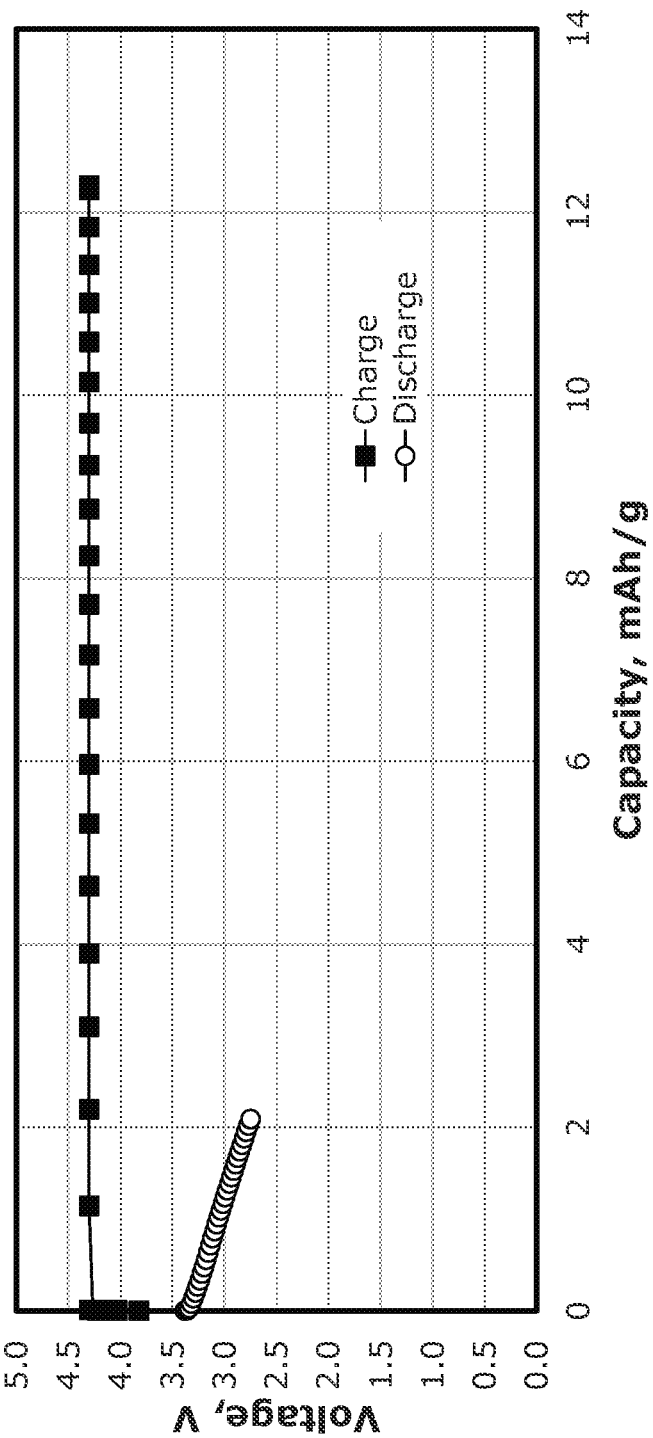
FIG. 10 illustrates the voltage profile of a coated separator according to one or more embodiments.

The coated separator Samples were assembled into an 18650 Lithium ion coin cell. The cathode was a standard 14 mg/cm$^2$ NMC coated aluminum. The anode was lithium metal. The cells were charged and discharged at a C/10 rate. FIGS. 9 and 10 illustrate the voltage profile of coated separator Samples #5 and #6, respectively. As shown in the voltage profiles (C/10) of FIGS. 9 and 10, the coin cell batteries utilizing the coated separators were capable of being charged and discharged.

In addition, the slurry of Table 6 was also applied to one side of a 25-μm microporous PP\PE\PP trilayer separator using a Little Joe Proofer. This proofer mimics the offset printing process. In this case, a solid coating was applied with a 0.4 mil wedge plate used to maintain the coating thickness. This resulted in a uniform, thin, 1 μm-thick aluminum oxide filled UV coating on one side of the trilayer separator.

As in the above examples, the coated separator (Sample #9) was tested in a NMC-Lithium metal half-cell. FIGS. 13A, 13B and 13C illustrate the voltage profile (C/10), charge rate performance and cycle performance (C/5), respectively, of the coated separator of Sample #9. Results in Table 7 and FIG. 13A demonstrate the coated separator functions in a lithium ion battery. FIG. 13B shows this ceramic-rubber coated separator allows lithium-ion charging and discharging at 0.1C to 2C rates, and FIG. 13C shows the battery fully charging and discharging over 50 cycles.

TABLE 7

Coin Cell Test Results, UV ceramic acrylated rubber coated separator, single-side printed, compared to uncoated control separator

| Cycle # | Charge mAh | Discharge mAh | Charge mAh/g | Discharge mAh/g | AhEff % |
|---|---|---|---|---|---|
| 1 | 2.09 | 1.82 | 182 | 158 | 87 |
| 2 | 1.83 | 1.82 | 160 | 159 | 99 |
| 3 | 1.83 | 1.82 | 159 | 158 | 99 |
| Control - uncoated separator | | | | | |
| 1 | 2.03 | 1.82 | 176 | 159 | 90 |

The resulting slurry of Table 6 was also applied on a 25-μm microporous PP\PE\PP trilayer separator (CELGARD 2325) using an anilox roller. A single-sided pattern coating was made. The patterned coatings were achieved with a 220 lpi pyramidal anilox. This resulted in a 3-8 μm-thick aluminum oxide filled UV coating.

Figure 14B:
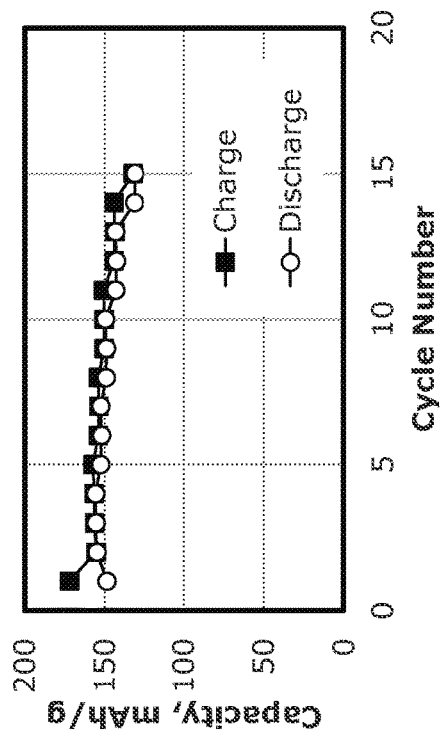
FIG. 14B illustrates the charge rate performance of a coated separator according to one or more embodiments.
Figure 14C:
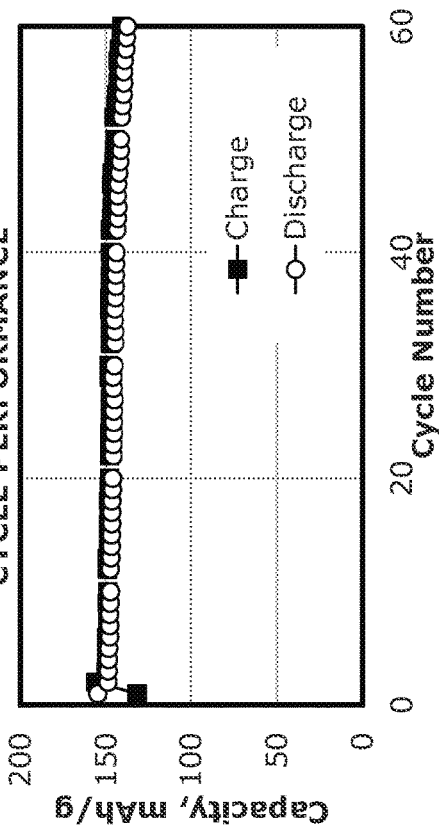
FIG. 14C illustrates the cycle performance of a coated separator according to one or more embodiments.
Figure 14A:
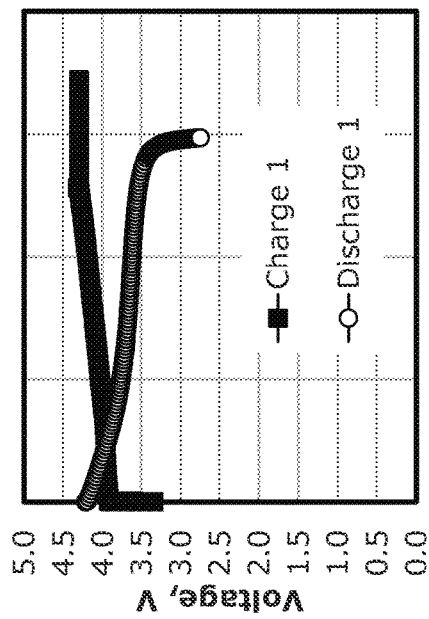
FIG. 14A illustrates the voltage profile of a coated separator according to one or more embodiments.

As in the above examples, the coated separator (Sample #10) was tested in a NMC-Lithium metal half-cell. FIGS. 14A, 14B and 14C illustrate the voltage profile (C/10), charge rate performance and cycle performance (C/5), respectively, of the coated separator of Sample #10. Results in Table 8 and FIG. 14A demonstrate the coated separator functions in a lithium ion battery. FIG. 14B shows this ceramic-rubber coated separator allows lithium-ion charge and discharge rates of 0.1 to 2C, and FIG. 14C shows the battery charging and discharging over 50 cycles.

TABLE 8

Coin Cell Test Results, UV ceramic acrylated rubber coated separator, pattern printed, compared to uncoated control separator

| Cycle # | Charge mAh | Discharge mAh | Charge mAh/g | Discharge mAh/g | AhEff % |
|---|---|---|---|---|---|
| 1 | 2.06 | 1.78 | 172 | 149 | 86 |
| Control - uncoated separator | | | | | |
| 1 | 2.03 | 1.82 | 176 | 159 | 90 |

Example 4: Cross-Linked Acrylic Coating with Aluminum Oxide on Separator

In addition to UV crosslinking, some embodiments cross-link UV and other water-based polymers with chemical crosslinkers for greater adhesion and chemical resistance. Table 9 shows an example of a water-based acrylic coating filled with aluminum oxide. In this case, zinc oxide is added to provide crosslinking of the acrylic resin.

TABLE 9

Cross-linked, water-based acrylic coating with aluminum oxide powder

| Ingredient | Manufacturer | Chemical Description | Weight % |
|---|---|---|---|
| Joncryl LMV 7031 | BASF | Acrylic resin in water | 11.2 |
| Joncryl HR 1620 | BASF | Acrylic resin in water | 11.2 |
| Joncryl 2660 | BASF | Acrylic resin in water | 10.4 |
| Tamol 1254 | Dow Chemical | Poly carboxylic acid dispersant | 4.0 |
| Ammonia 26° | BASF | pH adjuster | 1.2 |
| Zinc Oxide | BASF | crosslinker | 2.0 |
| 26R-020212UP2 | Advanced Materials, LLC | Aluminum Oxide Powder, 0.5-1 μm | 60.0 |
| | | Total | 100.0 |

The resulting slurry from Table 9 was applied on a 25-μm microporous PP\PE\PP trilayer separator film (CELGARD 2325). Single and double sided patterned coatings were made.

The patterned coatings were achieved with a flexographic hand proofer from Pamarco. The positions of the anilox and the rubber roller were reversed such that the applied pattern was that of the anilox and not the smooth coating that might result from the rubber roller. A 120 lpi, 21.5 bcm trihelical anilox was used. This resulted in a 4-8 μm-thick aluminum oxide filled UV coating. For example, separator Sample #11 was pattern coated on a single side with a 4-8 μm-thick aluminum oxide filled UV coating, while separator Sample #12 was pattern coated on both sides with an 8 μm-thick aluminum oxide filled UV coating. The ceramic coatings of both Sample #11 and Sample #12 were stable and strongly adhered to the separator.

Figure 15A:
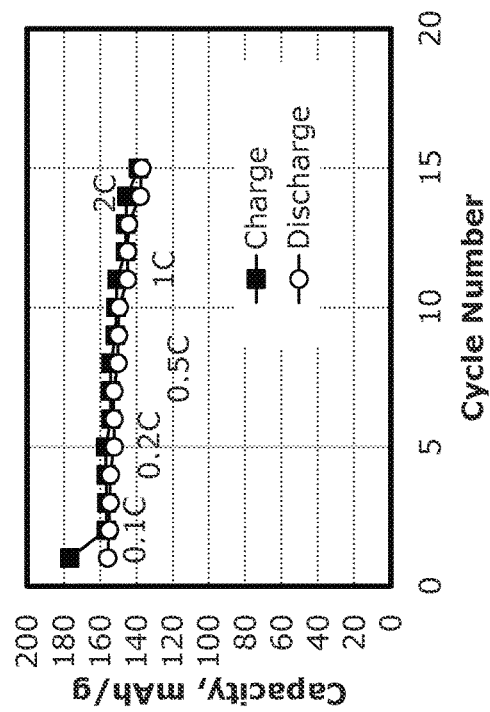
FIG. 15A illustrates the voltage profile of a coated separator according to one or more embodiments.
Figure 15B:
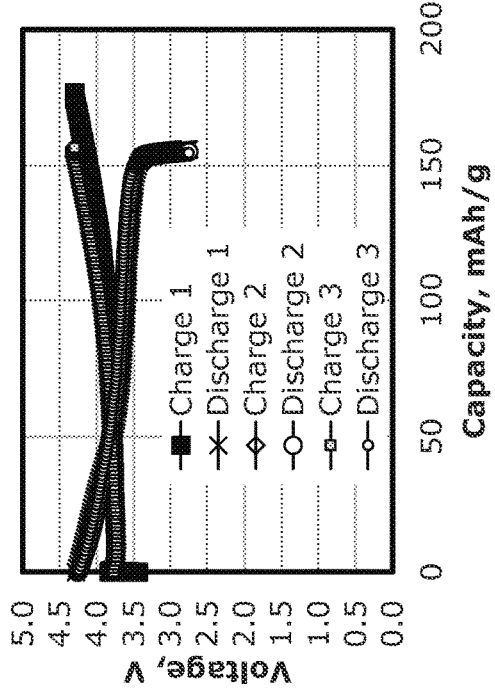
FIG. 15B illustrates the charge rate performance of a coated separator according to one or more embodiments.
Figure 15C:
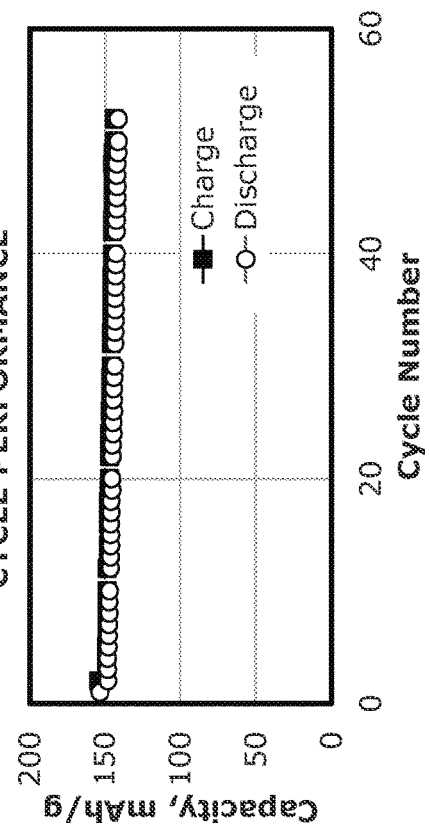
FIG. 15C illustrates the cycle performance of a coated separator according to one or more embodiments.

As in the above examples, the coated separator Samples were tested in a NMC-Lithium metal half-cell. FIGS. 15A, 15B and 15C illustrate the voltage profile (C/10), charge rate performance and cycle performance (C/5), respectively, of the coated separator of Sample #11. Results in Table 10 and FIG. 15A demonstrate the single side coated separator (Sample #11) functions in a lithium ion battery. FIG. 15B shows this coated separator allows lithium-ion charge and discharge rates from 0.1C to at least 2C, and FIG. 15C shows the battery charging and discharging over 50 cycles.

TABLE 10

Coin Cell Test Results, Cross-linked ceramic acrylic coated separator, single side pattern, compared to uncoated control separator

| Cycle # | Charge mAh | Discharge mAh | Charge mAh/g | Discharge mAh/g | AhEff % |
|---|---|---|---|---|---|
| 1 | 2.11 | 1.86 | 177 | 156 | 88 |
| 2 | 1.87 | 1.85 | 157 | 155 | 99 |
| 3 | 1.87 | 1.85 | 156 | 155 | 99 |
| Control - uncoated separator | | | | | |
| 1 | 2.03 | 1.82 | 176 | 159 | 90 |

Figure 16A:
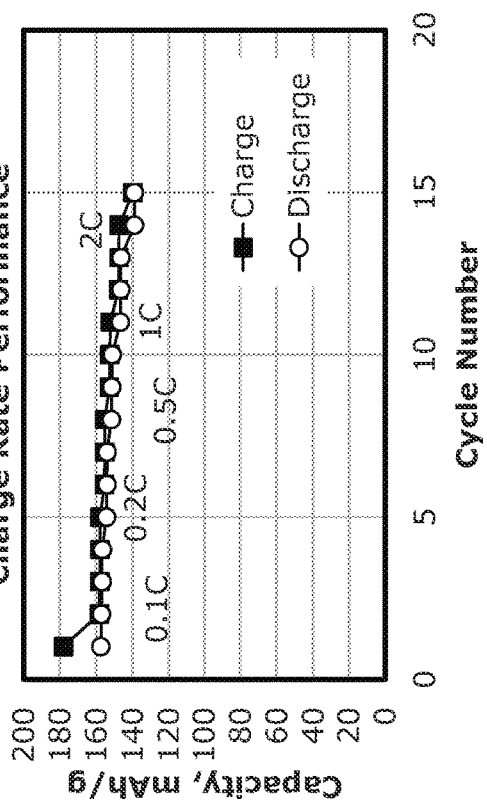
FIG. 16A illustrates the voltage profile of a coated separator according to one or more embodiments.
Figure 16B:
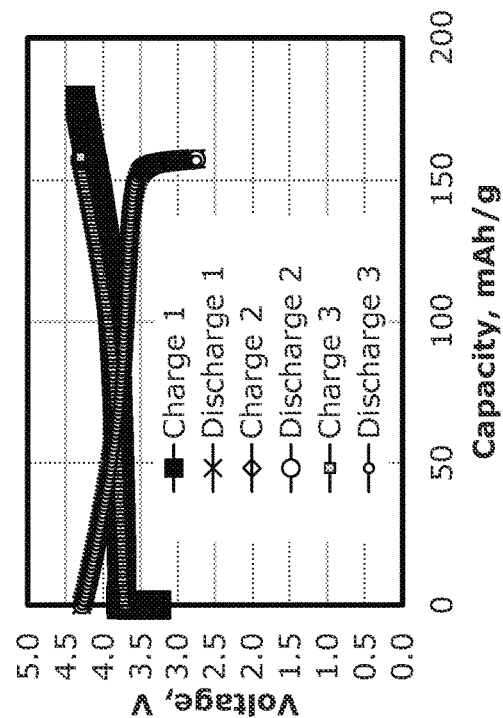
FIG. 16B illustrates the charge rate performance of a coated separator according to one or more embodiments.
Figure 16C:
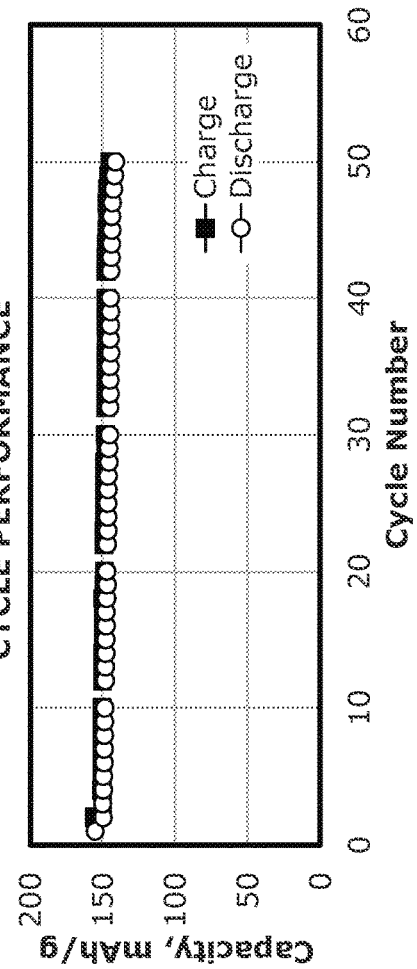
FIG. 16C illustrates the cycle performance of a coated separator according to one or more embodiments.

FIGS. 16A, 16B and 16C illustrate the voltage profile (C/10), charge rate performance and cycle performance (C/5), respectively, of the coated separator of Sample #12. Results in Table 11 and FIG. 16A demonstrate this type of two-sided coated separator (Sample #12) also functions in a lithium ion battery. FIG. 16B shows this coated separator allows lithium-ion charge and discharge rates from 0.1C to at least 2C, and FIG. 16C shows the battery charging and discharging over 50 cycles.

TABLE 11

Coin Cell Test Results, Cross-linked ceramic acrylic coated separator, double-sided pattern, compared to uncoated control separator

| Cycle # | Charge mAh | Discharge mAh | Charge mAh/g | Discharge mAh/g | AhEff % |
|---|---|---|---|---|---|
| 1 | 2.17 | 1.92 | 178 | 157 | 88 |
| 2 | 1.93 | 1.92 | 158 | 157 | 99 |
| 3 | 1.93 | 1.91 | 158 | 157 | 99 |
| Control-uncoated separator | | | | | |
| 1 | 2.03 | 1.82 | 176 | 159 | 90 |

Example 5: UV Curable Aluminum Oxide Filled Cycloaliphatic Epoxy Coatings on Separator A UV curable composition was prepared and mixed with aluminum oxide powder in the proportions shown below in Table 12 to form a slurry. This highly-filled product contains neither solvent nor water.

TABLE 12

UV Curable, Cycloaliphatic Epoxy coating with aluminum oxide powder

| Chemical | Manufacturer | Chemical Description | Weight % |
|---|---|---|---|
| 3,4-Epoxycyclohexylmethyl 3,4-epoxycyclohexane carboxylate | | Cycloaliphatic Epoxy oligomer | 38 |
| Mixed Triarylsulfonium Hexafluorophosphate Salts in 50% propylene carbonate | | Cationic Photoinitiator | 2 |
| 26R-020212UP2 | Advanced Materials, LLC | Aluminum Oxide Power, 0.5-1 μm | 60 |
| Total | | | 100 |

The resulting slurry from Table 12 was applied on a 25-μm macroporous PP\PE\PP trilayer separator film designed for use in lithium ion batteries (CELGARD 2325). This liquid slurry did not contain a dispersing agent and was much higher in viscosity (~15,000-25,000 cP) to allow letterpress or offset printing applications.

Single-sided continuous coatings were applied with Little Joe press to mimic an offset press application. A 0.4 mil wedge plate was used to maintain the coating thickness. The coatings were then cured on a Miltec MUVI conveyor with one single Miltec MPI-400 lamp equipped with a Miltec 380-0004 UV bulb at a conveyor speed of 150 feet per minute. This resulted in a continuous cured aluminum oxide coating with no pattern that was 4-8 μm-thick (Sample #13).

As in the above examples, the coated separator Samples were tested in a NMC-Lithium metal half-cell. FIGS. 17A, 17B and 17C illustrate the voltage profile (C/10), charge rate performance and cycle performance (C/5), respectively, of the coated separator of Sample #13. Table 13 and FIG. 17A show the results of electrochemical half-cell testing. Table 13 and FIG. 17A demonstrate that the NMC cathode-Li anode battery can be charged at C/10 with this coated separator. FIG. 17B shows this ceramic-epoxy coated separator allows lithium-ion charge and discharge rates from 0.1C to at least 2C. FIG. 17C shows the lithium ion half-cell battery charges and discharges over 50 cycles.

TABLE 13

Coin Cell Test Results, UV Ceramic Cycloaliphatic Epoxy coated separator, single side, compared to uncoated control separator

| Cycle # | Charge mAh | Discharge mAh | Charge mAh/g | Discharge mAh/g | AhEff % |
|---|---|---|---|---|---|
| 1 | 2.26 | 1.96 | 180 | 156 | 87 |
| 2 | 1.97 | 1.95 | 157 | 155 | 99 |
| 3 | 1.96 | 1.95 | 156 | 155 | 100 |
| Control - uncoated separator | | | | | |
| 1 | 2.03 | 1.82 | 176 | 159 | 90 |

In certain embodiments, solvent may be necessary to reduce the viscosity of the UV epoxy in order to apply it with an anilox to mimic the flexographic and printing gravure processes. Table 14 shows a slurry formula change according to one or more embodiments. In such slurry, a mixture of two solvents was added. One solvent evaporated rapidly and the other solvent evaporated slowly to avoid the coating drying on the anilox roll.

TABLE 14

UV Curable cationic epoxy coating with aluminum oxide powder

| Ingredient | Manufacturer | Chemical Description | Weight % Liquid Mixture | Weight % Cured Coating |
|---|---|---|---|---|
| Doublemer | Double Bond Chemical | Cycloaliphatic Epoxy oligomer | 8.75 | 10.29 |
| Doublecure | Double Bond Chemical | Cationic Photoinitiator | 1.00 | 1.18 |
| Solsperse 41000 | Noveon | Dispersing agent | 3.00 | 3.53 |
| n-Propanol | Nexo | Fast evaporating solvent | 12.00 | 0.00 |
| Glycol ether | Dow Chemical | Slow evaporating solvent | 3.00 | 0.00 |
| 26R-801 | Advanced Materials, LLC | Aluminum Oxide Powder, 0.5-1 | 72.25 | 85.00 |
| Total | | | 100.00 | 100.00 |

The resulting slurry from Table 14 was applied on a 25-μm microporous PP\PE\PP trilayer separator film (CELGARD 2325). A single-sided pattern coating was made. The patterned coating was achieved with a 220 lpi pyramidal anilox. This resulted in a 2-3 μm-thick aluminum oxide filled UV coating (Sample #14).

Figure 18B:
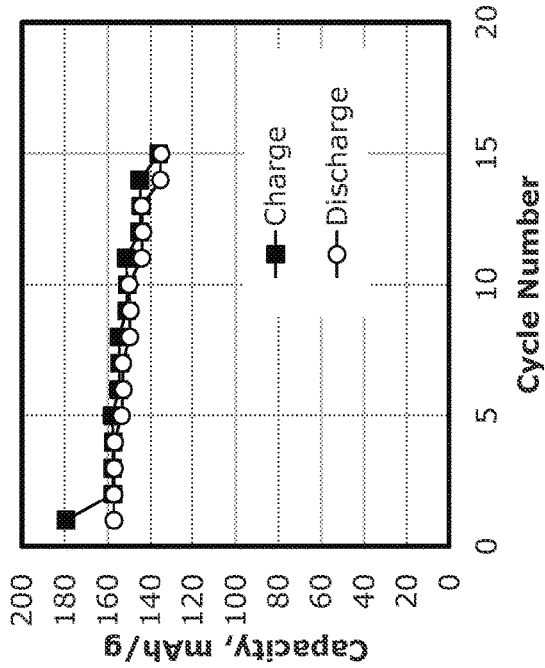
FIG. 18B illustrates the charge rate performance of a coated separator according to one or more embodiments.
Figure 18A:
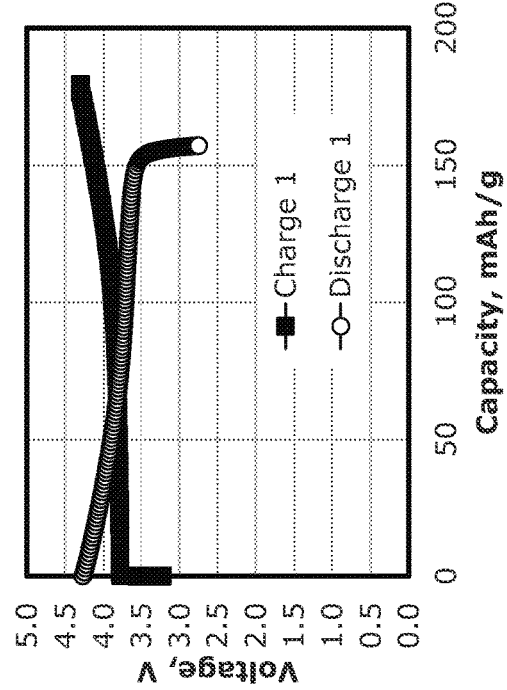
FIG. 18A illustrates the voltage profile of a coated separator according to one or more embodiments.
Figure 18C:
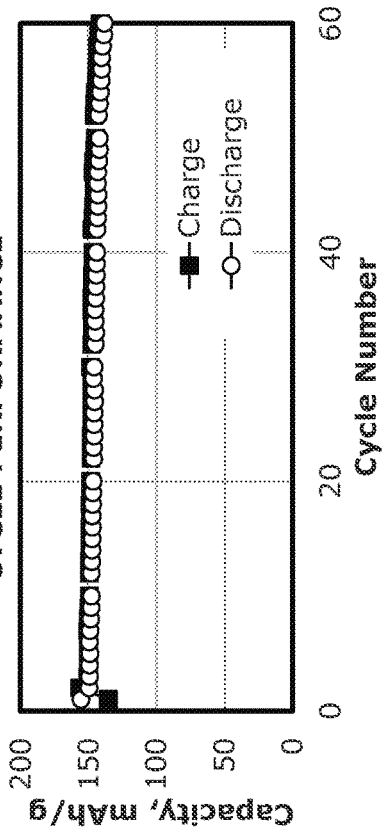
FIG. 18C illustrates the cycle performance of a coated separator according to one or more embodiments.

As in the above examples, the coated separator was tested in a NMC-Li metal half-cell. FIGS. 18A, 18B and 18C illustrate the voltage profile (C/10), charge rate performance and cycle performance (C/5), respectively, of the coated separator of Sample #14. Results in Table 15 and FIG. 18A demonstrate this coated separator functions in a lithium ion battery. FIG. 18B shows this coated separator allows lithium-ion charge and discharge rates from 0.1C to at least 2C, and FIG. 18C shows the battery charging and discharging with no issues over 50 cycles.

TABLE 15

Coin Cell Test Results, UV Ceramic Cycloaliphatic Epoxy pattern coated separator, single side, compared to uncoated control separator

| Cycle # | Charge mAh | Discharge mAh | Charge mAh/g | Discharge mAh/g | AhEff % |
|---|---|---|---|---|---|
| 1 | 2.21 | 1.94 | 179 | 157 | 88 |
| Control - uncoated separator | | | | | |
| 1 | 2.03 | 1.82 | 176 | 159 | 90 |

Example 6: UV Curable Silicone Coating

Another example of the wide range of UV-curable chemistries that can be applied, according to various embodiments, includes silicones. The silicones may, for example, be terminated with acrylates, vinyls, cycloaliphatic epoxides, or a combination thereof. A UV-curable cycloaliphatic is shown in Table 16.

TABLE 16

UV cationic silicone coating with aluminum oxide powder

| Ingredient | Manufacturer | Chemical Description | Weight % |
|---|---|---|---|
| UV Poly 206 | Bluestar Silicones | Cycloaliphatic epoxy silicone with photoinitiator | 60 |
| Alumina 79555.05 | Saint Gobain | Aluminum oxide powder, 0.5 um | 40 |
| | | Total | 100 |

The resulting slurry from Table 16 was applied to a 25-μm microporous PP\PE\PP trilayer separator film (CELGARD 2325). Single-sided pattern coatings were made. The patterned coatings were achieved with a 120 lpi trihelical anilox. This resulted in an 8 μm-thick aluminum oxide filled UV coating (Sample #15).

Figure 19B:
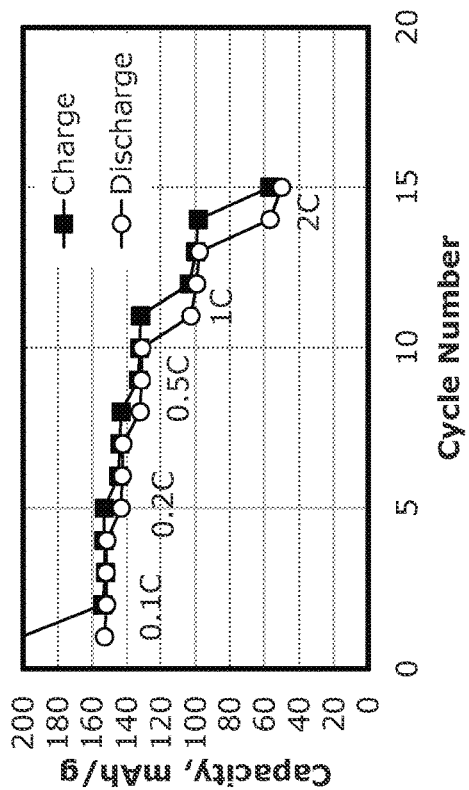
FIG. 19B illustrates the charge rate performance of a coated separator according to one or more embodiments.
Figure 19C:
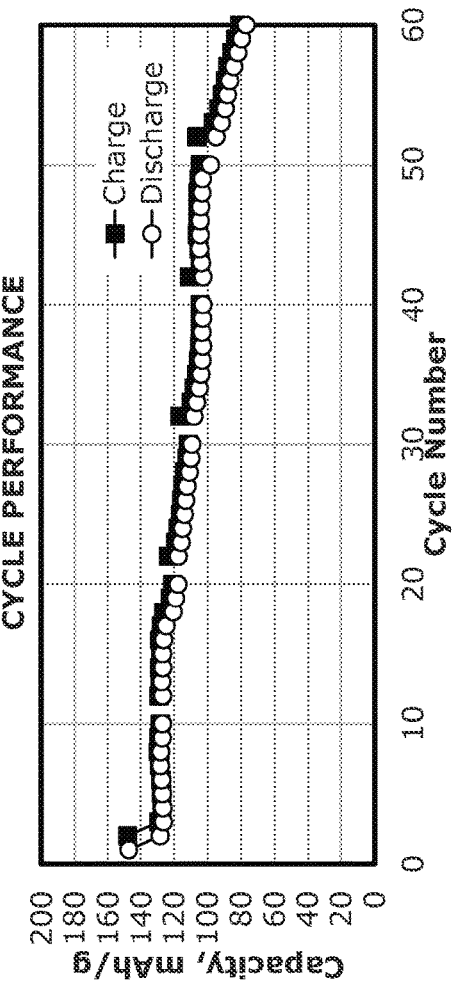
FIG. 19C illustrates the cycle performance of a coated separator according to one or more embodiments.
Figure 19A:
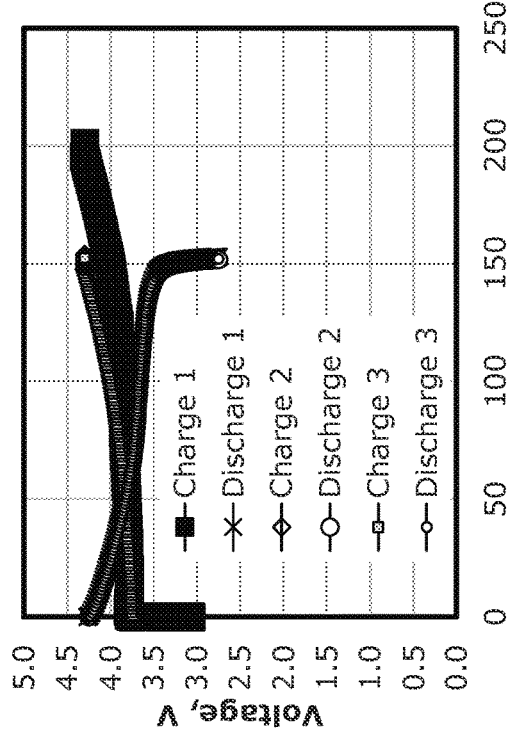
FIG. 19A illustrates the voltage profile of a coated separator according to one or more embodiments.

As in the above examples, the coated separator was tested in a NMC-Li metal half-cell. FIGS. 19A, 19B and 19C illustrate the voltage profile (C/10), charge rate performance and cycle performance (C/5), respectively, of the coated separator of Sample #15. Results in Table 17 and FIG. 19A demonstrate the coated separator functions in a lithium ion battery. FIG. 19B shows this coated separator allows lithium-ion charge and discharge rates from 0.1C to at least 2C, and FIG. 19C shows the battery charging and discharging over 50 cycles.

TABLE 17

Coin Cell Test Results, UV ceramic cationic silicone coated separator, single side pattern, compared to uncoated control separator

| Cycle # | Charge mAh | Discharge mAh | Charge mAh/g | Discharge mAh/g | AhEff % |
|---|---|---|---|---|---|
| 1 | 2.35 | 1.78 | 201 | 153 | 76 |
| 2 | 1.80 | 1.77 | 154 | 152 | 99 |
| 3 | 1.78 | 1.77 | 152 | 152 | 100 |
| Control - uncoated separator | | | | | |
| 1 | 2.03 | 1.82 | 176 | 159 | 90 |

Example 7: UV Urethane Coating

Another example of the wide range of UV-curable chemistries that can be applied, according to various embodiments, includes all forms of urethane acrylates. The urethanes may, for example, be terminated with (meth) acrylates, vinyls, or a combination thereof. A UV-curable ceramic coating formula is shown in Table 18.

TABLE 18

UV Curable urethane acrylate coating with aluminum oxide powder

| Ingredient | Manufacturer | Chemical Description | Weight % Liquid Mixture | Weight % Cured Coating |
|---|---|---|---|---|
| CN973J75 | Sartomer | Aliphatic urethane acrylate | 3.19 | 3.75 |
| CN9890 | Sartomer | Melamine acrylate | 1.91 | 2.25 |
| Solsperse | Noveon | Dispersing agent | 1.28 | 1.50 |
| SR306 | Sartomer | acrylate monomer | 1.91 | 2.25 |
| SR454 | Sartomer | acrylate monomer | 3.19 | 3.75 |
| Irgacure 184 | BASF | Photoinitiator | 1.02 | 1.20 |
| TPO-L | BASF | Photoinitiator | 0.26 | 0.30 |
| n-Propanol | Nexo | Solvent | 15.00 | 0.00 |
| 26R801 | Advanced Materials, LLC | Aluminum Oxide Powder, 0.5-1 | 72.25 | 85.00 |
| | | Total | 100.00 | 100.00 |

The resulting slurry from Table 18 was applied on a 25-μm microporous PP\PE\PP trilayer separator film (CELGARD 2325). A single-sided coating was made. The continuous and patterned coatings were achieved with a 150 lpi trihelical anilox. This resulted in a 9-14 μm-thick aluminum oxide filled UV coating. For instance, the separator of Sample #16 was coated on a single side with a 9 μm-thick continuous coating of the UV ceramic urethane acrylate coating of Table 18, while the separator of Sample #17 was pattern coated on a single side with an 11 μm-thick coating of the UV ceramic urethane acrylate coating of Table 18, while the separator of Sample #17 was pattern coated on a single side with an 11 μm-thick coating of the UV ceramic urethane acrylate coating of Table 18.

Figure 20A:
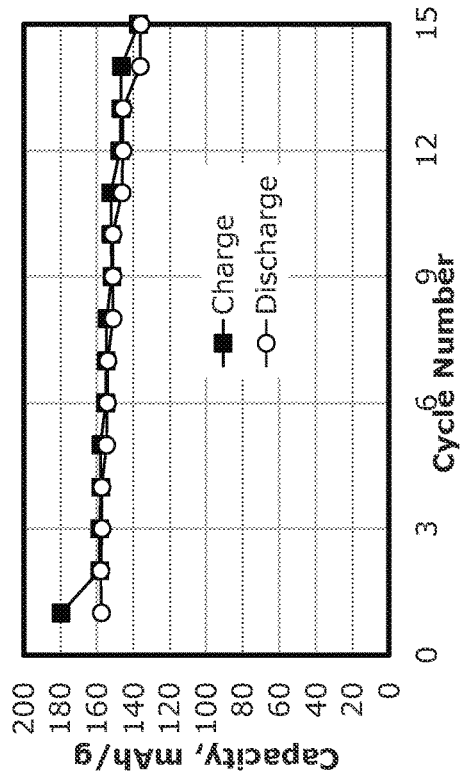
FIG. 20A illustrates the voltage profile of a coated separator according to one or more embodiments.
Figure 20B:
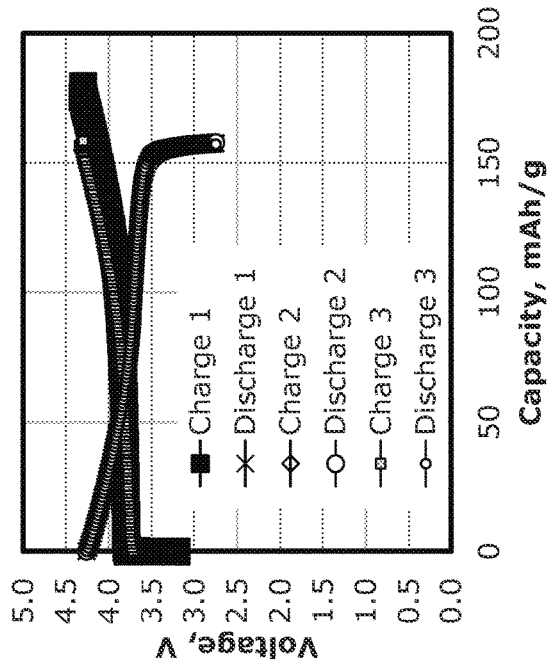
FIG. 20B illustrates the charge rate performance of a coated separator according to one or more embodiments.
Figure 20C:
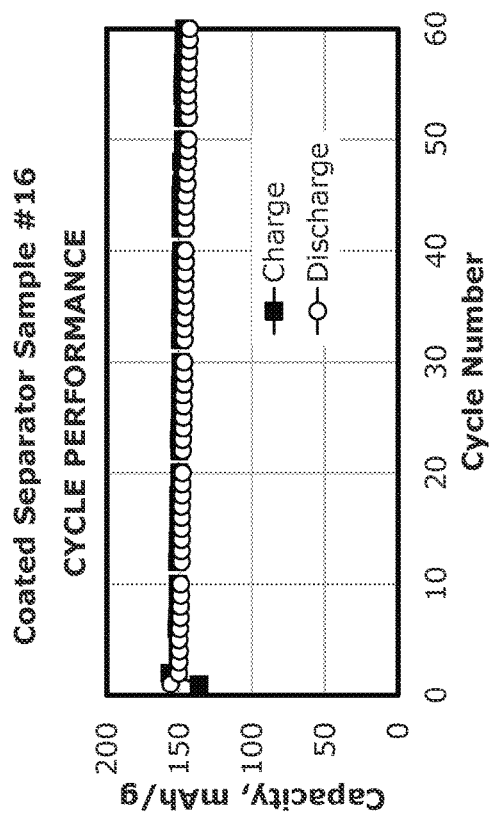
FIG. 20C illustrates the cycle performance of a coated separator according to one or more embodiments.
Figure 21A:
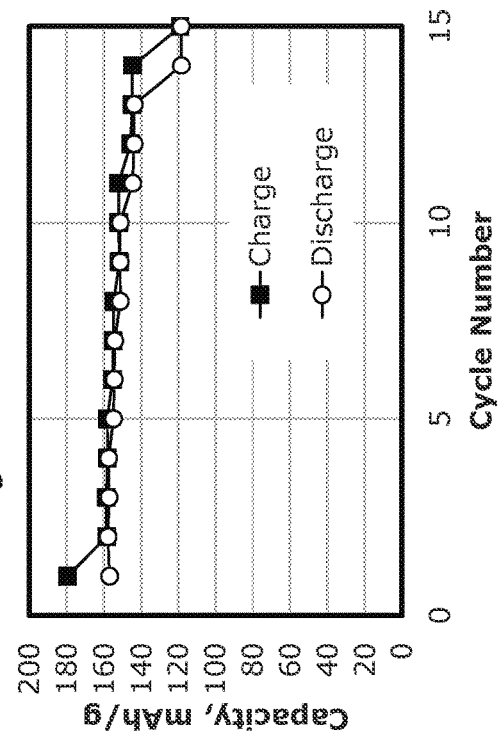
FIG. 21A illustrates the voltage profile of a coated separator according to one or more embodiments.
Figure 21B:
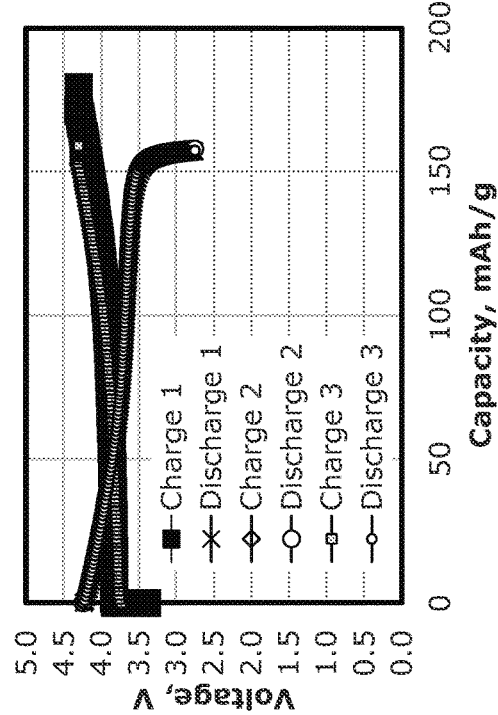
FIG. 21B illustrates the charge rate performance of a coated separator according to one or more embodiments.
Figure 21C:
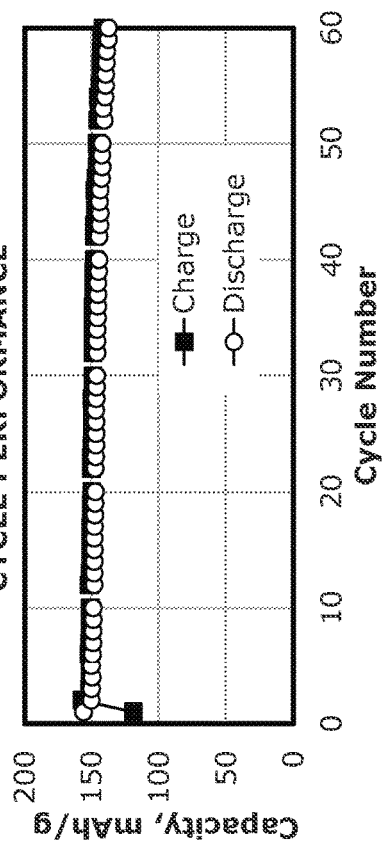
FIG. 21C illustrates the cycle performance of a coated separator according to one or more embodiments.

As in the above examples, the coated separators were tested in a NMC-Li metal half-cell. FIGS. 20A, 20B and 20C illustrate the voltage profile (C/10), charge rate performance and cycle performance (C/5), respectively, of the coated separator of Sample #16. FIGS. 21A, 21B and 21C illustrate the voltage profile (C/10), charge rate performance and cycle performance (C/5), respectively, of the coated separator of Sample #17. Results in Tables 19 and 20 and FIG. 20A (Sample #16—single side continuous coating) and FIG. 21A (Sample #17—single side pattern coating) demonstrate these UV-cured ceramic coated separators function in a lithium ion battery.

TABLE 19

Coin Cell Test Results, UV ceramic urethane acrylate coated separator, single side continuous, compared to uncoated control separator

| Cycle # | Charge mAh | Discharge mAh | Charge mAh/g | Discharge mAh/g | AhEff % |
|---|---|---|---|---|---|
| 1 | 2.15 | 1.88 | 180 | 158 | 88 |
| 2 | 1.89 | 1.89 | 159 | 158 | 100 |
| 3 | 1.89 | 1.88 | 159 | 157 | 99 |
| Control - uncoated separator | | | | | |
| 1 | 2.03 | 1.82 | 176 | 159 | 90 |

TABLE 20

Coin Cell Test Results, UV ceramic urethane acrylate coated separator, single side pattern, compared to uncoated control separator

| Cycle # | Charge mAh | Discharge mAh | Charge mAh/g | Discharge mAh/g | AhEff % |
|---|---|---|---|---|---|
| 1 | 2.07 | 1.81 | 180 | 157 | 87 |
| 2 | 1.83 | 1.82 | 159 | 158 | 100 |
| 3 | 1.83 | 1.81 | 159 | 157 | 99 |
| Control - uncoated separator | | | | | |
| 1 | 2.03 | 1.82 | 176 | 159 | 90 |

Both FIGS. 20B and 21B show these ceramic-urethane coated separators have the porosity to allow lithium-ion charge and discharge rates from 0.1C to at least 2C, and FIGS. 20C and 21C show the battery charging and discharging over 50 cycles.

Example 8: UV Polyester Coating

Another example of the wide range of UV-curable chemistries that can be applied, according to various embodiments, includes all forms of polyester acrylates. The polyesters may, for example, be terminated with (meth)acrylates, vinyls, or a combination thereof. A UV-curable polyester and urethane ceramic coating formula is shown in Table 21.

TABLE 21

UV Curable polyester acrylate coating with aluminum oxide powder

| Ingredient | Manufacturer | Chemical Description | Weight % Liquid Mixture | Weight % Cured Coating |
|---|---|---|---|---|
| CN973J75 | Sartomer | Aliphatic urethane acrylate | 3.2 | 3.75 |
| CN3150 | Sartomer | Polyester acrylate | 1.9 | 2.3 |
| Solsperse | Noveon | Dispersing agent | 1.3 | 1.5 |
| SR306 | Sartomer | Acrylate monomer | 1.9 | 2.3 |
| SR454 | Sartomer | Acrylate monomer | 3.2 | 3.8 |
| Irgacure 184 | BASF | Photoinitiator | 1.0 | 1.2 |
| TPO-L | BASF | Photoinitiator | 0.3 | 0.3 |
| n-Propanol | Nexo | Solvent | 15.00 | — |
| 26R801 | Advanced Materials, LLC | Aluminum Oxide Powder, 0.5-1 µm | 72.3 | 85.0 |
| | | Total | 100.0 | 100.0 |

The resulting slurry from Table 21 was applied on a 25-µm microporous PP\PE\PP trilayer separator film (CELGARD 2325). A single-sided pattern coating was made. The patterned coating was produced with a 165 lpi Pyramidal anilox. This resulted in a 9 µm-thick aluminum oxide filled UV coating (Sample #18).

As in the above examples, the coated separator was tested in a NMC-Li metal half-cell. FIGS. 22A, 22B and 22C illustrate the voltage profile (C/10), charge rate performance and cycle performance (C/5), respectively, of the coated separator of Sample #18. Electrochemical results in Table 22 and FIG. 22A demonstrate this coated separator functions in a lithium ion battery. FIG. 22B shows this ceramic-polyester coated separator allows lithium-ion charge and discharge rates from 0.1C to at least 2C, and FIG. 22C shows the battery charging and discharging over 50 cycles.

TABLE 22

Coin Cell Test Results, UV ceramic polyester urethane acrylate pattern coated separator, single-sided, compared to uncoated control separator

| Cycle # | Charge mAh | Discharge mAh | Charge mAh/g | Discharge mAh/g | AhEff % |
|---|---|---|---|---|---|
| 1 | 1.99 | 1.74 | 179 | 156 | 87 |
| 2 | 1.76 | 1.75 | 158 | 157 | 99 |
| 3 | 1.76 | 1.74 | 158 | 156 | 99 |
| Control - uncoated separator | | | | | |
| 1 | 2.03 | 1.82 | 176 | 159 | 90 |

Example 9: UV Coating Containing Aluminum Oxide and Polyethylene

The following is another example of the wide range of UV-curable chemistries that can be applied, according to various embodiments. In this example, a single component, polypropylene (PP) separator is coated with a UV-curable water-based acrylated urethane ceramic coating formula containing aluminum oxide and polyethylene, thereby providing the separator with a shutdown mechanism. A UV-curable water-based acrylated urethane ceramic coating formula containing aluminum oxide and polyethylene is shown in Table 23. Such formula does not contain any monomers.

TABLE 23

UV Curable water-based acrylated urethane coating with aluminum oxide and polyethylene

| Ingredient | Chemical Description | Weight % Liquid Mixture | Weight % Cured Coating |
|---|---|---|---|
| Ucecoat 7689 | Acrylated polyurethane water based dispersion | 15 | 7.0 |
| Airex 920 | Defoamer | 1 | 0.0 |
| Sodium dioctyl sulfosuccinate | Wetting and dispersing | 6.5 | 0.0 |
| N-methyldiethanolamine | Amine synergist | 1.5 | 0.0 |
| Irgacure 500 | Photoinitiator | 0.5 | 0.7 |
| Irgacure 819DW | Photoinitiator | 0.5 | 0.3 |
| Fumed $Al_2O_3$ | Aluminum Oxide | 5 | 0.0 |
| LDPE | Polyethylene wax | 60 | 78.9 |
| Ester of Hydrogenated Rosin | Tackifier | 10 | 13.2 |
| | | 100.0 | 100.0 |

The resulting slurry from Table 23 was applied with the Miltec Flexo Press on top of a 16-µm microporous PP separator film (CELGARD EPP1611) in a 10-µm parallel row pattern in the machine direction of the film. This resulted in a 3 µm-thick aluminum oxide filled coating. The coating was cured at 150 fpm with a Miltec MPI-400 lamp. As shown in Table 24, the uncoated PP separator and the coated PP separator allow air to flow through their pores at almost the same rate (13.4 and 16.2 seconds, respectively). This demonstrates that the pores of the separator are open. However, when the separator films are heated to 150° C. for 30 minutes, a significant difference in air flow is observed. The uncoated PP separator has most of its pores open, as indicated by its Gurley number of 25.7. In contrast, the pores of the coated separator have closed, as indicated by its Gurley number of greater than 1000. If a battery is failing and going into thermal runaway, the uncoated PP separator would allow the ions in the electrolyte to keep discharging. In contrast, a battery with the coated PP would shut down as there would no longer be an ionic path from the cathode to the anode. This is critical to battery safety.

TABLE 24

Separator Performance

| | Gurley at Room Temperature (sec) | Gurley after 30 minutes at 150° C. (sec) |
|---|---|---|
| Uncoated PP separator | 13.4 | 25.7 |
| PP separator coated with slurry from Table 23 | 16.2 | >1000 |

Example 10: Isolated Separator Film

The following is an example of an isolated separator film, according to various embodiments. A UV-curable urethane oligomer ceramic formula containing aluminum oxide for an isolated separator film is shown in Table 25.

TABLE 25

UV-curable urethane oligomer ceramic isolated separator film containing aluminum oxide

| Ingredient | Chemical Description | Weight % Liquid Mixture |
|---|---|---|
| Ucecoat 7689 | Acrylated polyurethane water based dispersion | 5.0 |
| Airex 920 | De-Aerator | 0.5 |
| AC-420 | Leveling Agent | 3.0 |
| AC-137 | Dispersing Agent | 4.0 |
| MDEA | Alkaline Agent | 0.5 |
| Irgacure 500 | Photoinitiator | 1.0 |
| Irgacure 819DW | Photoinitiator | 1.0 |
| 26R-801 Al Oxide | Alpha Aluminum Oxide | 85 |
| | | 100.0 |

Figure 32:
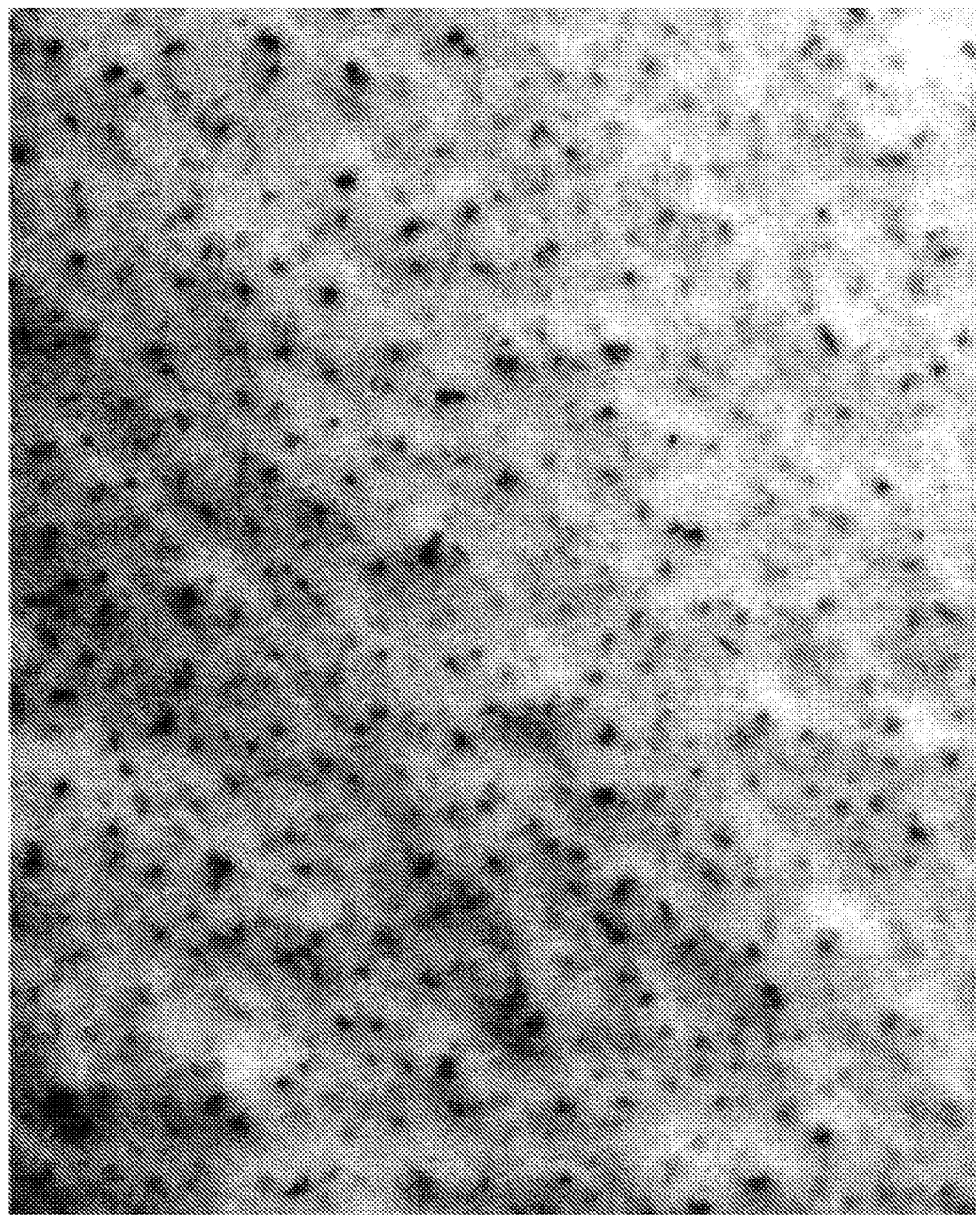
FIG. 32 is a photomicrograph of a cast (freestanding) separator film according to one or more embodiments.

A silicone release film was prepared by coating a 16-μm microporous PP separator film with SILCOLEASE UV POLY 206 (a release coating containing UV/EB silicone polymer, a UV/EB release modifier and UV/EB photoinitiator). SILCOLEASE was applied with a 200 lpi anilox on a model 1602 Sohn label press running at 50 ft/min with a Miltec MPI-400 lamp system. Using a RK proofer (a desktop drawdown machine), the separator formula from Table 25 was applied using a number seven bar on top of the release coating. This resulted in a 4-μm thick separator coating on the release coating. The coating was then peeled from the release film to create a free standing (e.g., isolated) film. The degree of porosity of the isolated separator film was then determined. The resultant Gurley for the cast isolated separator was 69.6 Gurley. FIG. 32 is a photomicrograph of the cast free standing separator film. In this instance, the separator coating by itself was very fragile. A thinner coating could be made if applied to a separator, anode, or cathode.

Although aluminum oxide is used to illustrate certain variations, various embodiments are suitable for the preparation of any coated separator disclosed herein, using any of the ceramic particulate materials disclosed herein. With the benefit of the present disclosure, one skilled in the art will recognize that various process parameters may need to be adjusted to compensate for the use of a different ceramic particulate material.

Certain embodiments are drawn to a coated separator comprising a separator; and a coating adhered to at least one surface of the separator, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a coated separator comprising a trilayer separator; and a coating adhered to at least one surface of the trilayer separator, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a coated separator comprising a separator; and a coating adhered to at least one surface of the separator, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material comprising at least one ceramic material selected from the group consisting of aluminum oxide, silicon oxide, silicon carbide, titanium dioxide, magnesium oxide, boron nitride, and combinations thereof.

One or more embodiments are drawn to a coated separator comprising a separator; and a coating adhered to at least one surface of the separator, wherein the coating comprises an ultra-violet (UV) or electron beam (EB) cured matrix comprising a crosslink reaction product from one or more precursors selected from one or more monomers, one or more oligomers, or combinations thereof, wherein the one or more precursors comprises a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof; and a ceramic particulate material.

One or more embodiments are drawn to a coated separator comprising a separator; and a coating adhered to at least one surface of the separator, wherein the coating comprises a nonionic ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a coated separator comprising a separator; and a coating adhered to at least one surface of the separator, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material, wherein the ceramic particulate material is bound to the UV or EB cured matrix, bound to the separator by the UV or EB cured matrix, and distributed uniformly throughout the UV or EB cured matrix.

One or more embodiments are drawn to a coated separator comprising a separator including a top surface and a bottom surface; and a coating adhered to the top surface or the bottom surface, but not to both the top surface and the bottom surface, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a coated separator comprising a separator; and a coating adhered to at least one surface of the separator, wherein the coating is patterned on at least one surface of the separator, and wherein the coating comprises an ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a coated separator comprising a separator; and a coating adhered to at least one surface of the separator, wherein the coating is electrically insulating and comprises an ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a coated separator comprising a separator; and a coating adhered to at least one surface of the separator, wherein the coating is electrically insulating and comprises an ultra-violet (UV) or electron beam (EB) cured matrix comprising a crosslink reaction product from one or more precursors selected from one or more monomers, one or more oligomers, or combinations thereof; and a ceramic particulate material, and wherein the coated separator is configured to maintain its shape, suppress ionic flow through pores of the separator, and remain electrically insulating in response to the coated separator being heated to a temperature of higher than 100° C., higher than 110° C., or higher than 120° C.

One or more embodiments are drawn to a coated separator comprising a separator; and a coating adhered to at least one surface of the separator, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material, wherein the ceramic particulate material is bound to the UV or EB cured matrix, bound to the separator by the UV or EB cured matrix, and distributed uniformly throughout the UV or EB cured matrix, and wherein the coated separator is configured such that the ceramic particulate material remains bound to the UV or EB cured matrix and to the separator while the coated separator is heated to a temperature of higher than 100° C., higher than 110° C., or higher than 120° C.

One or more embodiments an electrochemical device including a coated separator comprising a separator; and a coating adhered to at least one surface of the separator, wherein the coating comprises an ultra-violet (UV) or electron beam (EB) cured matrix comprising a crosslink reaction product from one or more precursors selected from one or more monomers, one or more oligomers, or combinations thereof; and a ceramic particulate material.

One or more embodiments are drawn to a method comprising: mixing a ceramic particulate material with a curable binder mixture comprising one or more monomers, one or more oligomers, or a combination thereof to form a slurry; applying the slurry to at least one surface of a separator to form a slurry coated separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: mixing a ceramic particulate material with a solvent and a curable binder mixture comprising one or more monomers, one or more oligomers, or a combination thereof to form a slurry; applying the slurry to at least one surface of a separator to form a slurry coated separator; removing the solvent from the slurry after applying the slurry to at least one surface of the separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: mixing a ceramic particulate material with a curable binder mixture comprising one or more monomers, one or more oligomers, or a combination thereof to form a slurry, wherein the curable binder mixture comprises a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof; applying the slurry to at least one surface of a separator to form a slurry coated separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: mixing a ceramic particulate material with a curable binder mixture comprising one or more monomers, one or more oligomers, or a combination thereof to form a slurry; applying the slurry to a top surface or a bottom surface of a separator, but not to both the top surface and the bottom surface, to form a slurry coated separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: mixing a ceramic particulate material with a curable binder mixture comprising one or more monomers, one or more oligomers, or a combination thereof to form a slurry; applying the slurry in a pattern to at least one surface of a separator to form a slurry coated separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: mixing a ceramic particulate material with a curable binder mixture comprising one or more monomers, one or more oligomers, or a combination thereof to form a slurry; applying the slurry in a printed pattern with a screen, curtain coat, gravure, reverse gravure, flexographic printer, letterpress, offset press, or a combination thereof to at least one surface of a separator to form a slurry coated separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: mixing a ceramic particulate material with a) a curable binder mixture comprising one or more monomers, one or more oligomers, or a combination thereof and b) a photoinitiator, free-radical initiator, dispersant, adhesion promoter, wetting agent, silane-coated particle, dark cure additive, co-initiator, blowing agent, or a combination thereof to form a slurry; applying the slurry to at least one surface of a separator to form a slurry coated separator; and subjecting the slurry coated separator to ultraviolet (UV) or electron beam (EB) radiation, thereby curing the curable binder mixture and forming a UV or EB cured matrix, wherein the UV or EB cured matrix adheres to at least one surface of the separator and the ceramic particulate material is distributed throughout the UV or EB cured matrix.

One or more embodiments are drawn to a method comprising: assembling a cathode, an anode, electrolyte, and a coated separator to form a battery; the coated separator comprising a porous separator and a coating adhered to at least one surface of the separator; the coating comprising an ultra-violet (UV) or electron beam (EB) cured matrix comprising a crosslink reaction product from one or more precursors selected from one or more monomers, one or more oligomers, or combinations thereof, and a ceramic particulate material.

Although coated separators are used to illustrate certain variations, various embodiments are suitable for the preparation of any separator disclosed herein, using any of the ceramic particulate materials and any of the curable binder mixtures disclosed herein. With the benefit of the present disclosure, one skilled in the art will recognize that various process parameters may need to be adjusted to compensate for the lack of a conventional separator film (e.g., in the case of a free standing separator).

While certain variations have been described with respect to specific formulations, those skilled in the art will appreciate that there are numerous variations and permutations of the above described systems and techniques that fall within the spirit and scope of the disclosure as set forth in the appended claims.

Various embodiments provide numerous advantages over the prior art, including, but not limited to:

1. The present method is a faster and less expensive process for manufacturing a coated battery (e.g., lithium secondary battery) separator.
2. The present process is safer than prior art coating methods. In some embodiments, the present method is completely solvent free. In another embodiment, solvent is used, but a less toxic solvent and in a significantly lower amount than is used in prior art coating methods. In yet another embodiment, a completely harmless solvent (water) is used.
3. The present UV or EB process creates a thermosetting network binding the ceramic particles to the cured binder matrix and to the separator. The advantage of a thermosetting network is that it will not melt away and has much higher thermal resistance than what would be achieved with a thermoplastic network.
4. The present method may be integrated in-line with extrusion equipment. Because the present method reinforces the strength of the separator film, this in-line integration allows the production of thinner separators. A thinner separator with greater fire protection will result in a smaller battery and thinner separator will also have greater ionic conductivity due to the short path which results in faster charge and discharge cycles all with less heat being generated in the battery.
5. The present embodiments may allow the coating to be applied before the separator is biaxially orientated to increase porosity. In this way, the coating could be applied, the film stretched and there would be less interference with the pores of the separator. Application of the coating before biaxial orientation would enhance the strength of the separator film and prevent shrinkage of the separator during curing.
6. Some present embodiments permit the use of patterned coatings or porous solid coatings or a combination of the two. The use of patterned coatings applied with printing techniques produces a reproducible network of ceramic insulators on the separator. This has the advantage of minimizing interference with the pores in the separator. In this way, the battery will have more power, i.e., it is capable of charging and discharging faster than a separator coated with the same ceramic thickness but relying on solvent evaporative porosity to produce an ionic electrolyte path through the ceramic coating.
7. The present process allows for the coating of multiple layers so that there are no straight-line paths from the anode to the cathode through the separator.
8. Free standing separator embodiments have the additional advantages of being lightweight (as compared to a coated separator containing a separator film (e.g., a polymeric separator film)) and free of many of the disadvantages of commercial polymeric separator films. The free standing separator does not have a thermally sensitive layer (e.g., a polymeric separator film) and does not tear as easily as a polymeric separator film.

The disclosure is not to be limited in scope by the specific embodiments disclosed in the examples. The specific embodiments disclosed in the examples are intended as illustrations of a few aspects, and any embodiments that are functionally equivalent are within the scope of this disclosure. Indeed, various modifications of various embodiments in addition to those shown and described herein will become apparent and are intended to fall within the scope of the appended claims.

Although lithium ion batteries are used to illustrate certain variations, various embodiments are suitable for the preparation of any battery disclosed herein, using any of the separator components disclosed herein. With the benefit of the present disclosure, one skilled in the art will recognize that various process parameters may need to be adjusted to compensate for the use of a different battery type.

The terms used in the present specification shall be understood to have the meaning usually used in the field of art to which various embodiments pertain, unless otherwise specified.

Where products are described herein as having, including, or comprising specific components, or where processes are described herein as having, including, or comprising specific process steps, it is contemplated that the products of various embodiments can also consist essentially of, or consist of, the recited components, and that the processes of various embodiments also consist essentially of, or consist of, the recited process steps.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, a numerical range of "1 to 5" should be interpreted to include not only the explicitly recited values of 1 and 5, but also individual values and sub-ranges within the indicated range. Thus, included in this numerical range are individual values such as 2, 3, 4, etc. and sub-ranges such as from 1 to 3, from 2 to 4, from 3-5, etc. The listing of illustrative values or ranges is not a disclaimer of other values or ranges between and including the upper and lower limits of a given range.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Each of the individual embodiments described and illustrated herein has discrete components and features which may be readily separated from or combined with the features of any of the other several embodiments without departing from the scope or spirit of the disclosure. Any recited method can be carried out in the order of events recited or in any other order which is logically possible.

The disclosure is not limited to particular embodiments described herein. Further, the terminology used herein is for the purpose of describing particular embodiments only, and is not intended to be limiting.

We claim:

1. An apparatus comprising:
  a cathode, an anode, or an electrolyte;
  a porous separator comprising a cured coating, the cured coating comprising ceramic particulate material bound in a crosslink reaction product, wherein the crosslink reaction product is formed as a thermoset network from one or more precursors exposed to ultra-violet (UV) or electron beam (EB) radiation after being mixed with the ceramic particulate material and coated directly on the cathode, the anode, or the electrolyte, and wherein the one or more precursors are selected from the group consisting of one or more monomers, one or more oligomers, or a combination thereof, and wherein the cured coating comprises the ceramic particulate material in an amount from 80 to 98 weight percent based on total weight of the cured coating.

2. The apparatus of claim 1, wherein the ceramic particulate material comprises at least one thermally conductive material that is not electrically conductive.

3. The apparatus of claim 1, wherein the ceramic particulate material consists of particles having sizes no larger than 10 µm.

4. The apparatus of claim 1, wherein the one or more precursors comprises a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof.

5. The apparatus of claim 1, wherein the porous separator is nonionic.

6. The apparatus of claim 1, wherein the porous separator is configured to maintain its shape, suppress ionic flow through pores of the porous separator, and remain electrically insulating in response to the porous separator being heated to a temperature of higher than 100° C.

7. The apparatus of claim 1, wherein the porous separator comprises a tortuous path for ions passing through the porous separator.

8. The apparatus of claim 1, wherein the porous separator comprises a perforated pattern.

9. The apparatus of claim 1, wherein the porous separator comprises two or more layers, wherein a first layer of the two or more layers comprises the cured coating, and wherein each additional layer of the two or more layers comprises respective additional ceramic particulate material and an additional crosslink reaction product.

10. The apparatus of claim 1, wherein the cured coating comprises from 85 to 98 weight percent of the ceramic particulate material based on the total weight of the porous separator.

11. The apparatus of claim 1, wherein the porous separator has a thickness of between 0.1 µm and 4 µm.

12. The apparatus of claim 1, further comprising a composition that, when heated, fills pores of the porous separator such that ionic transportation across the porous separator is blocked.

13. A battery comprising the apparatus of claim 1.

14. A method comprising:
  mixing a ceramic particulate material with a curable binder mixture comprising one or more monomers, one or more oligomers, or a combination thereof to form a slurry;
  forming a coating on a cathode or an anode or an electrolyte according to a process the includes applying the slurry to at least one surface of the cathode or the anode or the electrolyte; and
  subjecting the coating to ultraviolet (UV) or electron beam (EB) radiation, thereby curing the curable binder mixture into a UV or EB cured matrix formed as a thermoset network that adheres to the ceramic particulate material, wherein the UV or EB cured matrix and the ceramic particulate material form a porous separator, the cured matrix and the ceramic particulate material together comprise the ceramic particulate material in an amount from 80 to 98 weight percent based on the total weight of the cured matrix and the ceramic particulate material.

15. The method according to claim 14, further comprising applying coating the slurry to at least one surface of the cathode or the anode or the electrolyte by printing the slurry with a flexographic printer.

16. The method according to claim 14, further comprising applying the slurry to at least one surface of the anode or the electrolyte in a perforated pattern.

17. The method according to claim 14, further comprising mixing the slurry with a composition that fills pores of the porous separator when heated.

18. The method according to claim 14, further comprising mixing the slurry with thermoplastic particles.

19. The method according to claim 14, wherein the porous separator is nonionic.

20. The method according to claim 14, comprising:
   mixing water with the ceramic particulate material and the curable binder mixture to form the slurry;
   removing the water from the slurry before the subjecting the coating to the UV or EB radiation and after forming the coating on the cathode or the anode or the electrolyte.

21. The method according to claim 14, wherein the step of subjecting of the coating to the UV or EB radiation comprises passing the coating on the cathode or the anode or the electrolyte under an ultraviolet bulb powered between 50 and 1000 Watts per inch and at a rate of between 5 and 2000 feet per minute.

* * * * *